United States Patent [19]

Suzuki et al.

[11] Patent Number: 5,602,956
[45] Date of Patent: Feb. 11, 1997

[54] PICTURE SIGNAL CODING METHOD, DECODING METHOD AND PICTURE SIGNAL RECORDING MEDIUM

[75] Inventors: Teruhiko Suzuki, Chiba; Yoichi Yagasaki; Jun Yonemitsu, both of Kanagawa, all of Japan

[73] Assignee: Sony Corporation, Tokyo, Japan

[21] Appl. No.: 178,029

[22] Filed: Jan. 6, 1994

[30] Foreign Application Priority Data

| Jan. 11, 1993 | [JP] | Japan | 5-019277 |
| Jul. 21, 1993 | [JP] | Japan | 5-180122 |

[51] Int. Cl.⁶ .................................................. H04N 5/917
[52] U.S. Cl. ................................................ 386/68; 386/111
[58] Field of Search .................................. 358/335, 312, 358/342; 360/10.1, 10.3

[56] References Cited

U.S. PATENT DOCUMENTS

| 4,882,732 | 11/1989 | Kaminaga | 358/335 |
| 4,930,024 | 5/1990 | Kanda et al. | 360/10.1 |
| 4,931,879 | 6/1990 | Koga et al. | 358/335 |
| 5,040,061 | 8/1991 | Yonemitsu | 358/342 |
| 5,057,916 | 10/1991 | Krause et al. | 348/416 |
| 5,057,949 | 10/1991 | Suga et al. | 360/10.2 |
| 5,126,852 | 6/1992 | Nishino et al. | 358/335 |
| 5,136,391 | 8/1992 | Minami | 358/310 |
| 5,140,437 | 8/1992 | Yonemitsu | 358/335 |
| 5,231,484 | 7/1993 | Gonzales et al. | 348/405 |
| 5,239,308 | 8/1993 | Keesen | 341/67 |
| 5,247,363 | 9/1993 | Sun et al. | 348/616 |
| 5,282,049 | 1/1994 | Hatakenaka | 358/312 |
| 5,305,113 | 4/1994 | Iwamura | 358/312 |
| 5,371,547 | 12/1994 | Tsuboi et al. | 348/426 |
| 5,371,602 | 12/1994 | Tsuboi et al. | 358/335 |
| 5,377,051 | 12/1994 | Lane et al. | 360/33.1 |
| 5,455,684 | 10/1995 | Fujinami et al. | 358/335 |
| 5,504,585 | 4/1996 | Fujinami et al. | 358/335 |

FOREIGN PATENT DOCUMENTS

| 0396285A2 | 11/1990 | European Pat. Off. | H04N 5/92 |
| 0499088A3 | 1/1992 | European Pat. Off. | H04N 7/137 |
| 0469842A2 | 2/1992 | European Pat. Off. | H04N 5/782 |
| 0482888A2 | 4/1992 | European Pat. Off. | H04N 5/92 |
| 5050985A2 | 9/1992 | European Pat. Off. | H04N 5/92 |
| 0509594A2 | 10/1992 | European Pat. Off. | G11B 20/10 |
| 0517141A2 | 12/1992 | European Pat. Off. | H04N 7/133 |
| 0536630A2 | 4/1993 | European Pat. Off. | H04N 9/79 |
| 0546865A2 | 6/1993 | European Pat. Off. | H04N 5/92 |
| 3831277A1 | 3/1990 | Germany | H04N 5/91 |
| 60-162392 | 8/1985 | Japan | H04N 7/137 |
| 63-167585 | 7/1988 | Japan | H04N 5/93 |
| 2072780 | 3/1990 | Japan | H04N 7/137 |
| 5-22700 | 1/1993 | Japan | H04N 5/92 |
| 5-211643 | 8/1993 | Japan | H04N 5/92 |
| WO91/00671 | 1/1991 | WIPO | H04N 7/137 |
| WO91/02430 | 2/1991 | WIPO | H04N 5/92 |

OTHER PUBLICATIONS

IEEE 1990 International Conference on Consumer Electronics, Digest of Technical Papers, Jun. 6–8, 1990, Ninth in the ICCE Series, "Video Coding for Recording on a CD–Like Magneto–Optical Disc", Carsten Herpel, Dietmar Heppar, Dietrich Westerkamp, pp. 46–47.

"A CCITT Compatible Coding Algorithm for Digital Recording" F. Pereira, L. Contin, M. Quaglia and P. Delicati, Signal Processing: Image Communication 2, (1990) Aug., No. 2, pp. 155–169, Amsterdam, NE.

(List continued on next page.)

*Primary Examiner*—Howard W. Britton
*Attorney, Agent, or Firm*—Limbach & Limbach L.L.P.

[57] ABSTRACT

A picture signal coding method and decoding method and a picture signal recording medium by which a picture is prevented from being interrupted upon high speed reproduction are disclosed. A GOP is constituted from pictures of 15 frames. Of those pictures, an I-picture and P-pictures are collectively treated as pictures for high speed reproduction and are arranged forwardly of the remaining pictures which are B-pictures. Upon high speed reproduction, only the pictures for high speed reproduction are reproduced.

44 Claims, 77 Drawing Sheets

OTHER PUBLICATIONS

"*Development of 135 Mbit/s HDTV codec*", Signal Processing: Image Communication 4 (1992), Aug., Nos. 4/5, Amsterdam, NE, pp. 379–387, Yoshimichi Ohtsuka, Eisuke Nakasu, Yoshiaki Shishikui, Hiroyuki Imaizumi and Hiroshi Nakanishi.

"*Motion Vector Replensishment for Low Bit–Rate Video Coding*", pp. 397–407, 8376 Signal Processing Image Communication 2, (1990) Dec., No. 4, Amsterdam, NE, M. Ghanbari.

"*Information Technology–Generic Coding of Moving Pictures and Associated Audio*", Recommendation H.262, ISO/IEC 13818–2, Committee Draft, WG11/602, Nov. 5, 1993, Seoul, International Organisation for Standardization et al.,.

"*Test Model 3*", International Organisation for Standardisation, Test Model Editing Committee, Coded Representation of Picture and Audio Information, Draft, ISO–IEC/JJC1/SC29/WG11, CCITT SG XV, Experts group on ATM Video Coding, Nov. 1992,.

'Adaption and Improvement of CCITT Reference Model 8 Video Coding For Digital Storage Media Applications'— Carsten Herpel, et al., 8376 Signal Processing Image Communication 2 (1990) Aug., No. 2, Amsterdam, NE—pp. 171–185.

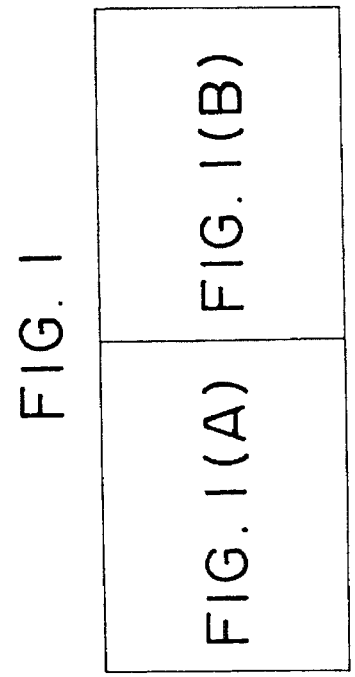
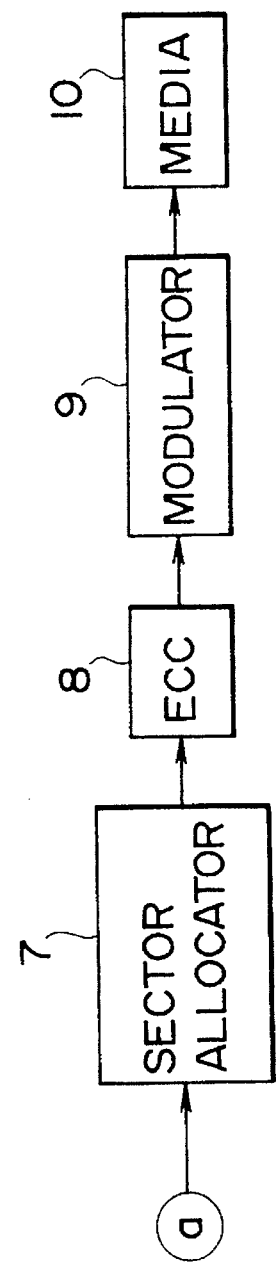

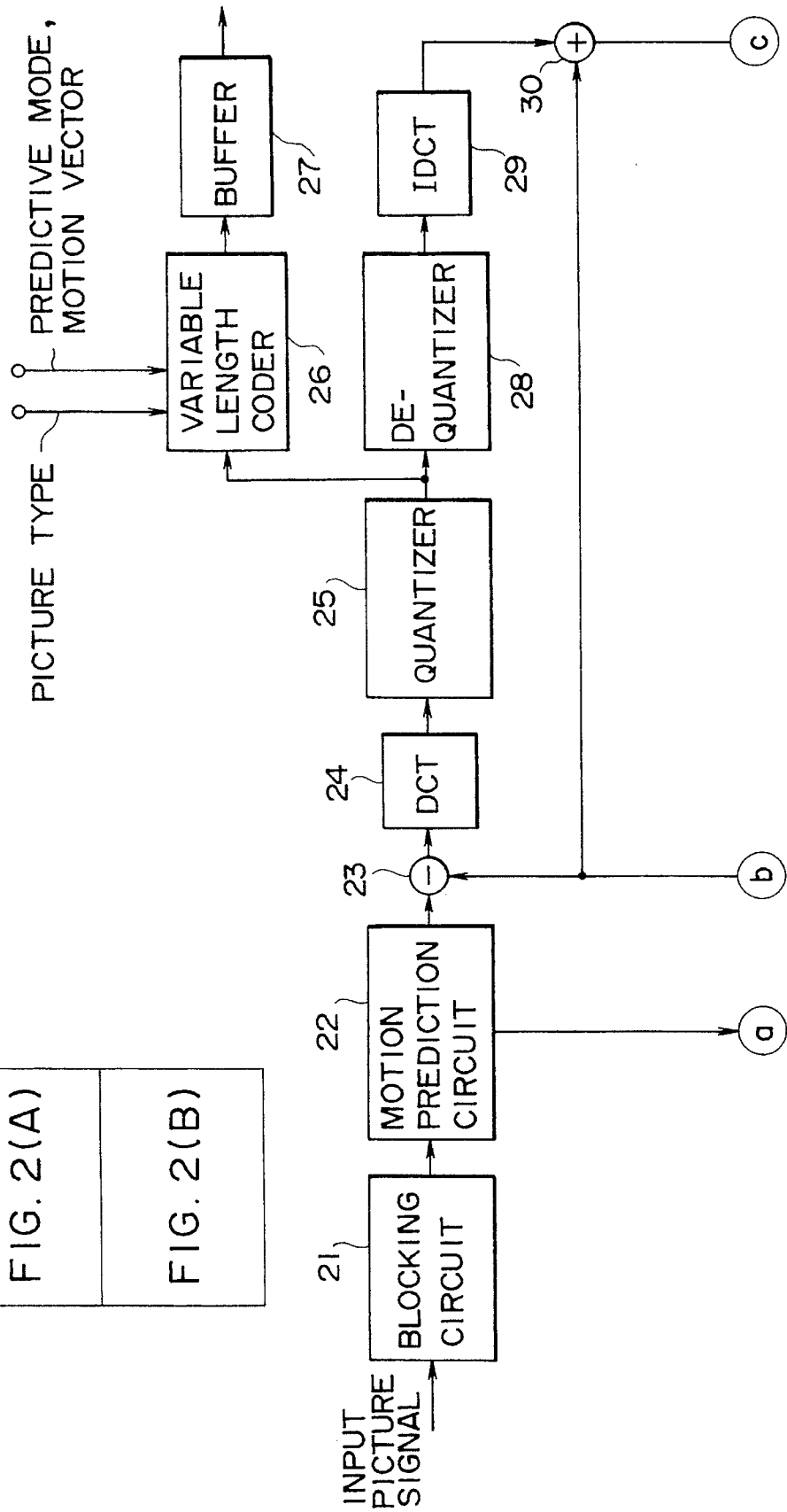

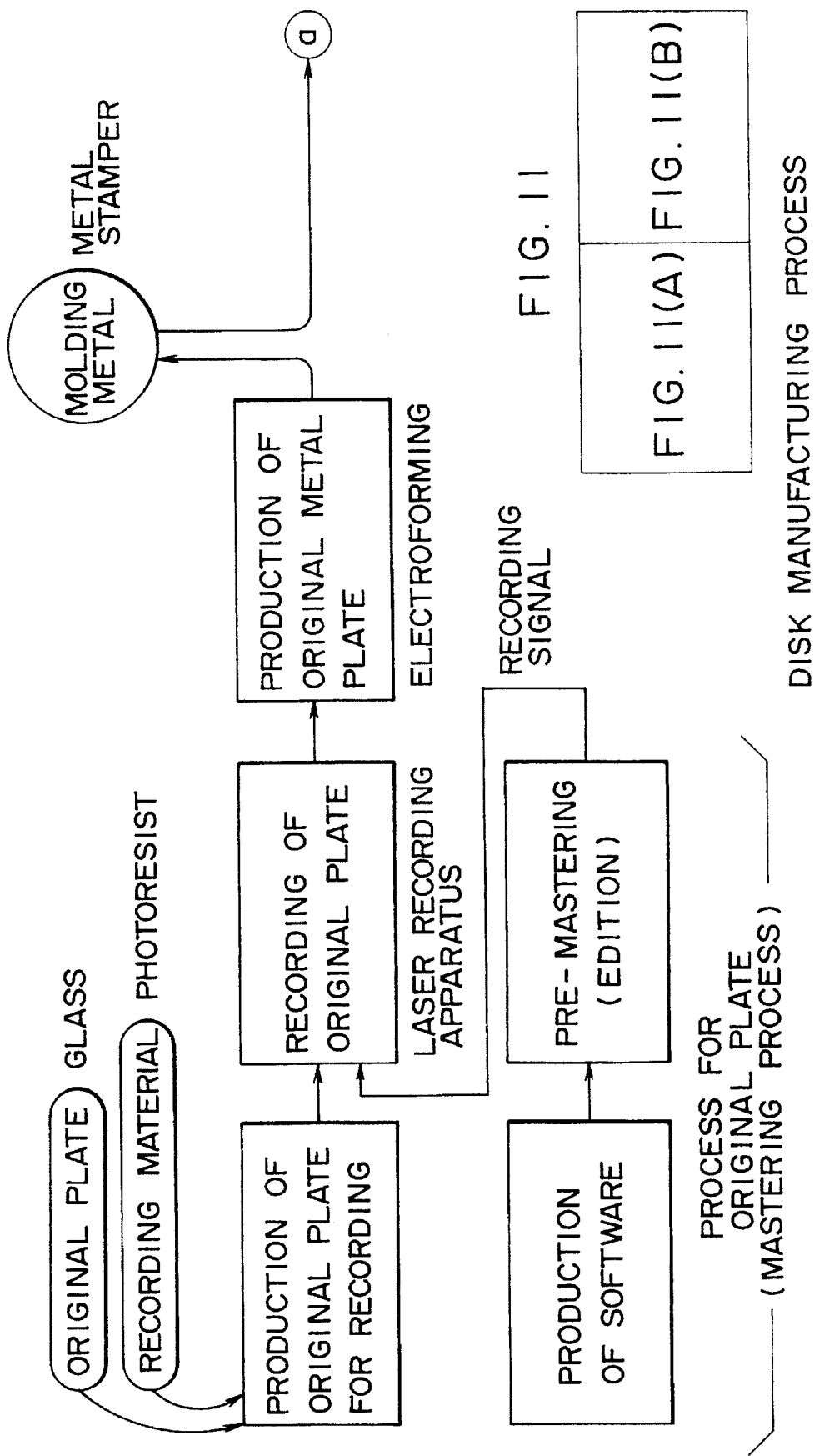

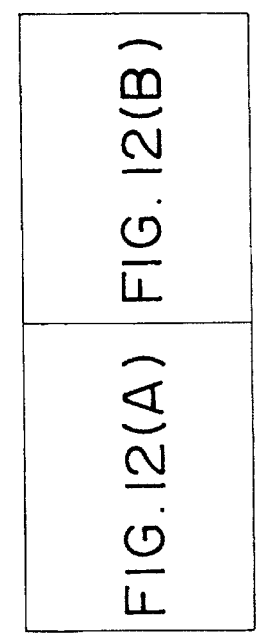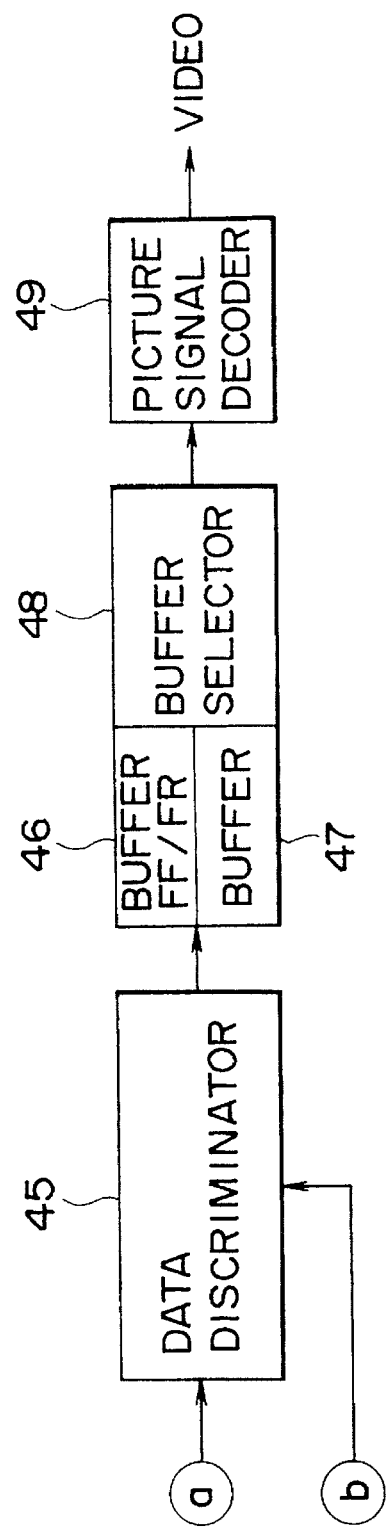

DATA DISCRIMINATOR

FIG. 14

BUFFER 46: I2 P5 P8 P11 P14

BUFFER 47: B0 B1 B3 B4 B6 B7 B9 B10 B12 B13

OUTPUT OF BUFFER SELECTOR 48: I2 B0 B1 P5 B3 B4 P8 B6 B7 P11 B9 B10 P14 B12 B13

VIDEO OUTPUT OF PICTURE SIGNAL DECODER 49: B0 B1 I2 B3 B4 P5 B6 B7 P8 B9 B10 P11 B12 B13 P14

BUFFER SELECTOR 48

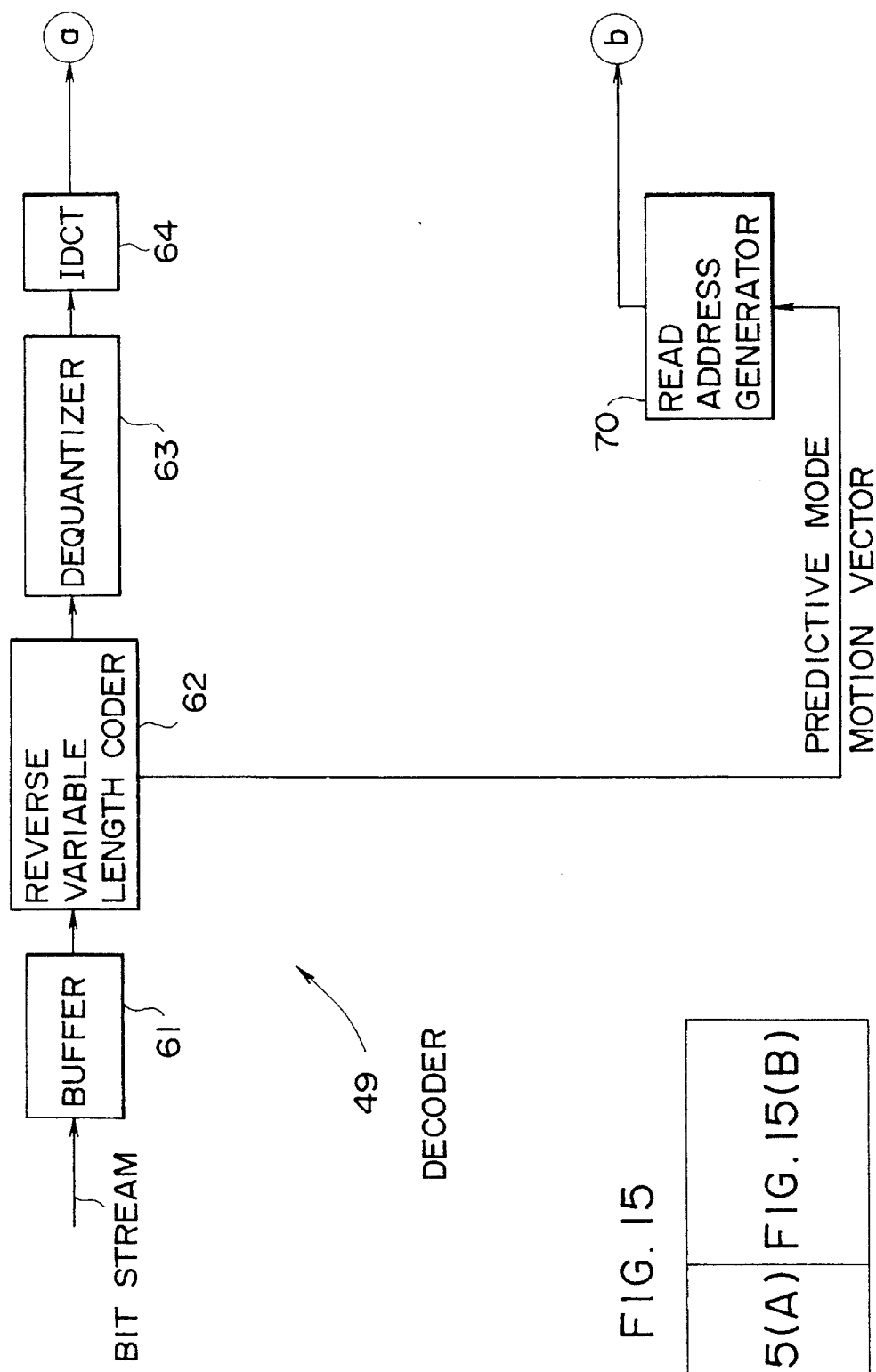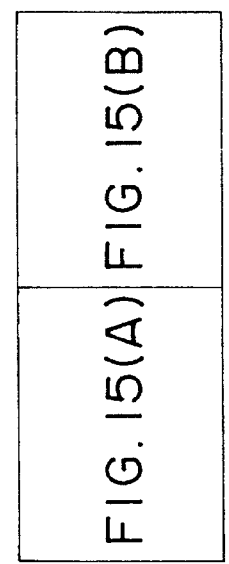

F I G. 21

| ADDRESS OF ENTRY POINT #0 |
| ADDRESS OF ENTRY POINT #1 |
| ADDRESS OF ENTRY POINT #2 |
| ADDRESS OF ENTRY POINT #3 |
| ADDRESS OF ENTRY POINT #4 |
| ADDRESS OF ENTRY POINT #N-2 |
| ADDRESS OF ENTRY POINT #N-1 |

TOC DATA

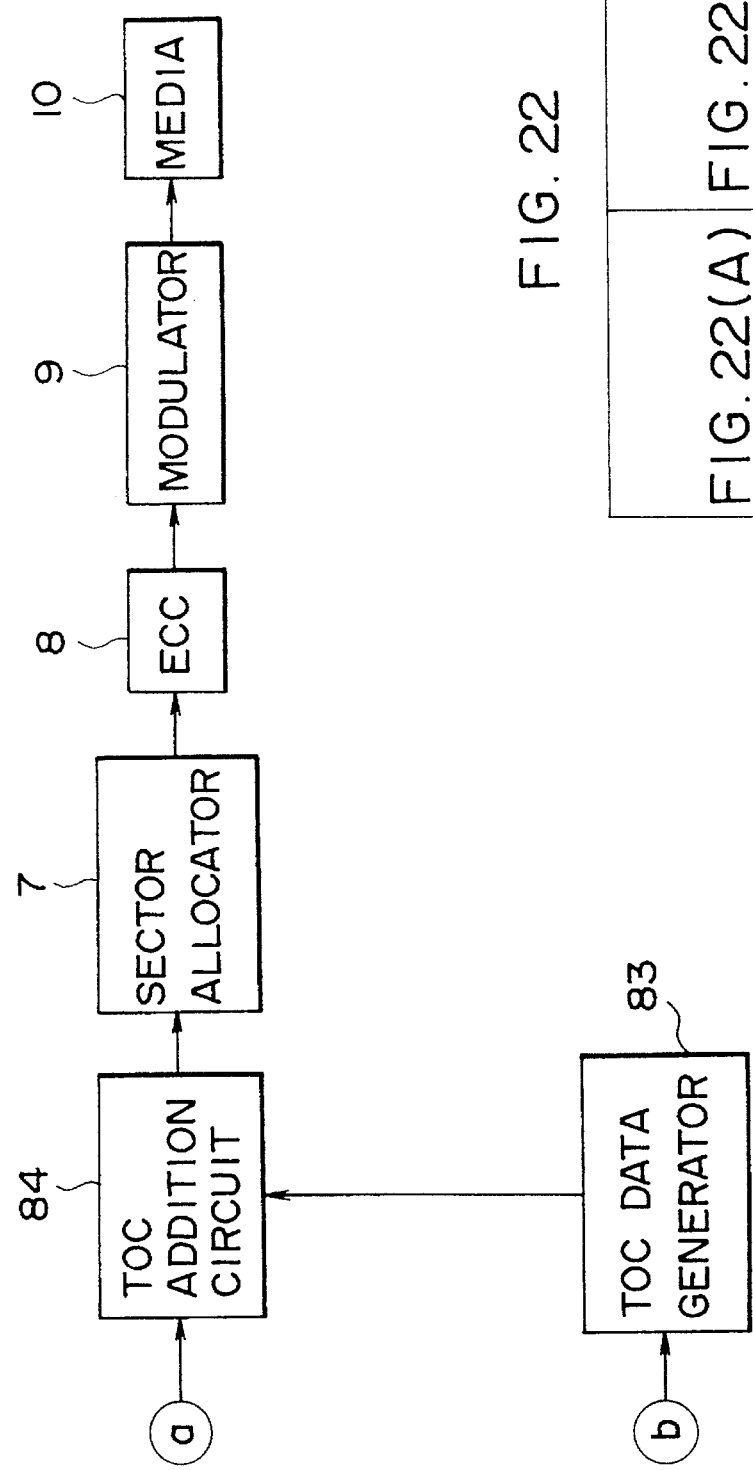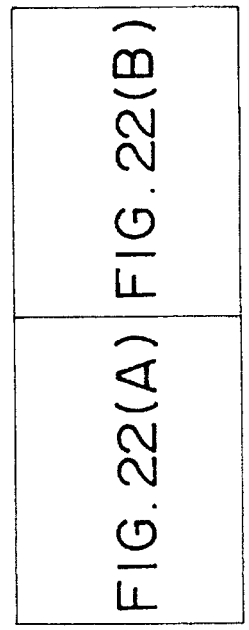

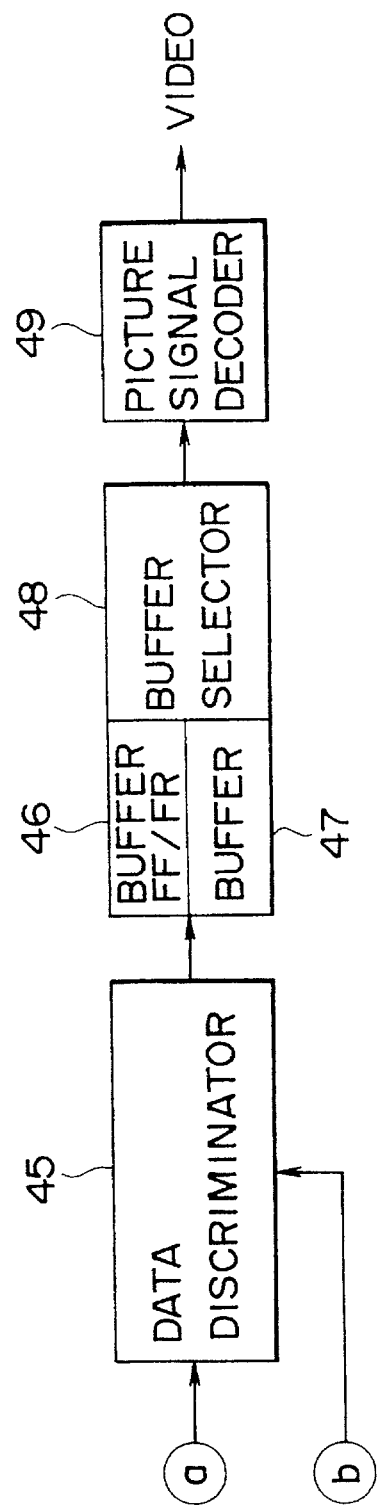
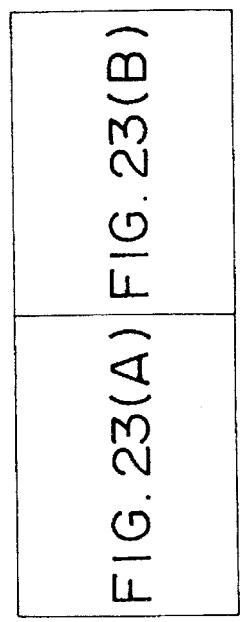

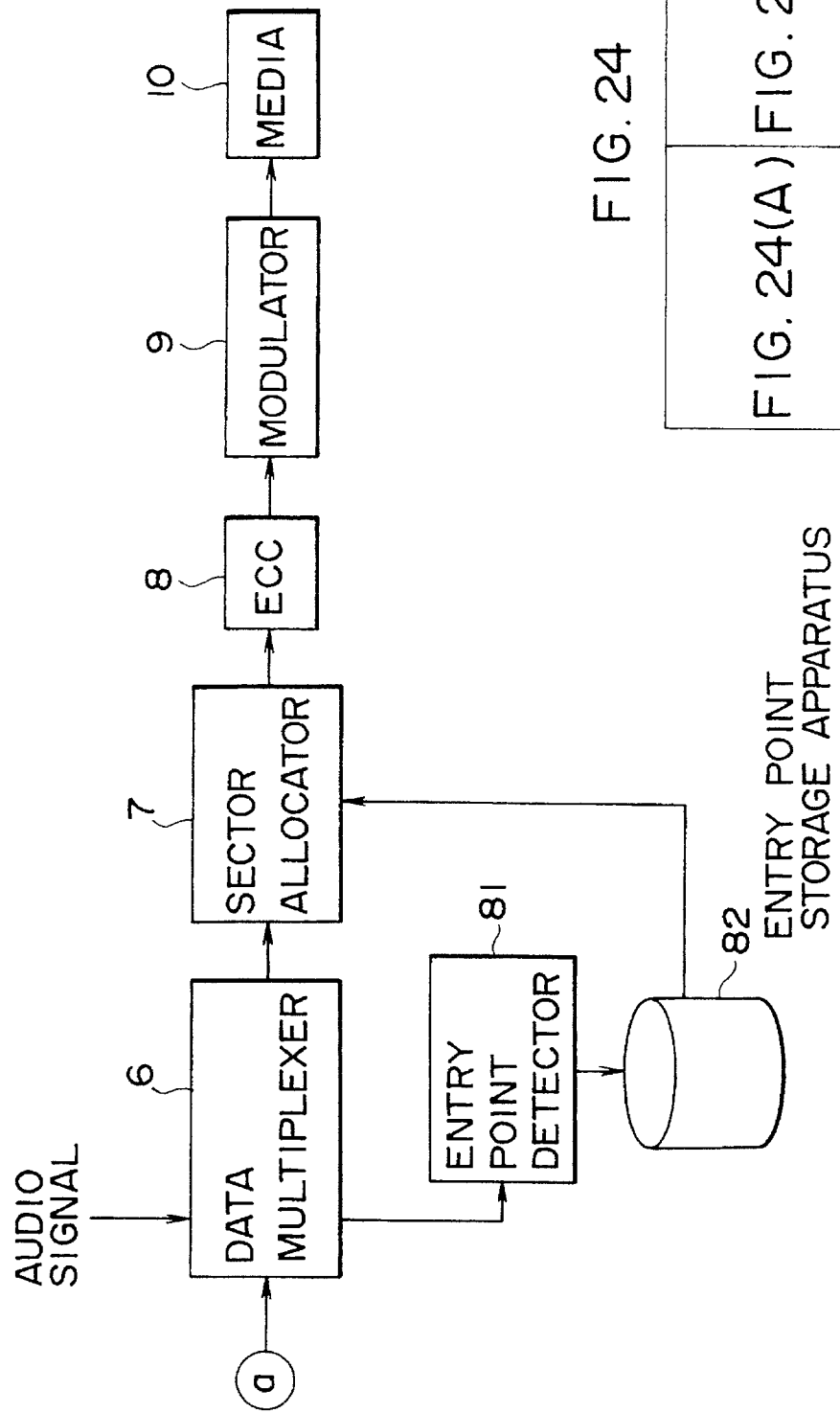
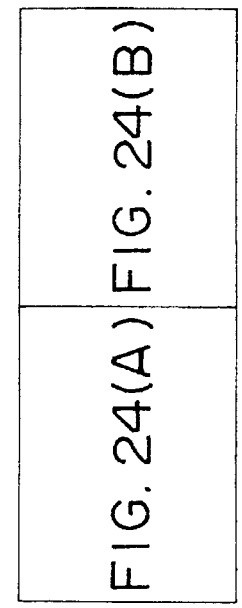
FIG. 24(B)
FIG. 24
| FIG. 24(A) | FIG. 24(B) |

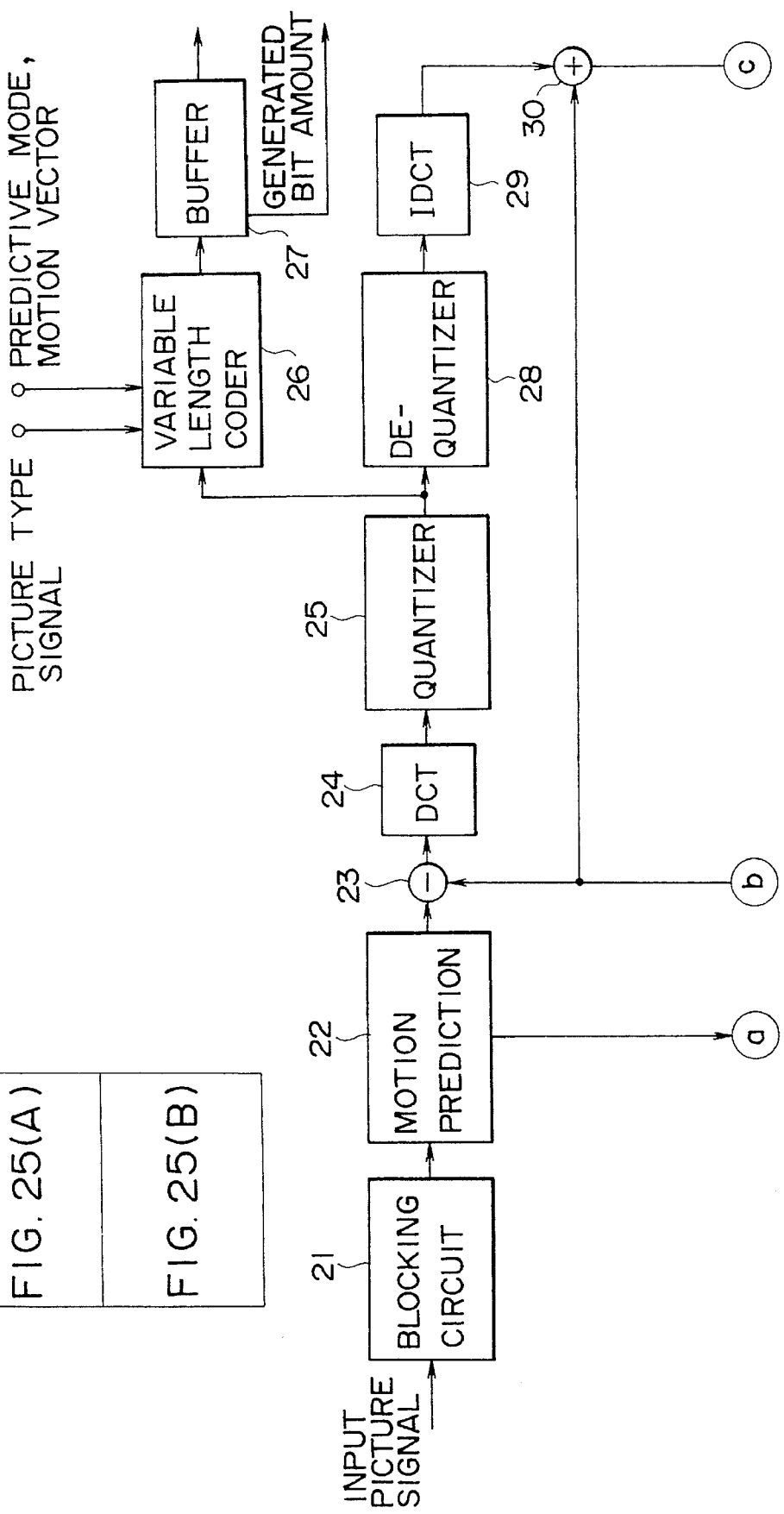

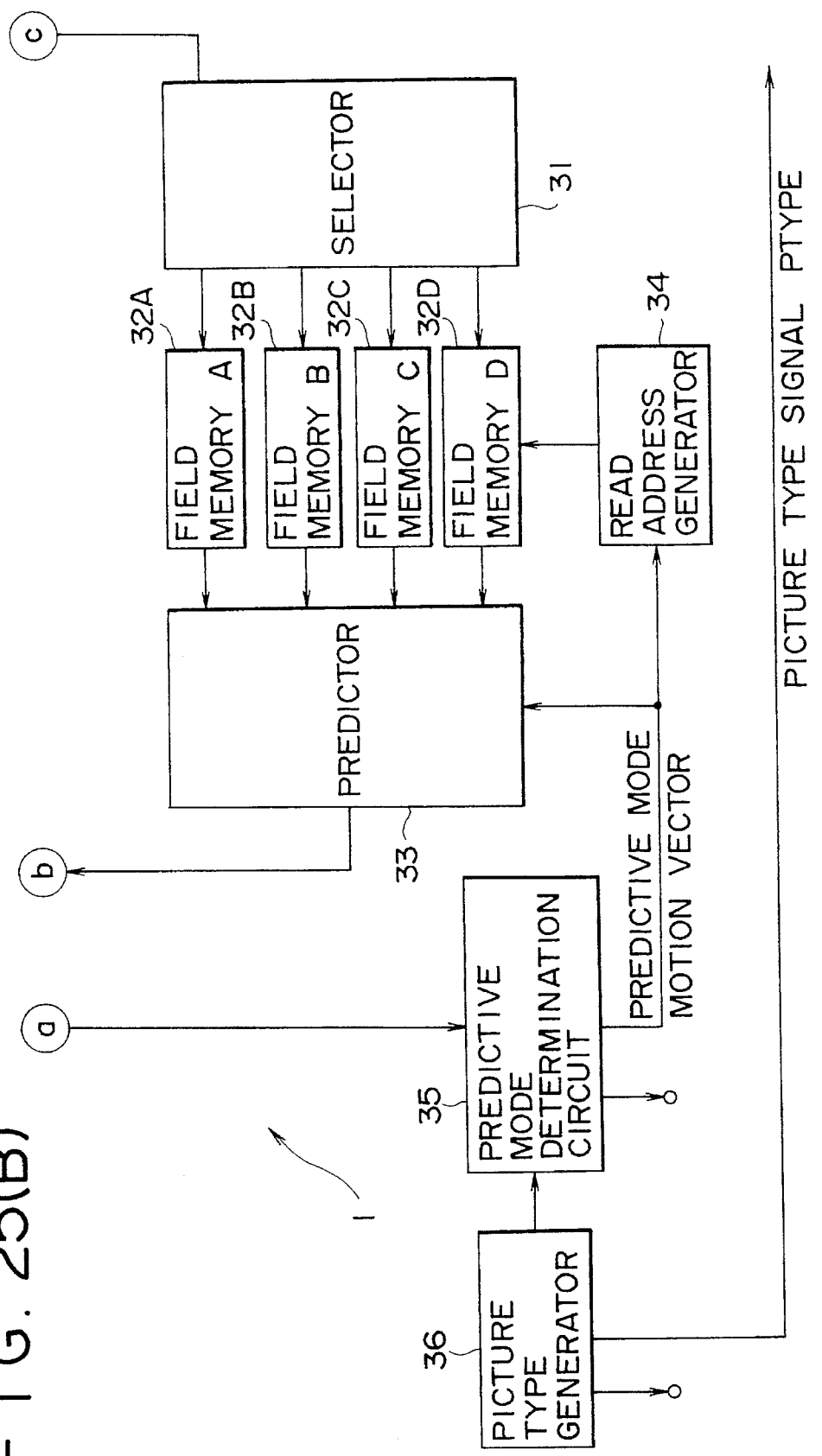
F I G. 25(B)

CONSTRUCTION OF GOP

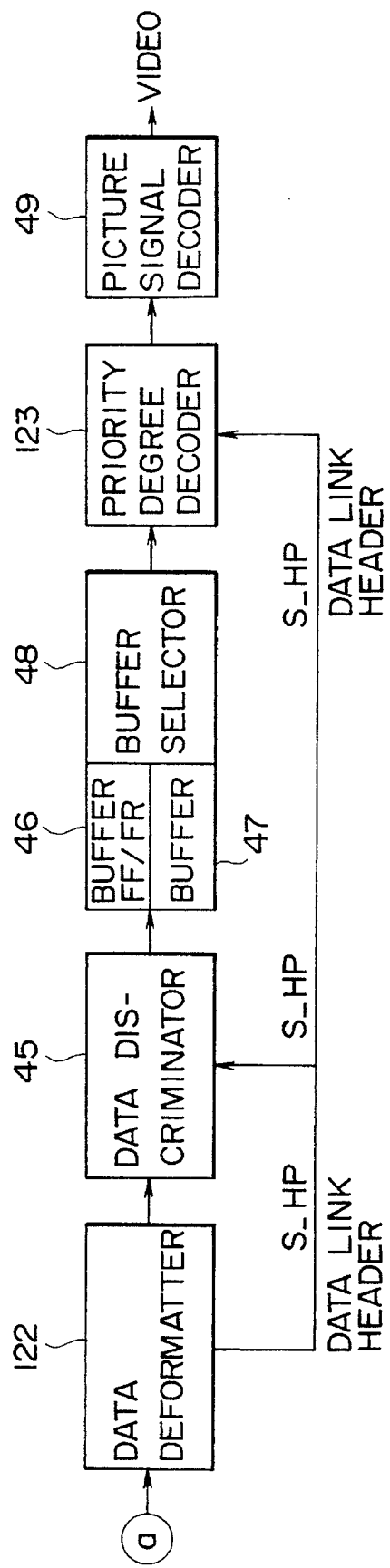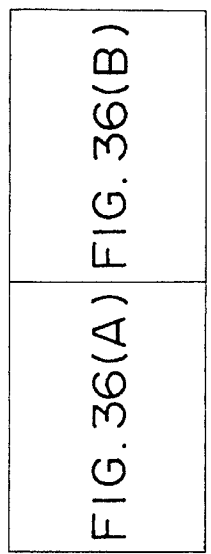

PRIORITY DEGREE DECODER

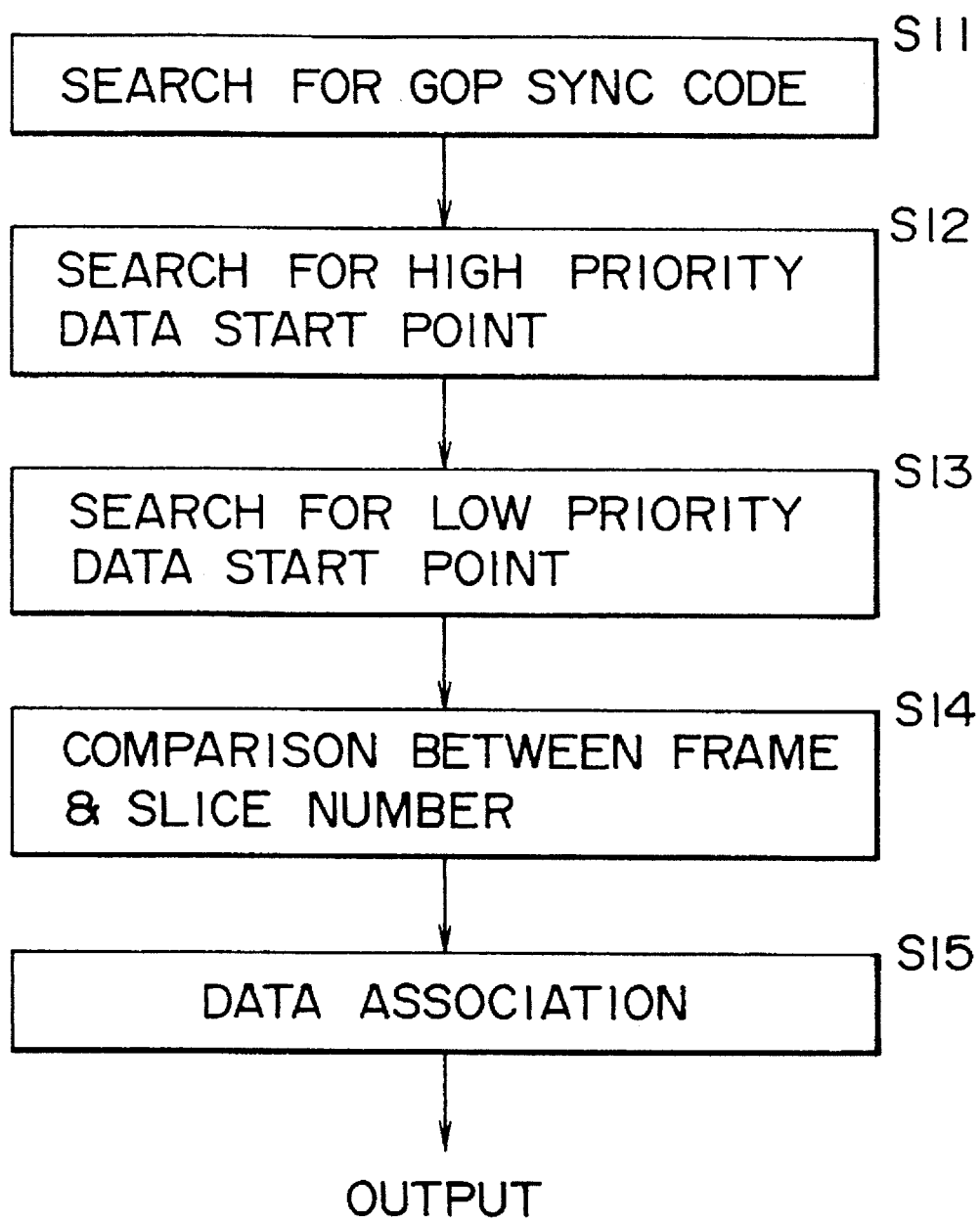
F I G. 39

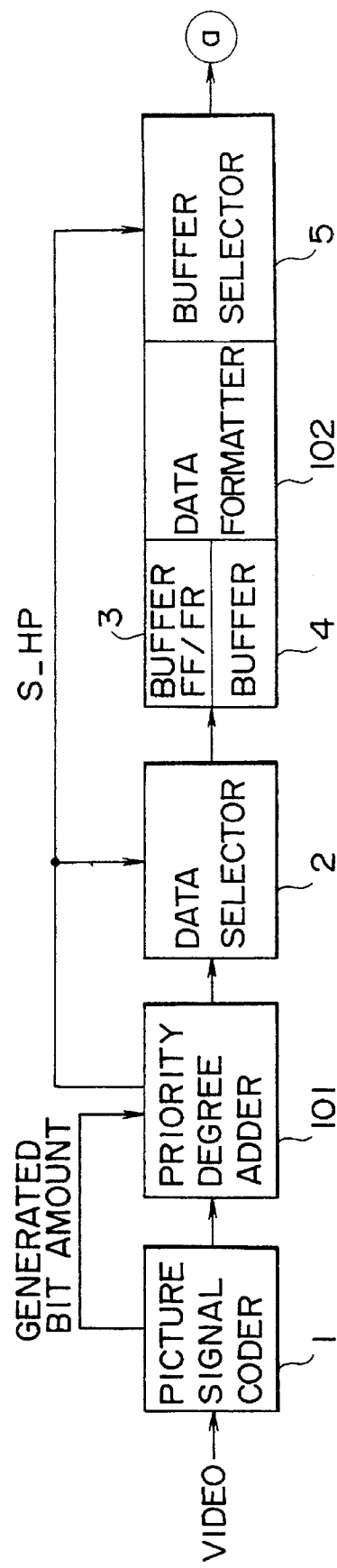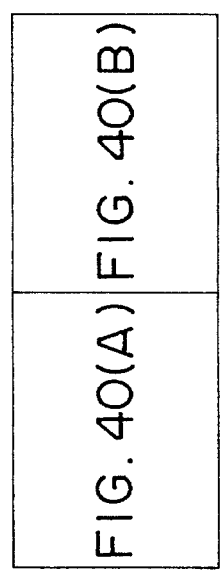

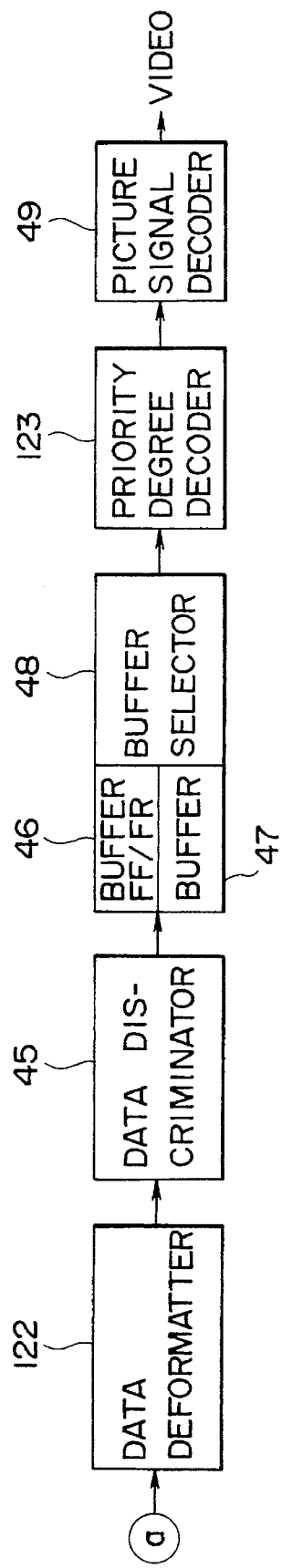
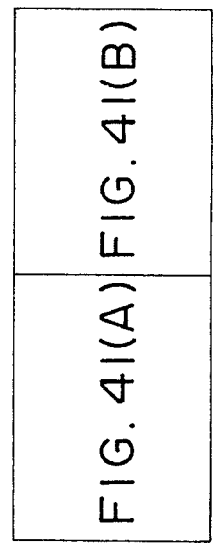
FIG. 41(B)
FIG. 41
| FIG. 41(A) | FIG. 41(B) |

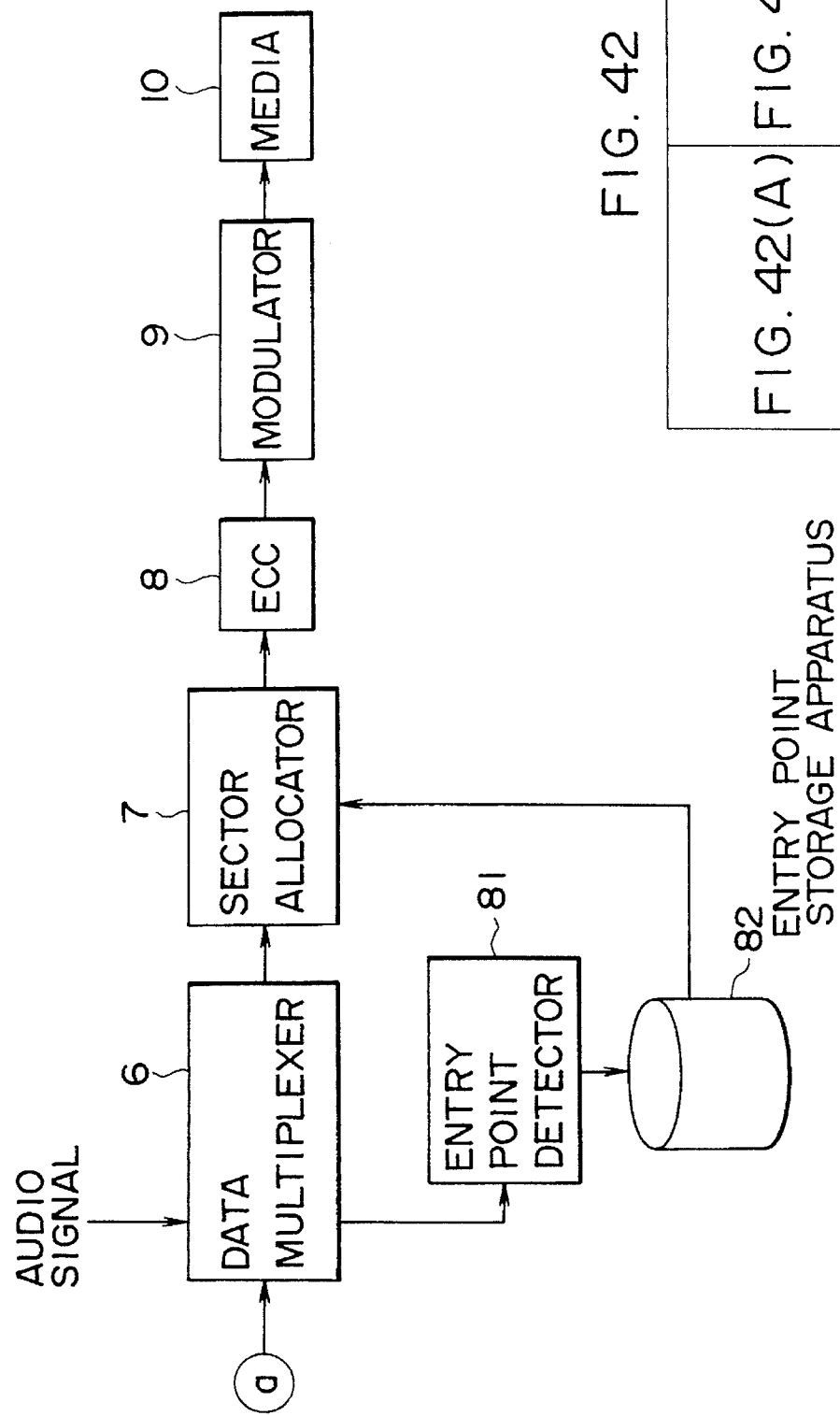

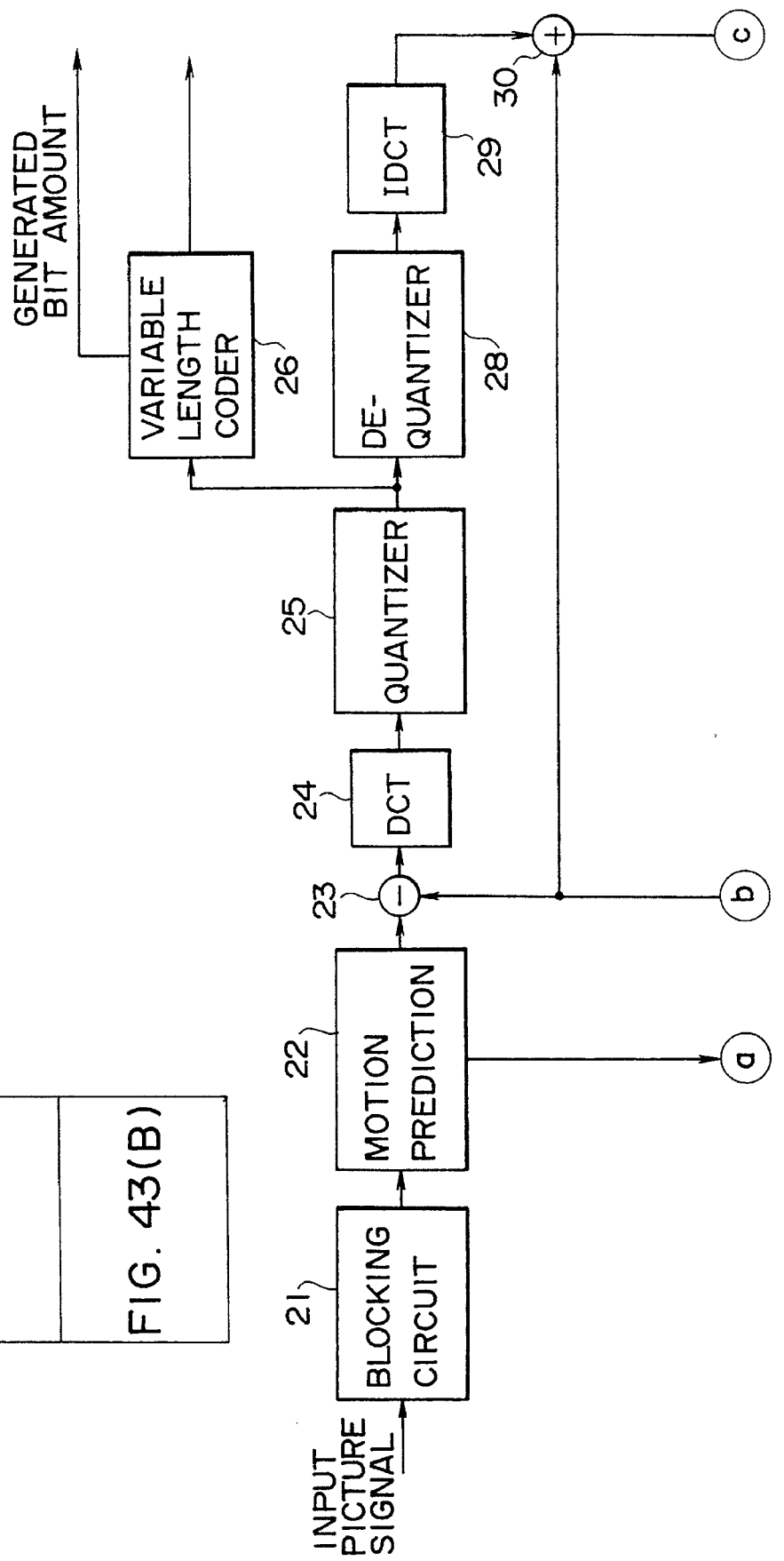

FIG. 45

| pbp | PRIORITY CLASS | DATA INCLUDED IN PRIORITY CLASS |
|---|---|---|
| 65 | 0 | ALL DATA IN SEQUENCE, GOP & PICTURE LAYER AND DATA OF SLICE LAYER UP TO pbp |
| 66 | 1 | MACRO BLOCK DATA FROM MB STUFFING TO MB TYPE |
| 67 | 2 | DATA OF MOTION VECTOR OF FORWARD PREDICTION |
| 68 | 3 | DATA OF MOTION VECTOR OF REARWARD PREDICTION |
| 0 | 4 | MACRO BLOCK DATA FROM CBP TO DC COEFFICIENT (COEFFICIENT OF (0,0)TH COMPONENT) (NON-ZERO) |
| 1 | 5 | FIRST NON-ZERO COEFFICIENT SUBSEQUENT TO DC COEFFICIENT IN ORDER OF ZIGZAG SCAN (COEFFICIENT (0,0)TH COMPONENT) |
| 2 | 6 | SECOND NON-ZERO COEFFICIENT SUBSEQUENT TO DC COEFFICIENT IN ORDER OF ZIGZAG SCAN (COEFFICIENT (0,0)TH COMPONENT) |
| ... | ... | ... |
| j | j+4 | jTH NON-ZERO COEFFICIENT SUBSEQUENT TO DC COEFFICIENT IN ORDER OF ZIGZAG SCAN (COEFFICIENT (0,0)TH COMPONENT) |

DATA INDICATED BY pbp. WHEN, FOR EXAMPLE, pbp=2, DATA OF PRIORITY CLASS LOWER THAN 6 ARE INCLUDED IN HP

FIG. 47

(A) SEQUENCE HEADER
```
sequence(){
    :
    data_partition_flag         1    uimsbf
    :
}
```

(B) PICTURE HEADER
```
picture(){
    :
    if(data_partition_flag)
        intra_pbp               8    uimsbf
    :
}
```

(C) SLICE HEADER
```
slice(){
    slice_start_code           32    bslbf
    quantizer scale             5    uimsbf
    if(data_partition_flag)
        pbp                     8    uimsbf
    :
}
```

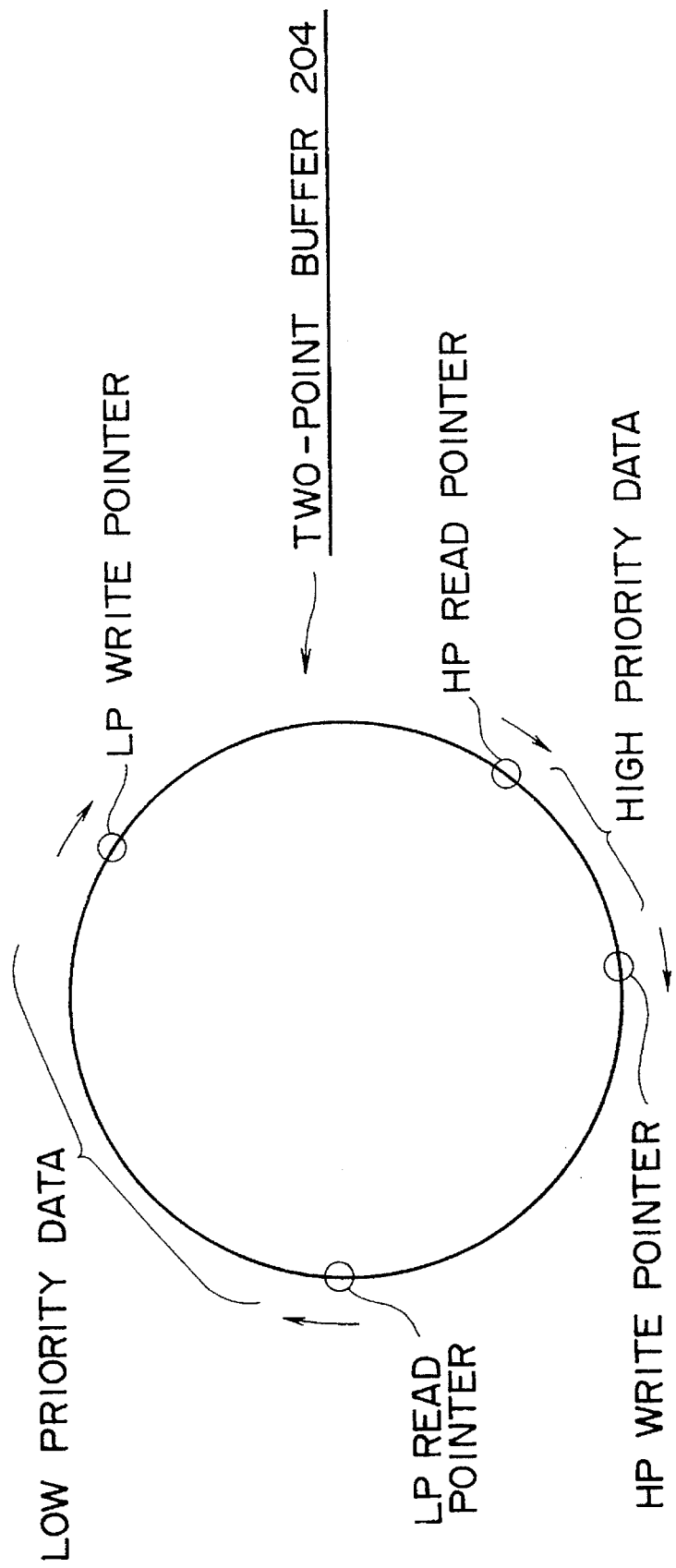

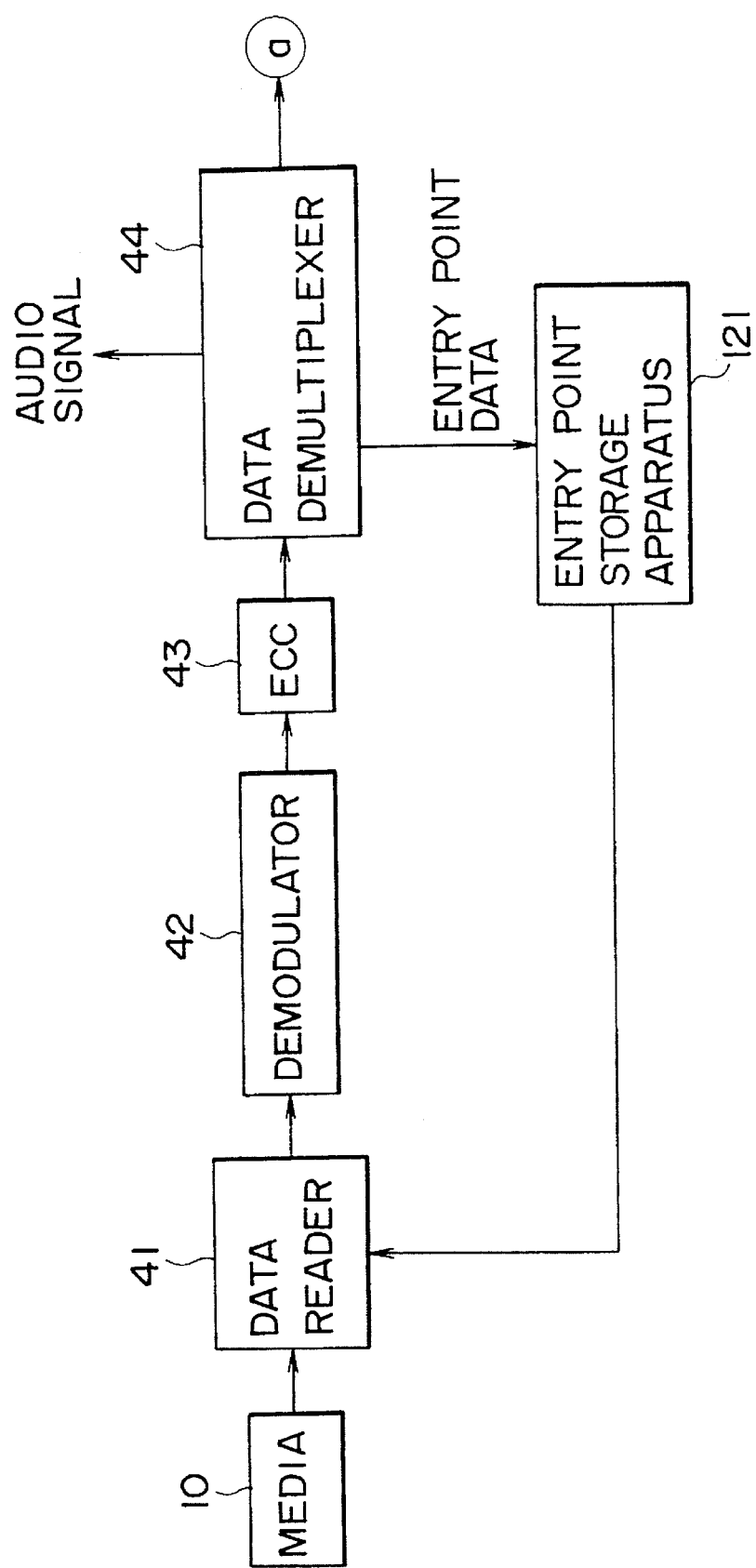

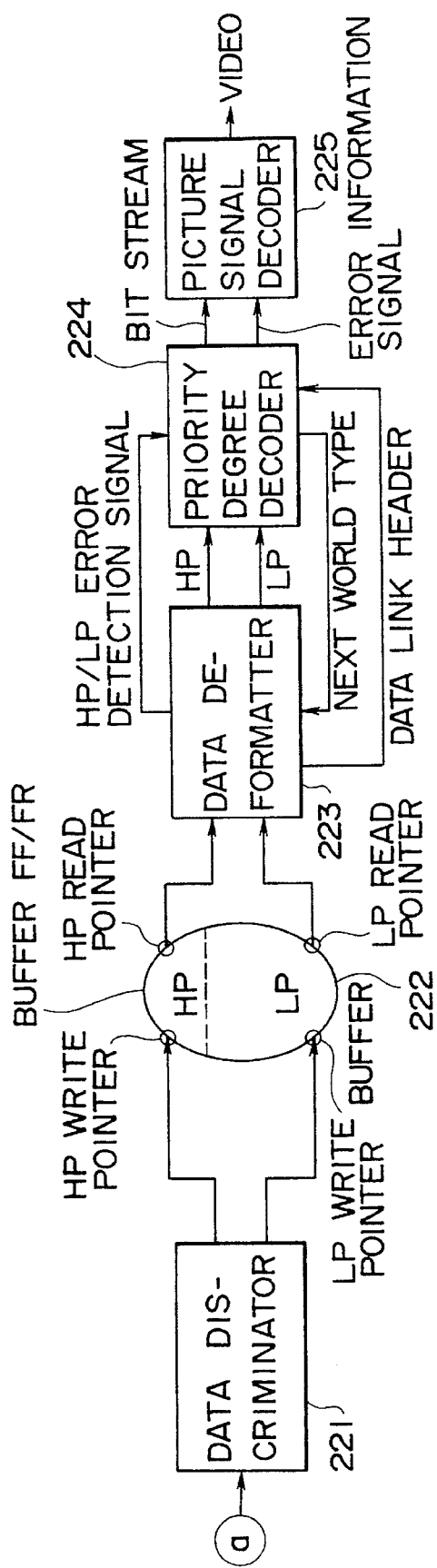
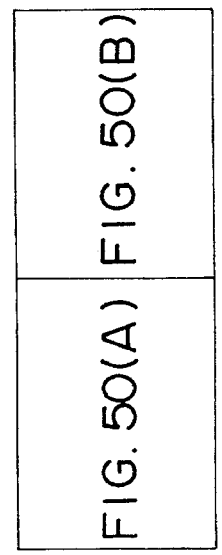
FIG. 50(B)
FIG. 50
| FIG. 50(A) | FIG. 50(B) |

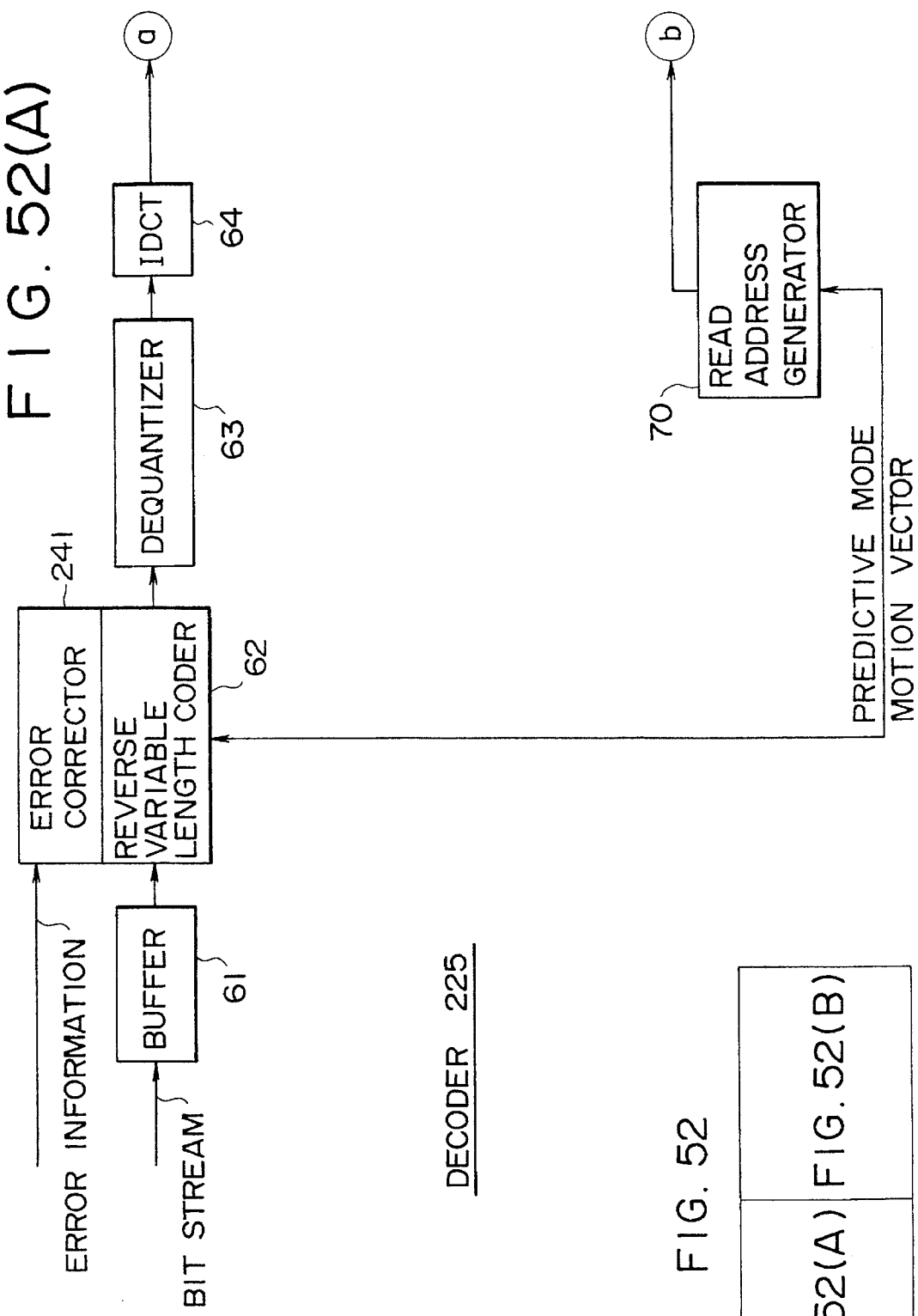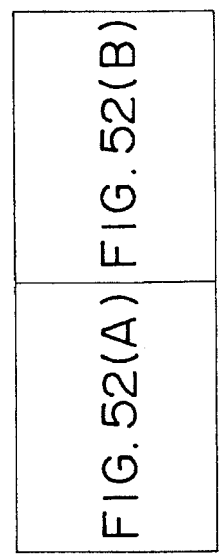

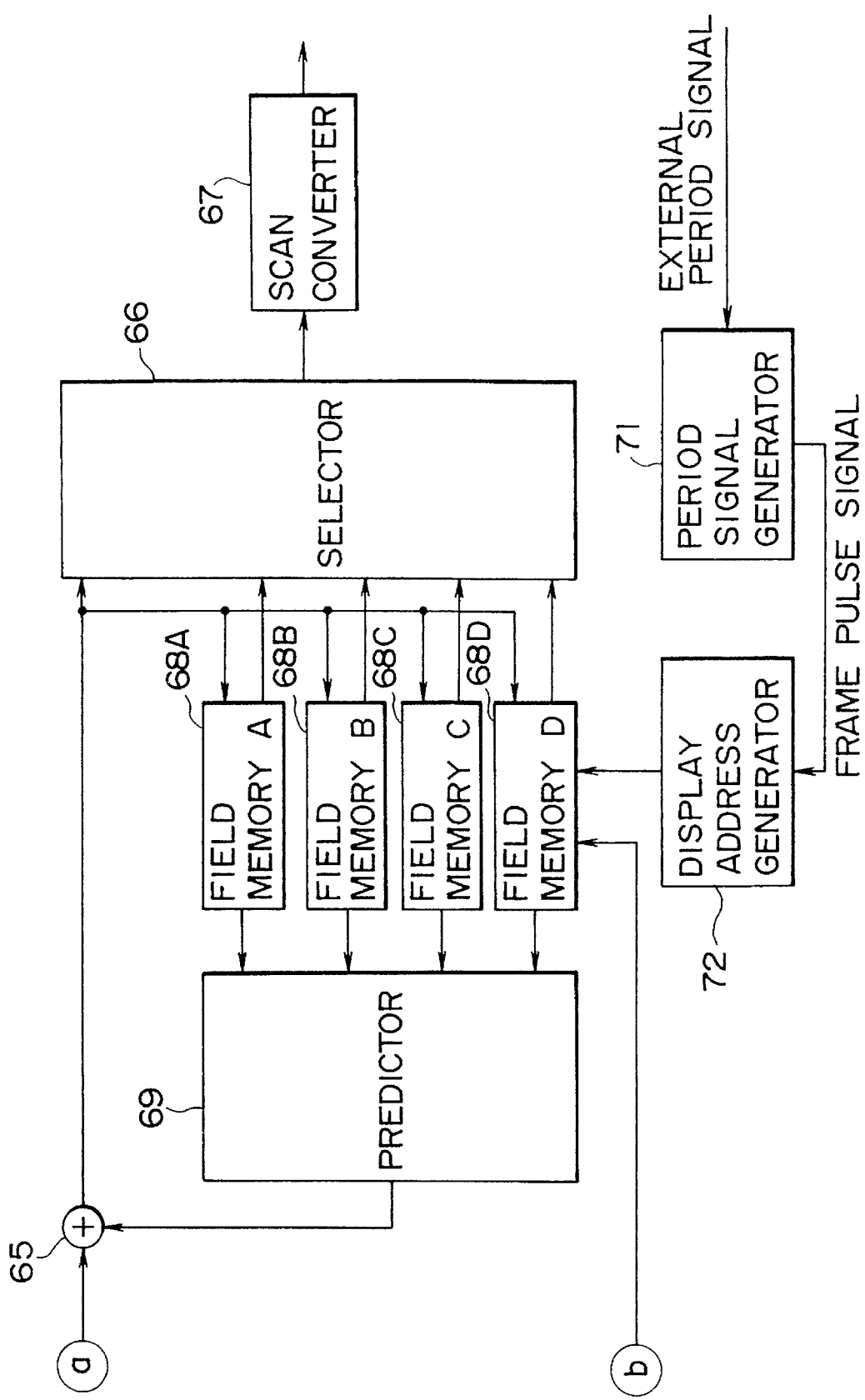
F I G. 52(B)

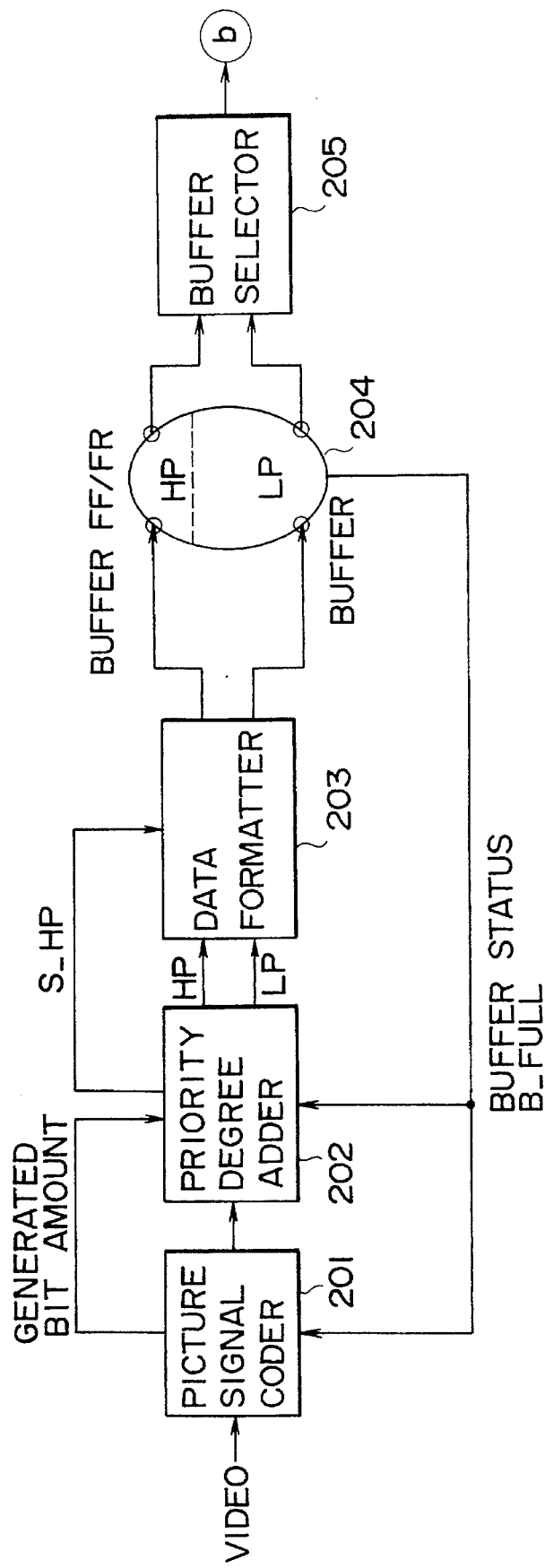
F I G. 54(A)

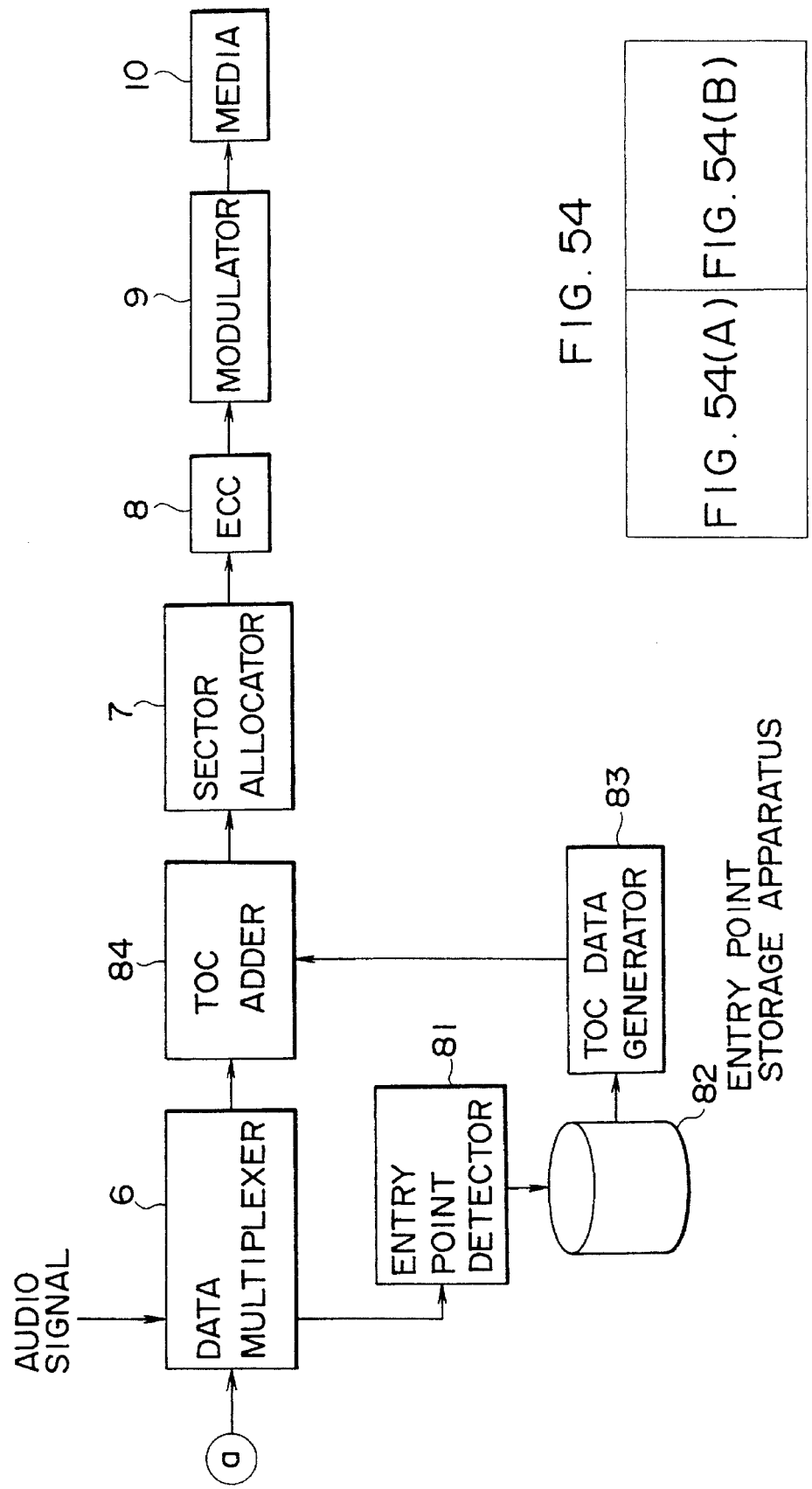

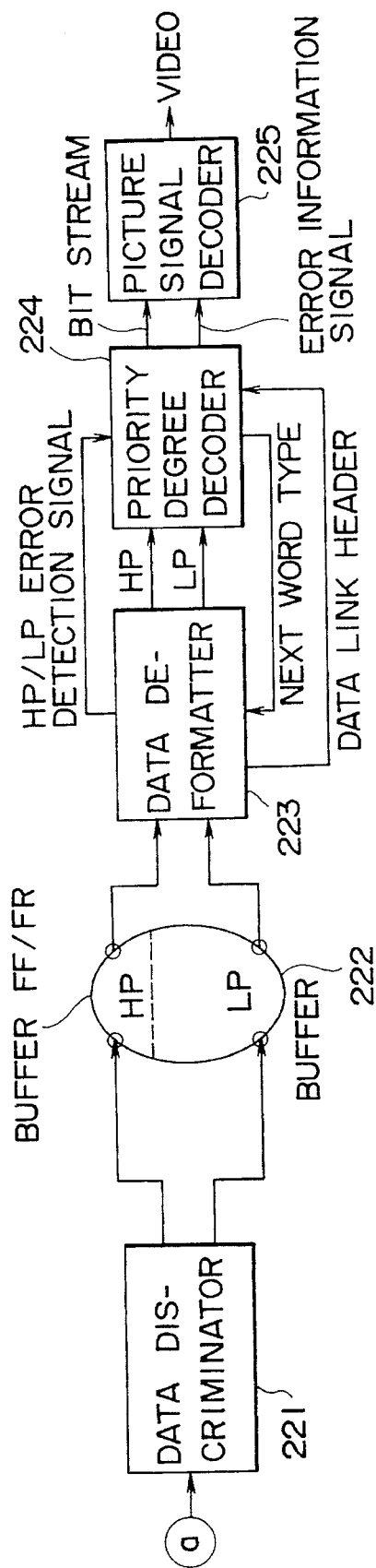
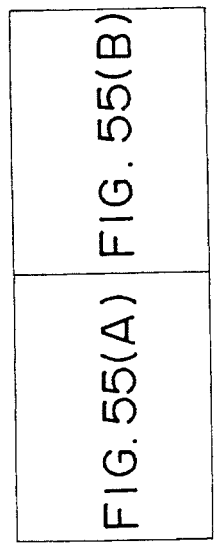

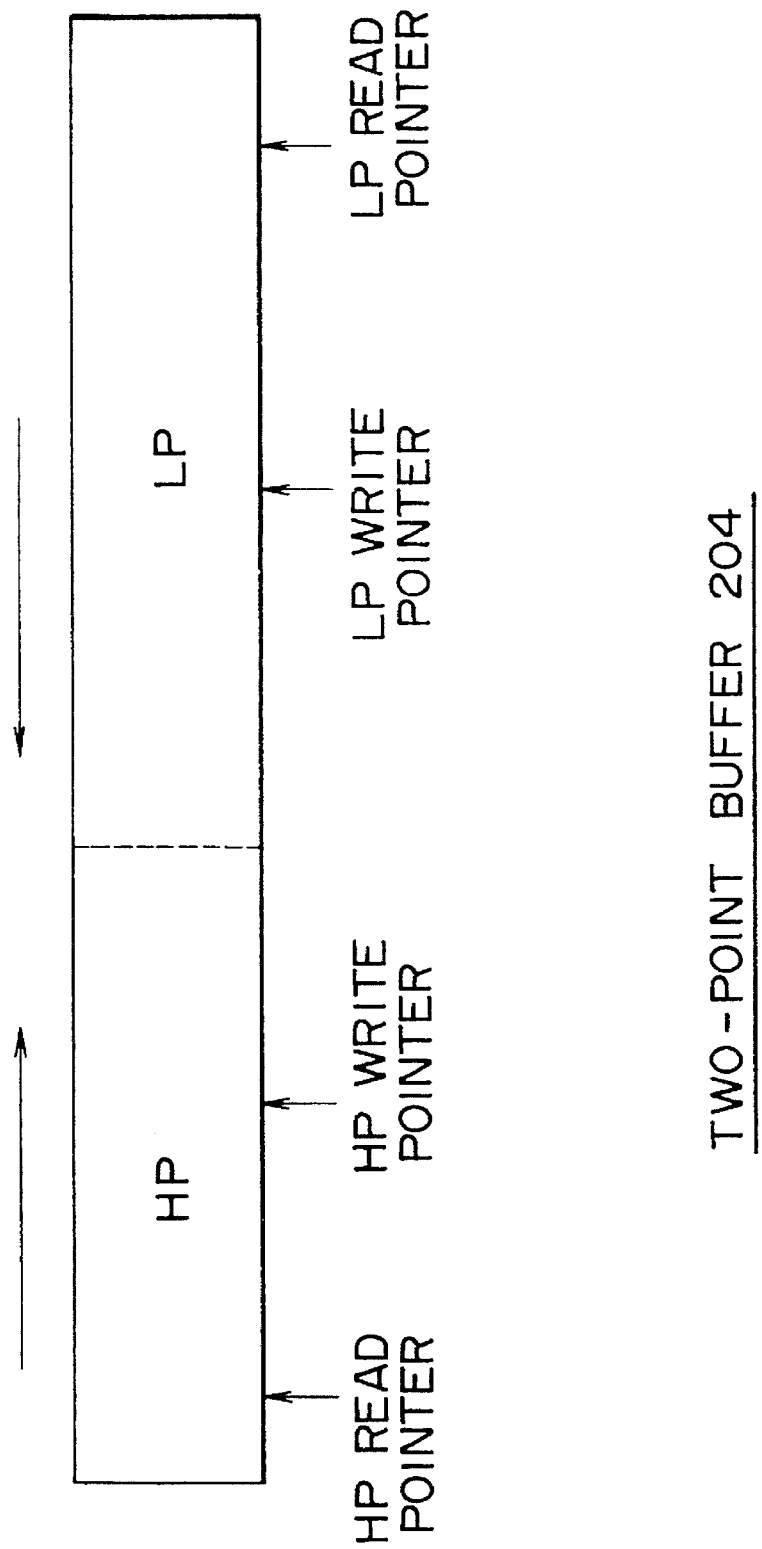

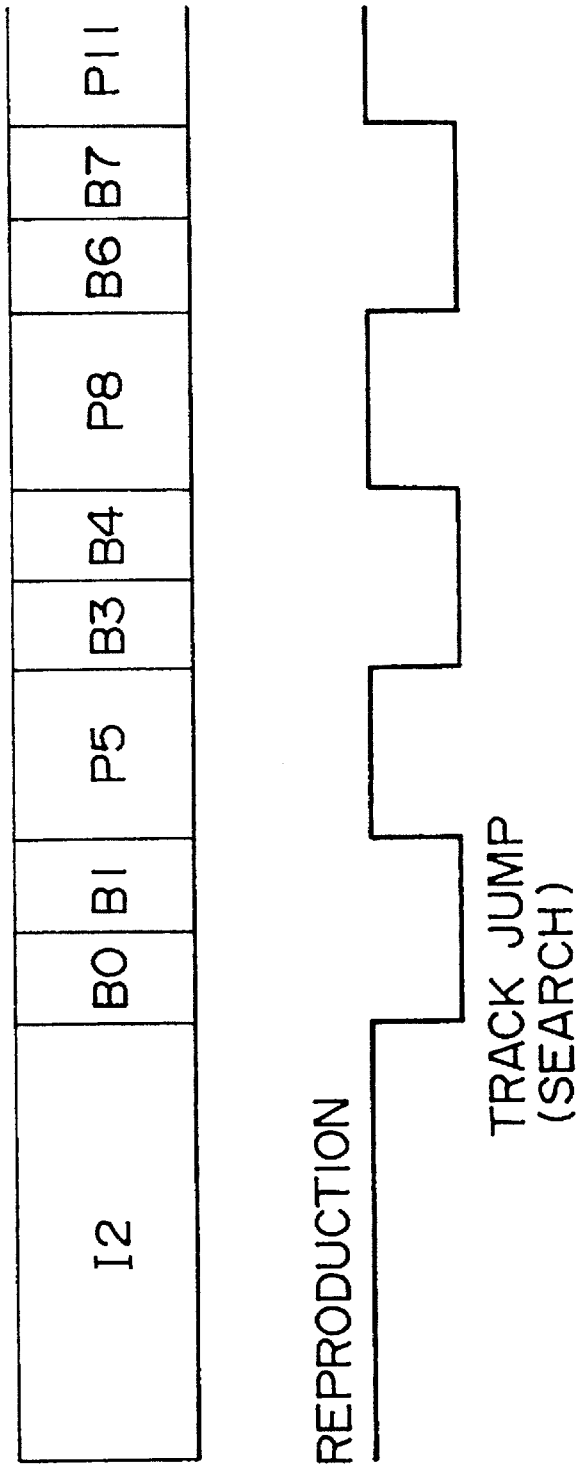

PICTURE SIGNAL CODING METHOD, DECODING METHOD AND PICTURE SIGNAL RECORDING MEDIUM

BACKGROUND OF THE INVENTION

1. Field of the Invention

This invention relates to a picture signal coding method and decoding method and a picture signal recording medium suitable for use to record and reproduce a coded moving picture signal onto and from a recording medium such as, for example, a compact disk or a hard disk.

2. Description of the Related Art

When it is tried to record and reproduce moving picture data, a recording medium having a very high continuous transmission rate is required since they involve a very great amount of information. At present, a video signal, for example, of the NTSC television system, is recorded onto and reproduced from a magnetic tape or an optical disk.

If it is tried to record a video signal for a long time onto a recording medium which has a comparatively small size and has a comparatively information recording capacity, then means is essentially required for coding and recording the video signal in a high efficiency and decoding a read signal of the thus recorded video signal in a high efficiency. In order to meet the requirement, several high efficiency coding systems which make use of correlations of a video signal have been proposed, and one of the systems is the MPEG (Moving Picture Experts Group) system. Details of the MPEG system are disclosed in AVC-400 TEST MODEL 3, ISO-IEC/JTC1/SC29/WG11, November, 1992. Another system wherein a coded signal is divided into high priority data and low priority data and then the high priority data and the low priority data are transmitted on different carriers from each other is investigated by the ATV of the United States.

In the MPEG system, a difference between picture frames of a video signal is taken first to decrease the redundancy in the time axis direction, and then an orthogonal transformation technique such as discrete cosine transform (DCT) is used to decrease the redundancy in the space axis direction. A video signal is coded efficiently in this manner and recorded onto a predetermined recording medium. Recording of a video signal coded in a high efficiency is disclosed, for example, in U.S. Pat. No. 5,140,437, U.S. Pat. No. 5,040,061, Japanese Laid-Open Patent No. 3-129979 and Japanese Laid-Open Patent No. 3-78380.

On the other hand, when a recording medium on which a video signal coded in a high efficiency is recorded in this manner is reproduced, the reproduction signal is transformed by inverse orthogonal transformation to decode it in a high efficiency to reproduce the video signal.

By the way, when a recording medium on which a video signal coded in a high efficiency is recorded in this manner is to be reproduced at a high speed (picture search), decoding is performed after each several frames and the thus decoded signal is outputted at a rate equal to that in ordinary reproduction.

However, in a coding method according to the MPEG system described above, coding is performed based on prediction of motion between frames. Consequently, some frames (P-pictures or B-pictures) cannot be decoded without a coded picture of another frame in the past or in the future with respect to the frame at present. Accordingly, it is not always possible to arbitrarily select frames of a picture signal to reproduce the picture signal at a high speed.

If only frames (I-pictures) which can be accessed and decoded directly are reproduced, then high speed reproduction of the picture signal is possible without waiting reproduction of some other frame or frames. However, the I-picture (intra-frame coded frame whose decoding is completed within the frame) is normally present by in only one frame of each ten and several frames (GOP which will be hereinafter described), and even if only such intra-frame coded frames are reproduced, only high speed reproduction with rough motion can be performed.

For example, a continuously inputted video signal is grouped into a GOP (Group of Pictures) which includes 15 frames. Then, as shown in FIG. 57, the first two frames of a GOP are processed as B-pictures (B0, B1), and then the next frame is processed as an I-picture (I2). Thereafter, coding processing is performed such that P-pictures (P5, P8, P11, P14) may be produced with two B-pictures (B3, B4, B6, B7, B9, B10, B12, B13) interposed between each two adjacent ones of them.

The data coded in this manner are transmitted in the order of I2, B0, B1, P5, B3, B4, PS, B6, B7, P11, B9, B10, P14, B12 and B13 as seen in FIG. 58. This is because, since, for example, each of the B-pictures B0 and B1 (or B3 and B4) requires, as a predictive frame, another frame I2 (P5) which appears later in time, it cannot be decoded if the frame I2 (P5) is not prepared in advance.

While high speed reproduction is possible if coding processing is performed at a high speed for all of the frames B0 to P14, this is substantially impossible due to a restriction in software to raise the decoding processing speed by several times.

Therefore, if each I-picture and each P-picture for which another frame preceding in time is used as a predictive frame are reproduced but no B-picture is reproduced as seen from FIG. 58, then finer high speed reproduction can be performed. The high speed reproduction method is disclosed in U.S. patent application Ser. No. 07/981,178 now U.S. Pat. No. 5,305,113. In this instance, however, so much time is required to effect track jumping to search a next P- or I-picture after another I- or P-picture has been reproduced that the high speed reproduction picture may possibly be interrupted. Further, a method wherein some of P-pictures and B-pictures are used in addition to I-pictures for high speed reproduction is disclosed in U.S. patent application Ser. No. 125,685 now U.S. Pat. No. 5,504,585. Further, a technique wherein an entry packet indicative of an access point upon high speed reproduction is inserted into a bit stream is disclosed in U.S. patent application Ser. No. 125,573 no U.S. Pat. No. 5,455,684.

Further, an I-picture involves a greater amount of data than P- and B-pictures and consequently data of I-pictures are read out, upon high speed reproduction, at a high frequency than upon ordinary reproduction. Consequently, there is a problem to be solved in that failure to read data of an I-picture sometimes occurs.

SUMMARY OF THE INVENTION

It is an object of the present invention to provide a picture signal coding method and decoding method and a picture signal recording medium which allow smooth (fine) high speed forward and reverse reproduction without raising the processing speed required for decoding.

In order to attain the object described above, according to the present invention, a picture signal is first coded, for example, in accordance with the MPEG system, and then data only of an I-picture or of both of an I-picture and a P-picture or P-pictures are treated as data for high speed reproduction separately from data of the other P-pictures and B-pictures and are collectively recorded in units of, for example, a GOP and at the top of the GOP or a sector. The data for high speed reproduction may be all of I- and P-pictures or may be those of such I- and P-pictures which are comparatively high in priority degree. Consequently, the number of jumping operations can be reduced and time wasted for waiting for inputting of data to be decoded can be reduced. Consequently, a high speed reproduction picture will not be interrupted. Further, the reading time for high speed reproduction can be reduced. In addition, when an error has occurred, for example, with the other data, data for high speed reproduction are reproduced at an ordinary speed. Consequently, the loss of a picture can be suppressed.

More particularly, according to an aspect of the present invention, there is provided a picture signal recording method, which comprises the steps of coding an input picture signal to produce a coded picture signal, dividing the coded picture signal into coded picture signals for high speed reproduction and the other coded picture signals, arranging the coded picture signals for high speed reproduction and the other coded picture signals so that the coded picture signals for high speed reproduction in a predetermined picture unit may be positioned at the top of the predetermined picture unit to produce a recording signal, and recording the recording signal onto a recording medium.

According to another aspect of the present invention, there is provided a picture signal recording method, which comprises the steps of coding an input picture signal to produce a coded picture signal, dividing the coded picture signal into coded picture signals for high speed reproduction and the other coded picture signals, successively arranging the coded picture signals for high speed reproduction and the other coded picture signals at a predetermined ratio to produce a recording signal, and recording the recording signal onto a recording medium.

According to a further aspect of the present invention, there is provided a picture signal recording method, which comprises the steps of coding an input picture signal to produce a coded picture signal, dividing the coded picture signal based on one picture into coded picture signals of a high priority degree and coded picture signals of a low priority degree, producing a recording signal of such a packet construction that the coded picture signals of a high priority degree and the coded picture signals of a low priority degree are not present in one packet, and recording the recording signal onto a recording medium.

According to a still further aspect of the present invention, there is provided a picture signal reproduction method, which comprises the steps of reproducing, from a recording medium on which a coded picture signal is recorded such that coded picture signals for high speed reproduction and the other coded picture signals are disposed so that the coded picture signals for high speed reproduction in a predetermined picture unit are positioned at the top of the predetermined picture unit, only the coded picture signals for high speed reproduction, and decoding only the coded picture signals for high speed reproduction thus reproduced to produce a decoded picture for high speed reproduction.

According to a yet further aspect of the present invention, there is provided a picture signal reproduction method, which comprises the steps of reproducing, from a recording medium on which a coded picture signal is recorded such that coded picture signals for high speed reproduction and the other coded picture signals are successively arranged at a predetermined ratio and the coded picture signal is allocated for each predetermined amount of codes to each sector, a sector to which the coded picture signals for high speed reproduction are allocated, separating, in response to a signal representative of a top address of the coded picture signals for high speed reproduction in a subcode of the sector, the coded picture signals for high speed reproduction and the other coded picture signals thus reproduced from the sector from each other, and decoding the thus separated coded picture signals for high speed reproduction to produce a decoded picture for high speed reproduction.

According to a yet further aspect of the present invention, there is provided a picture signal reproduction method, which comprises the steps of reproducing, from a recording medium on which coded picture signals of a high priority degree and coded picture signals of a low priority degree, into which a coded picture signal based on one picture is divided, are recorded in such a packet construction that the coded picture signals of a high priority degree and the coded picture signals of a low priority degree do not exist in a same packet, the coded picture signal, separating the coded picture signals of a high priority degree and the coded picture signals of a low priority degree from each other in response to an identification signal provided in a header of the packet for identification between the coded picture signals of a high priority degree and the coded picture signals of a low priority degree, and decoding only the coded picture signals of a high priority degree upon high speed reproduction.

According to a yet further aspect of the present invention, there is provided a picture signal reproduction method, which comprises the steps of reproducing, from a recording medium on which coded picture signals of a high priority degree and coded picture signals of a low priority degree, into which a coded picture signal based on one picture is divided, are recorded in such a packet construction that the coded picture signals of a high priority degree and the coded picture signals of a low priority degree do not exist in a same packet, the coded picture signal, separating the coded picture signals of a high priority degree and the coded picture signals of a low priority degree from each other in response to an identification signal provided in a header of the packet for identification between the coded picture signals of a high priority degree and the coded picture signals of a low priority degree, combining the coded picture signals of a high priority degree and the coded picture signals of a low priority degree in response to a link signal provided in the header of the packet to produce a combination signal, and decoding the combination signal to produce a decoded picture signal for ordinary reproduction.

According to a yet further aspect of the present invention, there is provided a picture signal recording medium, formed by the steps of coding an input picture signal to produce a coded picture signal, dividing the coded picture signal into coded picture signals for high speed reproduction and the other coded picture signals, arranging the coded picture signals for high speed reproduction and the other coded picture signals so that the coded picture signals for high speed reproduction in a predetermined picture unit may be positioned at the top of the predetermined picture unit to produce a recording signal, and recording the recording signal onto the recording medium.

According to a yet further aspect of the present invention, there is provided a picture signal recording medium, formed by the steps of coding an input picture signal to produce a coded picture signal, dividing the coded picture signal into coded picture signals for high speed reproduction and the other coded picture signals, successively arranging the coded picture signals for high speed reproduction and the other coded picture signals at a predetermined ratio to produce a recording signal, and recording the recording signal onto a recording medium.

According to a yet further aspect of the present invention, there is provided a picture signal recording medium, formed by the steps of coding an input picture signal to produce a coded picture signal, dividing the coded picture signal based on one picture into coded picture signals of a high priority degree and coded picture signals of a low priority degree, producing a recording signal of such a packet construction that the coded picture signals for high speed reproduction and the other coded picture signals are not present in one packet, and recording the recording signal onto a recording medium.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 14 is a diagrammatic view illustrating operation of a buffer selector of the image signal decoding apparatus shown FIG. 12;

FIG. 21 is a diagrammatic view illustrating TOC data employed in a fourth embodiment of the present invention;

FIG. 25 is a block diagram showing an example of construction of a picture signal coder of the picture signal coding apparatus shown in FIG. 24;

FIG. 39 is a flow chart illustrating operation of the image signal decoding apparatus shown in FIG. 36 upon ordinary reproduction;

FIG. 45 is a table illustrating the degree of priority of data in the image signal coding apparatus shown in FIG. 42;

FIG. 47 is a diagrammatic view showing a sequence header, a picture header and a slice header;

FIG. 49 is a diagram illustrating operation of a two-point buffer of the image signal coding apparatus shown in FIG. 42;

FIG. 50 is a block diagram showing the construction of a yet further image signal decoding apparatus to which the present invention is applied;

FIG. 52 is a block diagram showing an example of construction of a picture signal decoder of the image signal decoding apparatus shown in FIG. 50;

FIG. 54 is a block diagram showing a yet further picture signal coding apparatus to which the present invention is applied;

FIG. 56 is a diagrammatic view showing another example of construction of the two-point buffer of the image signal coding apparatus shown in FIG. 42;

DETAILED DESCRIPTION OF THE PREFERRED EMBODIMENTS

<First Embodiment>

Figure 1A:
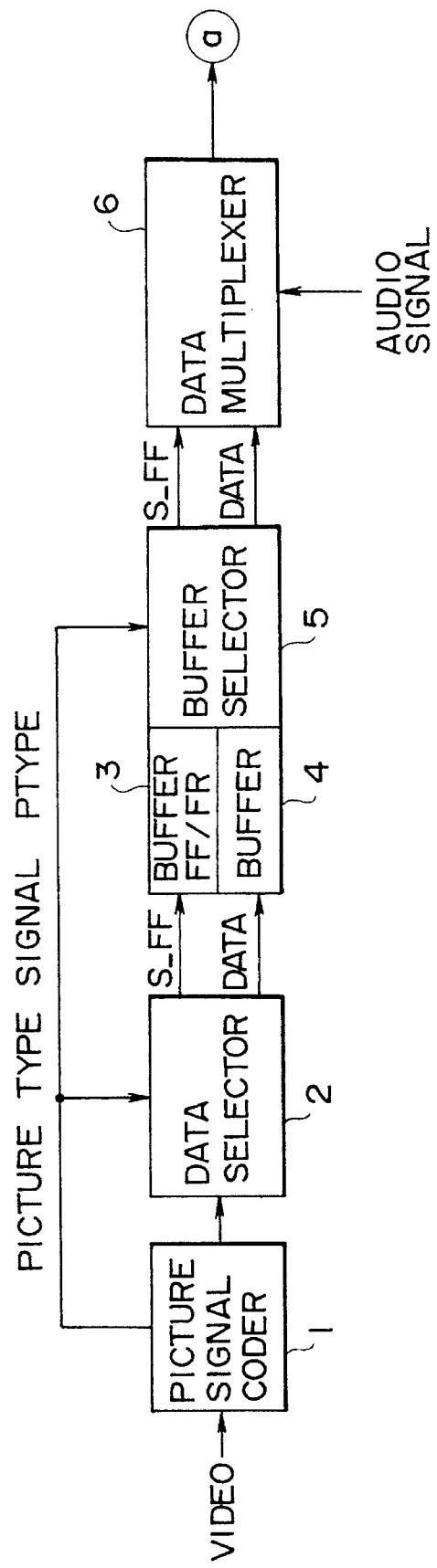
FIG. 1 is a block diagram of a picture signal coding apparatus in accordance with an embodiment of the present invention.

Referring first to FIG. 1, there is shown a picture signal coding apparatus or encoder to which the present invention is applied. A video signal to be transmitted is inputted to a picture signal coder 1, in which it is coded, for example, in accordance with the MPEG system.

Figure 2B:
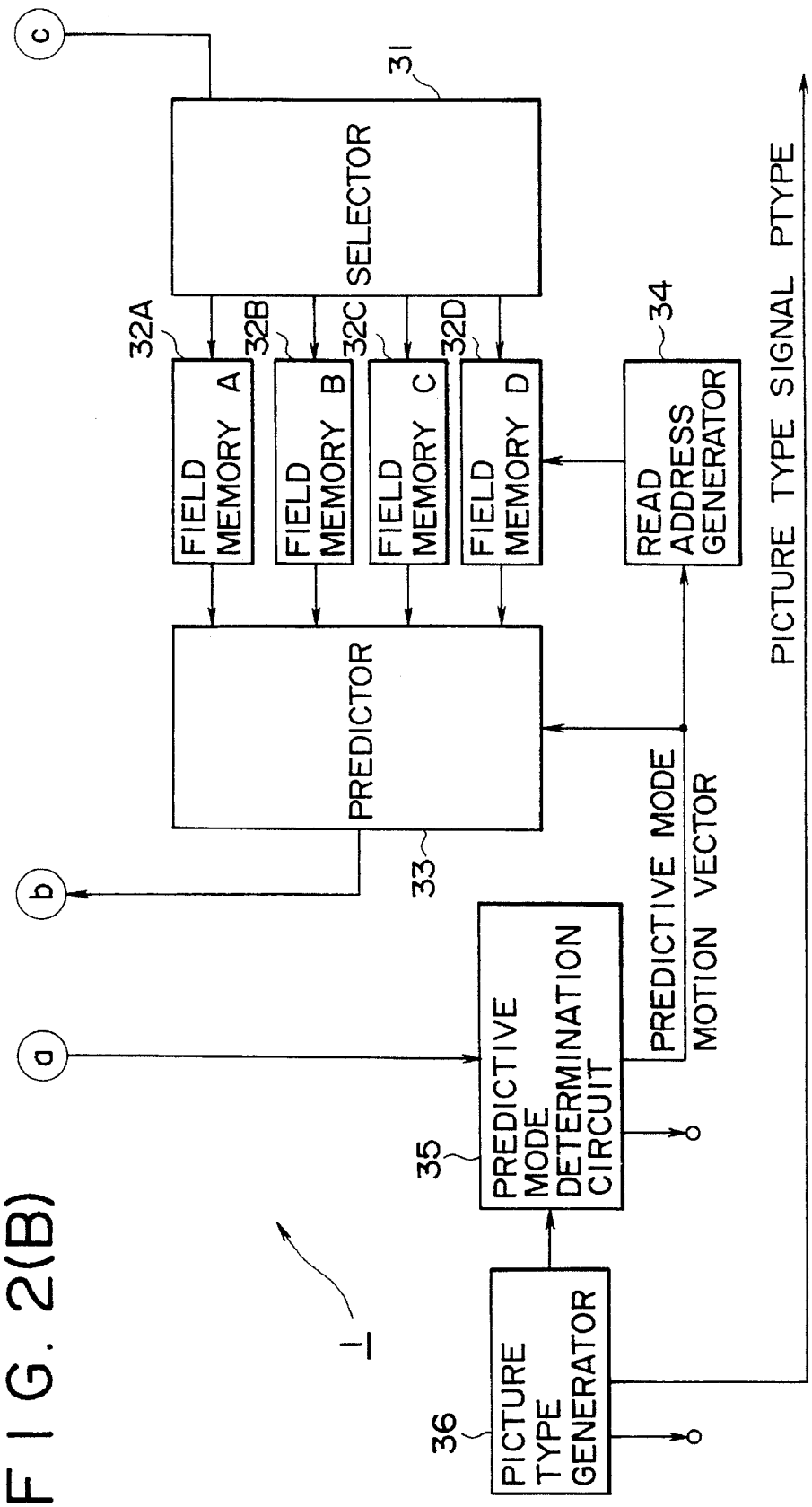
FIG. 2 is a block diagram showing an example of construction of a picture signal coder of the picture signal coding apparatus shown in FIG. 1.

The picture signal coder 1 may be constructed in such a manner as shown in FIG. 2.

Referring to FIG. 2, a video signal is inputted to a blocking circuit 21, in which the format thereof is converted from a standard format, for example, of the NTSC system into a block format which includes a macro block unit of, for example, 16×16 picture elements. The data converted into data of the block format are inputted to a motion prediction circuit 22 and then transmitted to a difference detector 23. To the difference detector 23, picture data to which motion compensation has been performed are supplied from field memories 32A to 32D by way of a predictor 33. The difference detector 23 detects and outputs a difference between the two inputs there of.

The output of the difference detector 23 is sent to a DCT (discrete cosine transform) circuit 24 which performs DCT processing as orthogonal transformation. DCT coefficient data obtained by DCT processing by the DCT circuit 24 are sent to and quantized by a quantizer 25. The quantized data from the quantizer 25 are outputted as coded data to a data selector 2 (FIG. 1) by way of a variable length coder 26, which performs variable length coding processing such as, for example, so-called Huffman coding or run-length coding and a buffer 27. It is to be noted that the variable length coder 26 also codes control information necessary for decoding such as a predictive mode, a motion vector and a picture type.

In order to prevent an overflow or an underflow of the buffer 27, a signal representative of an accumulated amount of data in the buffer 27 is fed back from the buffer 27 to the quantizer 25. In response to the signal, the quantizer 25 determines a quantization step so that the accumulated data amount may not cause an overflow or an underflow of the buffer 27.

The quantized data outputted from the quantizer 25 are inputted also to a dequantizer 38, by which dequantization processing complementary to the quantization processing by the quantizer 25 is performed. The output of the dequantizer 25 is processed by IDCT (inverse DCT) processing complementary to the DCT processing by the DCT circuit 24 by an IDCT circuit 29. The output of the IDCT circuit 24 is supplied to an adder 30.

The adder 30 adds the output of the IDCT circuit 29 and data obtained by motion prediction of the outputs of the field memories 32A to 32D by the predictor 33. The output of the adder 30 is supplied to and stored into one of the field memories 32A to 32D by way of a selector 31.

Meanwhile, the motion prediction circuit 22 detects, in units of a macro block, an absolute difference sum of a motion vector between pictures (frames), a predictive picture corresponding to the motion vector and picture elements of an object picture for coding and detects a predictive error in intra-picture prediction which is a difference between an absolute value of the sum of picture elements of the object picture (frame) for coding and the sum of absolute values of the picture elements. The motion prediction circuit 22 outputs the thus detected data (the data of the motion vector between the pictures, the data of the absolute value difference sum and the predictive error in intra-picture prediction) to a predictive mode determination circuit 35.

The motion predictive mode determination circuit 35 determines, for example, one of the following motion predictive modes in units of a macro block.

1. Forward predictive mode from a preceding frame preceding in time

2. Bidirectional predictive mode from two frames including a preceding frame preceding in time and a succeeding frame succeeding in time (a reference macro block from a preceding frame and another reference macro block from a succeeding frame are calculated for each one picture element by linear calculation (for example, average value calculation))

3. Rearward predictive mode from a succeeding frame

4. Intra-frame (intra-picture) coding mode in which an object frame for coding is coded as it is without using any other frame)

For an I-picture, intra-frame coding is completed within the frame. A P-picture is predicted from a frame (I-picture or P-picture) preceding in time (in the past). Further, a B-picture is predicted from a frame (I-picture and P-picture) preceding in time (in the past) and another frame (I-picture or P-picture) succeeding in time (in the future).

Figure 3:
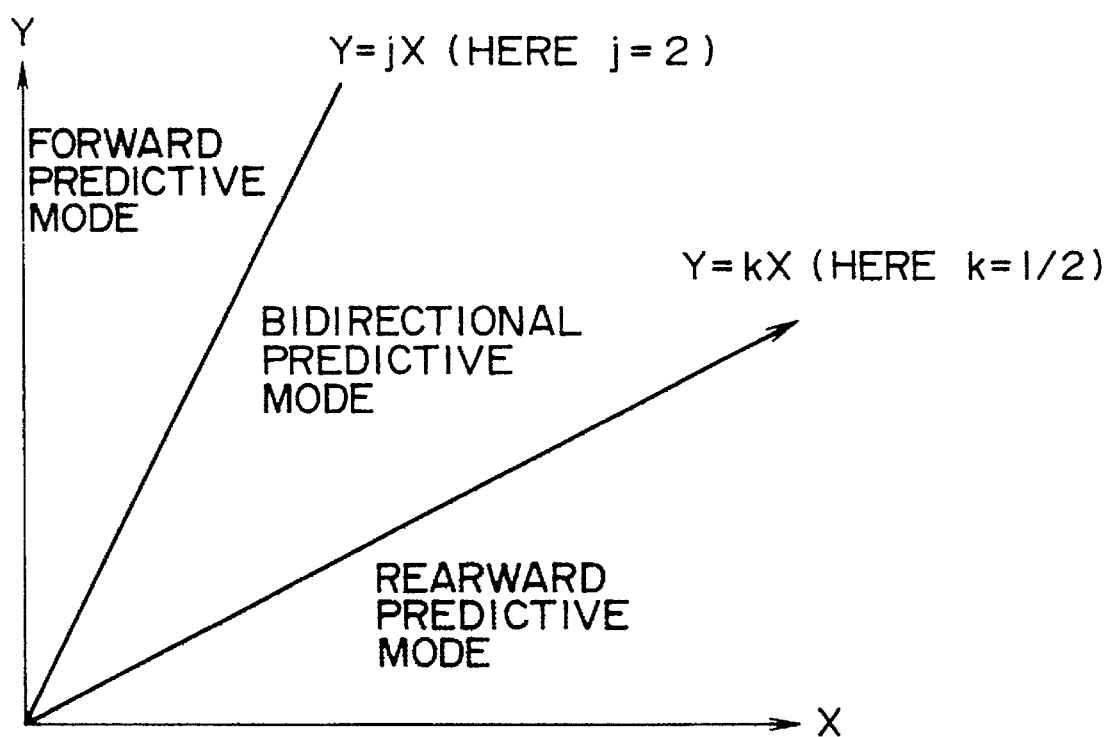
FIG. 3 is a diagram illustrating operation of a predictive mode determination circuit of the image signal coder shown in FIG. 2.

Here, a method of determining a predictive mode for a P- or B-picture in units of a macro block will be described in more detail with reference to FIG. 3.

Where the absolute difference sum of a predictive picture from a preceding frame calculated by the motion vector prediction circuit 22 is represented by X and the absolute difference sum of a predictive picture from a succeeding frame is represented by Y, when a B-picture is to be coded, if $Y > jX$ (j is, for example, 2), then the forward predictive mode is selected as seen from FIG. 3. On the other hand, if $Y < kX$ (k is, for example, ½), then the rearward predictive mode is selected, but if $kX \leq Y \leq jX$, then the bidirectional predictive mode is selected.

It is to be noted that a predictive mode is determined in such a manner as described above when the smaller one of X and Y is smaller than a predictive error by intra-picture prediction, but when the smaller one of X and Y is larger than a predictive error by intra-frame prediction, a B-picture is coded by intra-frame (intra-picture) coding.

When a P-picture is to be coded, if X is smaller than a predictive error by intra-picture prediction, then the forward predictive mode is selected, but otherwise, the intra-frame predictive coding mode is selected.

To a read address generator 34 and the predictor 33 which is connected to the field memories 32A to 32D, predictive mode data and a motion vector from the predictive mode determination circuit 35 are supplied. The read address generation circuit 34 varies its read address in response to the data. Consequently, data for which motion compensation has been performed are outputted from the predictor 33.

A picture type generator 36 generates a picture type signal PTYPE (identification signal indicating which one of I-, P- and B-pictures the picture is to be processed) in response to a sequence of a picture type inputted thereto from an inputting section (not shown), and outputs the picture type signal PTYPE to the predictive mode determination circuit 35, the data selector 2 and the buffer selector 5 (FIG. 1).

Referring back to FIG. 1, a picture signal outputted from the buffer 27 of the picture signal coder 1 in this manner is inputted to the data selector 2. The data selector 2 separates data for high speed reproduction from the other data.

Figure 4:
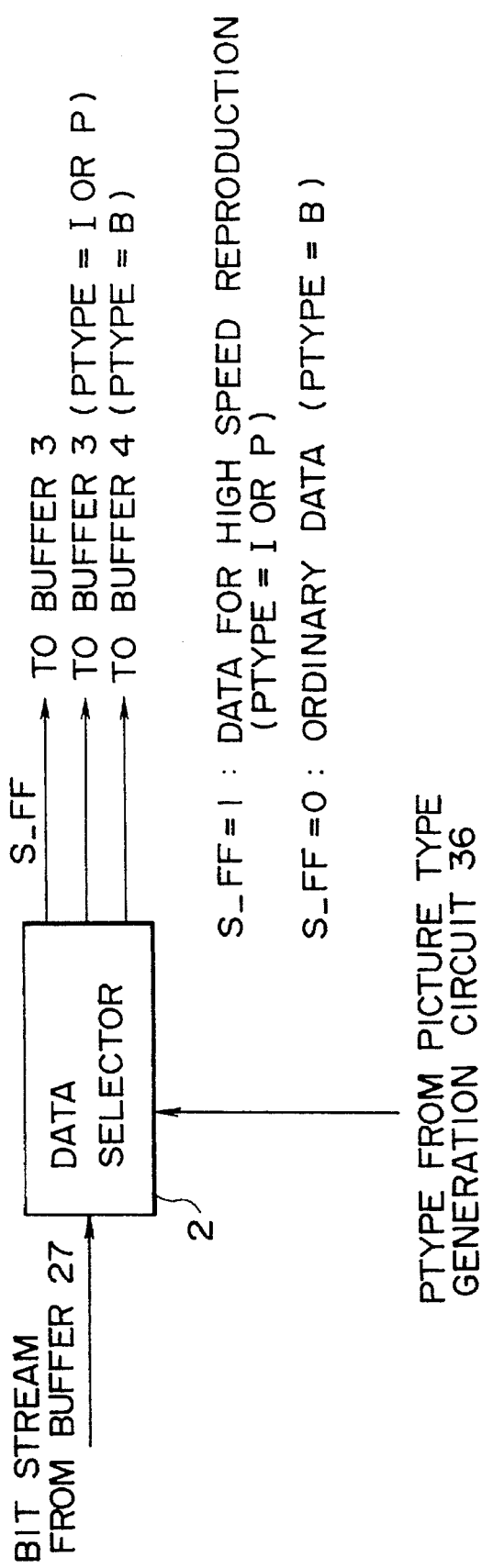
FIG. 4 is a diagrammatic view illustrating operation of a data selector of the picture signal coding apparatus shown in FIG. 1.
Figure 5:
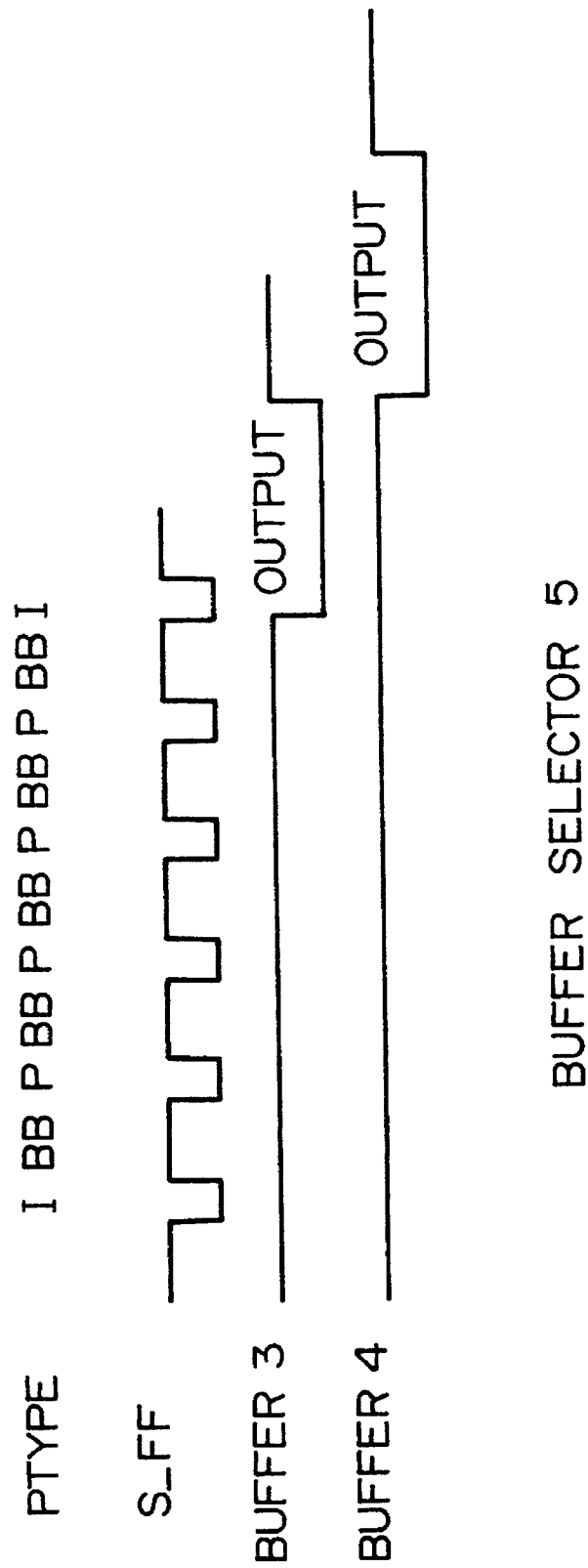
FIG. 5 is a time chart illustrating operation of a buffer selector of the picture signal coding apparatus shown in FIG. 1.

In particular, referring now to FIG. 4, the data selector 2 supplies data of I-pictures and P-pictures in response to a picture type signal PTYPE from the picture type generation circuit 36 (FIG. 2) and supplies the data as data for high speed reproduction to a buffer 3. Further, the data selector 2 supplies data of B-pictures as the other data (data other than the data for high speed reproduction) to another buffer 4. Further, the data selector 2 generates an identification flag (data mode signal) S_FF, which has the value 1 for data for high speed reproduction but has the value 0 for any other data.

Figure 57:
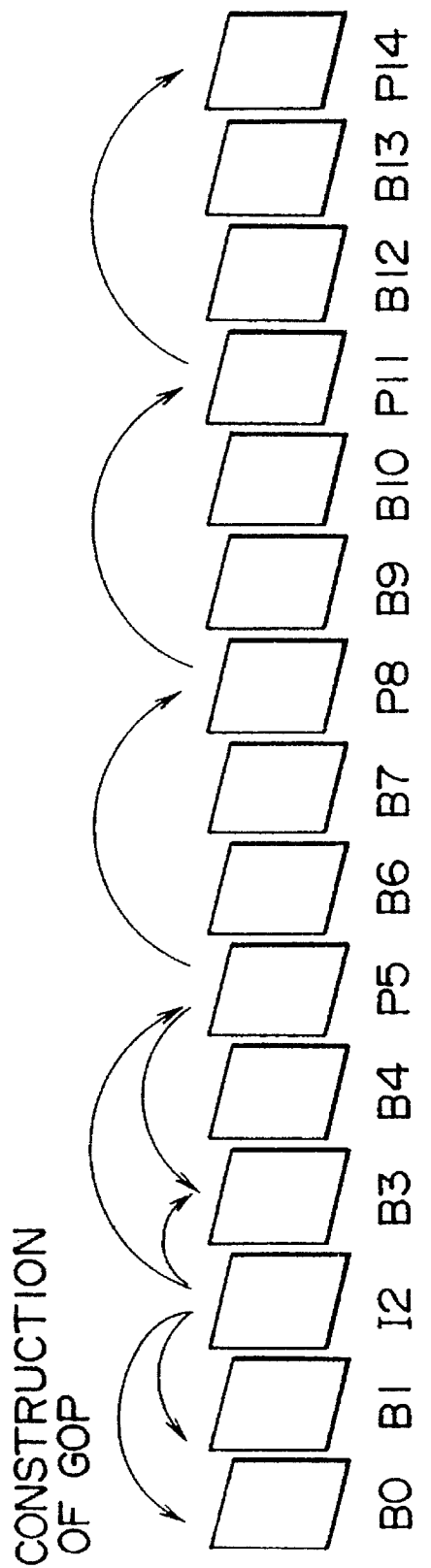
FIG. 57 is a diagrammatic view illustrating the construction of a conventional GOP.
Figure 58:
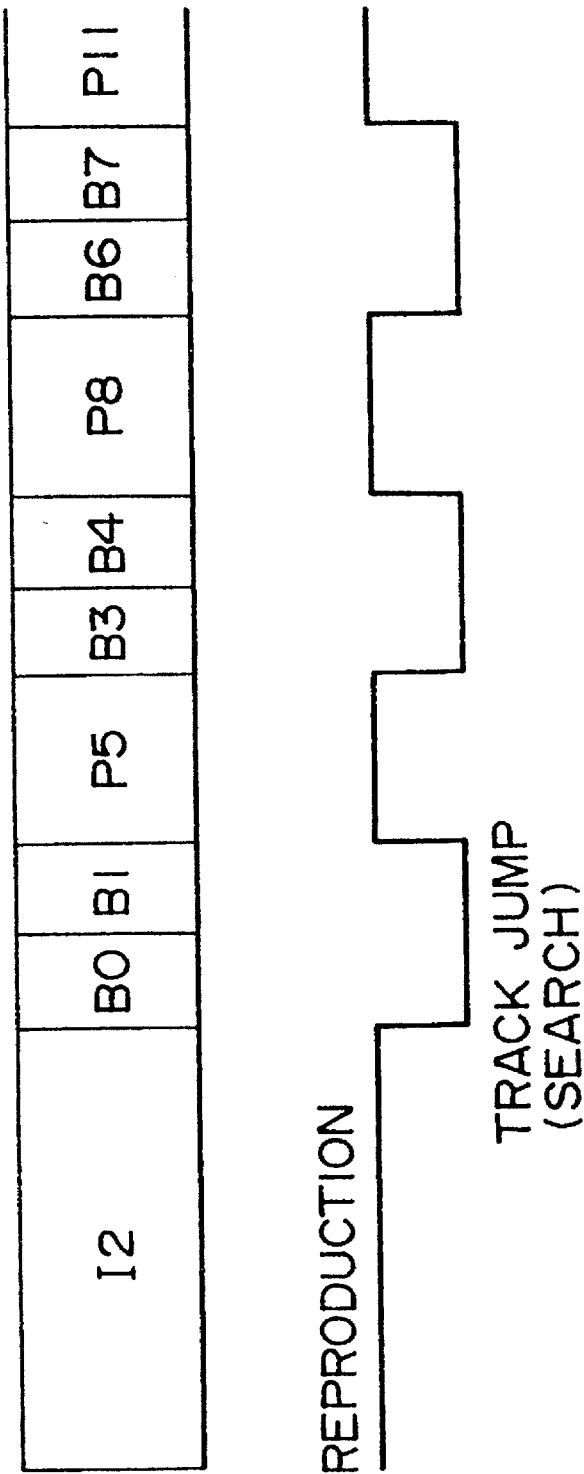
FIG. 58 is a time chart illustrating conventional coding processing upon high speed reproduction.

Also in the picture signal decoding apparatus shown in FIG. 1, a GOP is constituted from pictures of 15 frames B0 to P14 as shown in FIG. 57. The picture signal coder 1 performs coding in the order of the frames I1, B0, B1, P5, B3, B4, P8, B6, B7, P11, B9, B10, P14, B12 and B13 and outputs the data in this order. Of the data, the data of the frames I2, P5, P8, P11 and P14 are written into the buffer 3 in response to the picture type signal PTYPE from the picture type generator 36 while the data of the frame B0, B1, B3, B4, B6, B7, B9, B10, B12 and B13 are written into the buffer 4.

After data of one GOP are written, the buffer selector 5 successively reads out the data for high speed reproduction written in the buffer 3 first, and then reads out the other data written in the buffer 4, and then outputs the data to a data multiplexer 6. The data multiplexer 6 multiplexes the picture data inputted thereto from the buffer selector 5 with audio data supplied thereto from a circuit not shown.

The thus multiplexed signal is inputted to a sector allocator 7, which allocates the signal to sectors on a recording medium 10 (such as a disk) for each fixed amount of data. The sector allocator 7 further codes and transmits a data mode signal S_FF indicative of whether or not the data are data for high speed reproduction.

Figure 6:
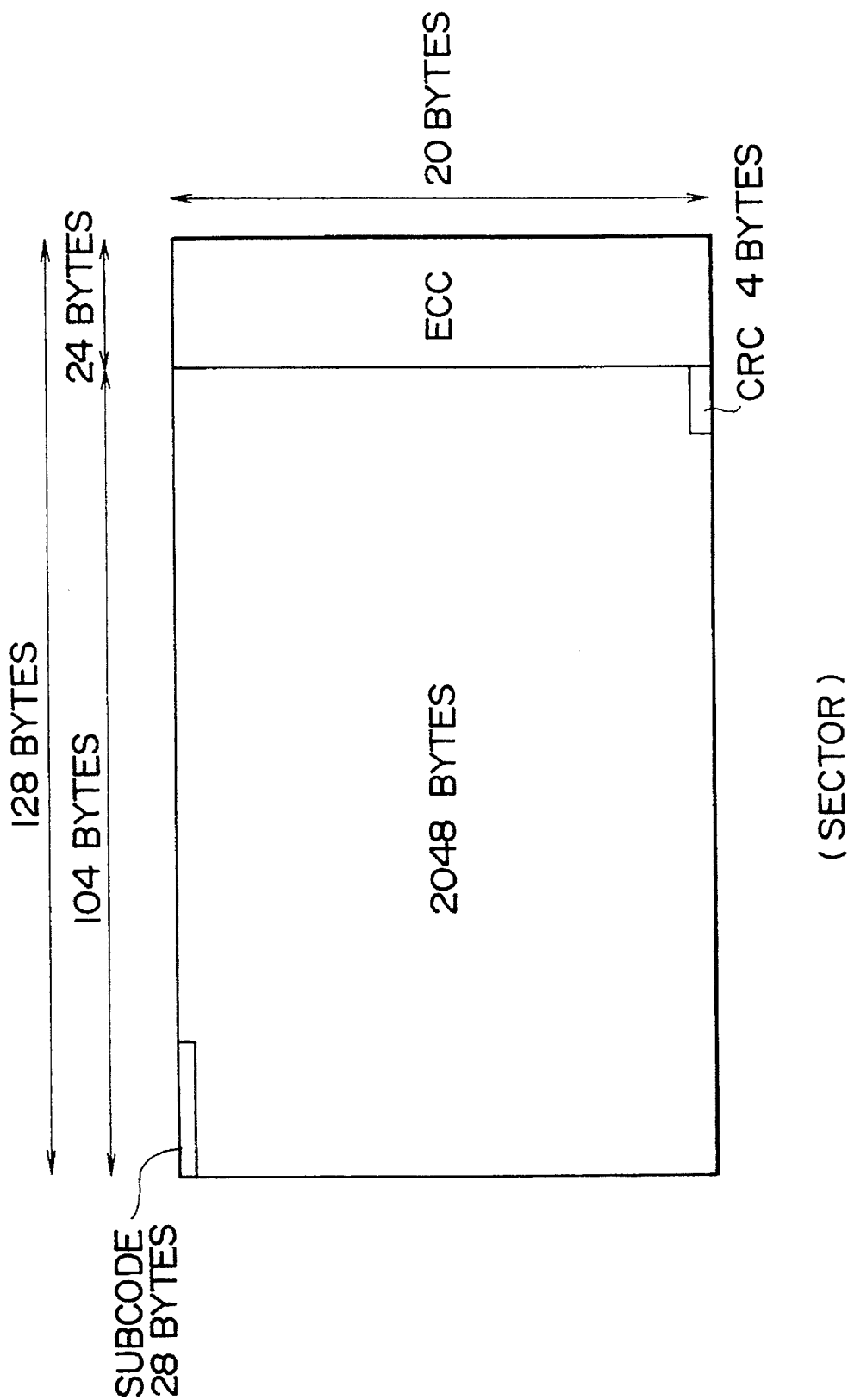
FIG. 6 is a diagrammatic view of an example of construction of a sector illustrating operation of a sector allocator of the picture signal coding apparatus shown in FIG. 1.

The format of each sector is constructed, for example, in such manner as shown in FIG. 6. Each of sectors has a subcode (Subcode) of 28 bytes indicative of contents of the sector added to the top thereof.

Figure 7:
FIG. 7 is a diagrammatic view showing a subcode format upon recording into the sector shown in FIG. 6.
Figure 8:
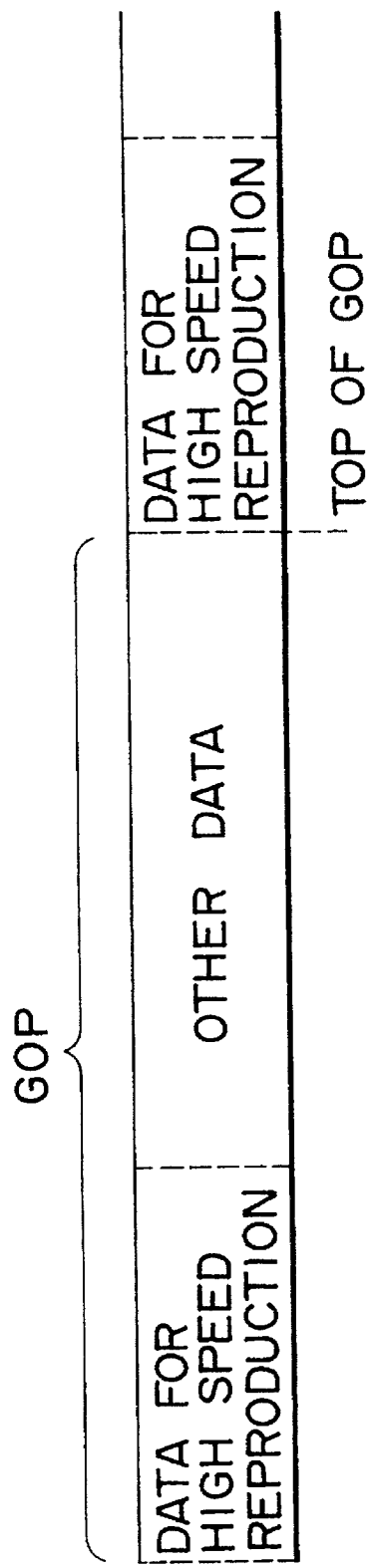
FIG. 8 is a diagrammatic view illustrating an arrangement of data for high speed reproduction and other data by the picture signal coding apparatus shown in FIG. 1.

The format of a subcode is defined, for example, as shown in FIG. 7. A sector mark (Sector Mark) is disposed at the top of the subcode, and a sector address (Sector Address) and a time code (Time Code) are disposed subsequently to the sector mark. Then, a data mode signal S_FF described above is disposed subsequently to the time code.

Referring again to FIG. 1, data allocated in units of a sector in such a manner as described above are inputted from the sector allocator 7 to an error detection and correction circuit (ECC) circuit 8, by which an error detection correction code is added to the data. The output of the ECC circuit 8 is inputted to a modulator 9, by which it is modulated in accordance with a predetermined system. The output of the modulator 9 is transmitted to a transmission line (and for example, recorded onto a recording medium 10).

Figure 9:
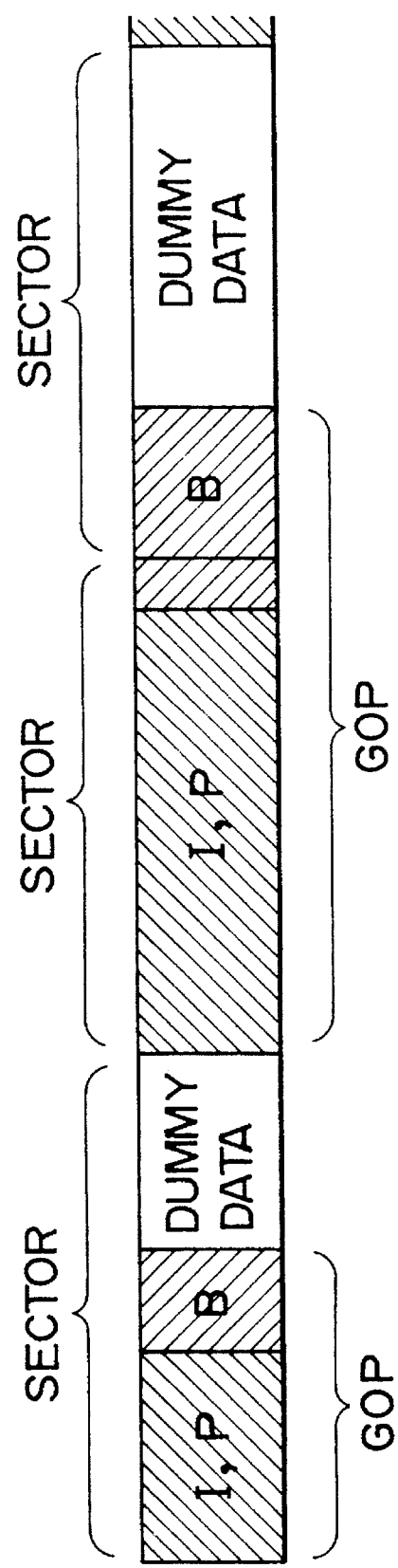
FIG. 9 is a diagrammatic view illustrating the positional relationship between data for high speed reproduction and sectors in the picture signal coding apparatus shown in FIG. 1.

In the image signal coding apparatus described above, data for high speed reproduction (data of an I-picture and P-pictures) of each GOP are always disposed at the top of the sector. However, since the data length of each GOP is not necessarily fixed, when data of a GOP are used up intermediately in a sector, dummy data are added to the sector as seen from FIG. 9. In this manner, data for high speed reproduction of each GOP are always disposed at the top of the sector.

Figure 10:
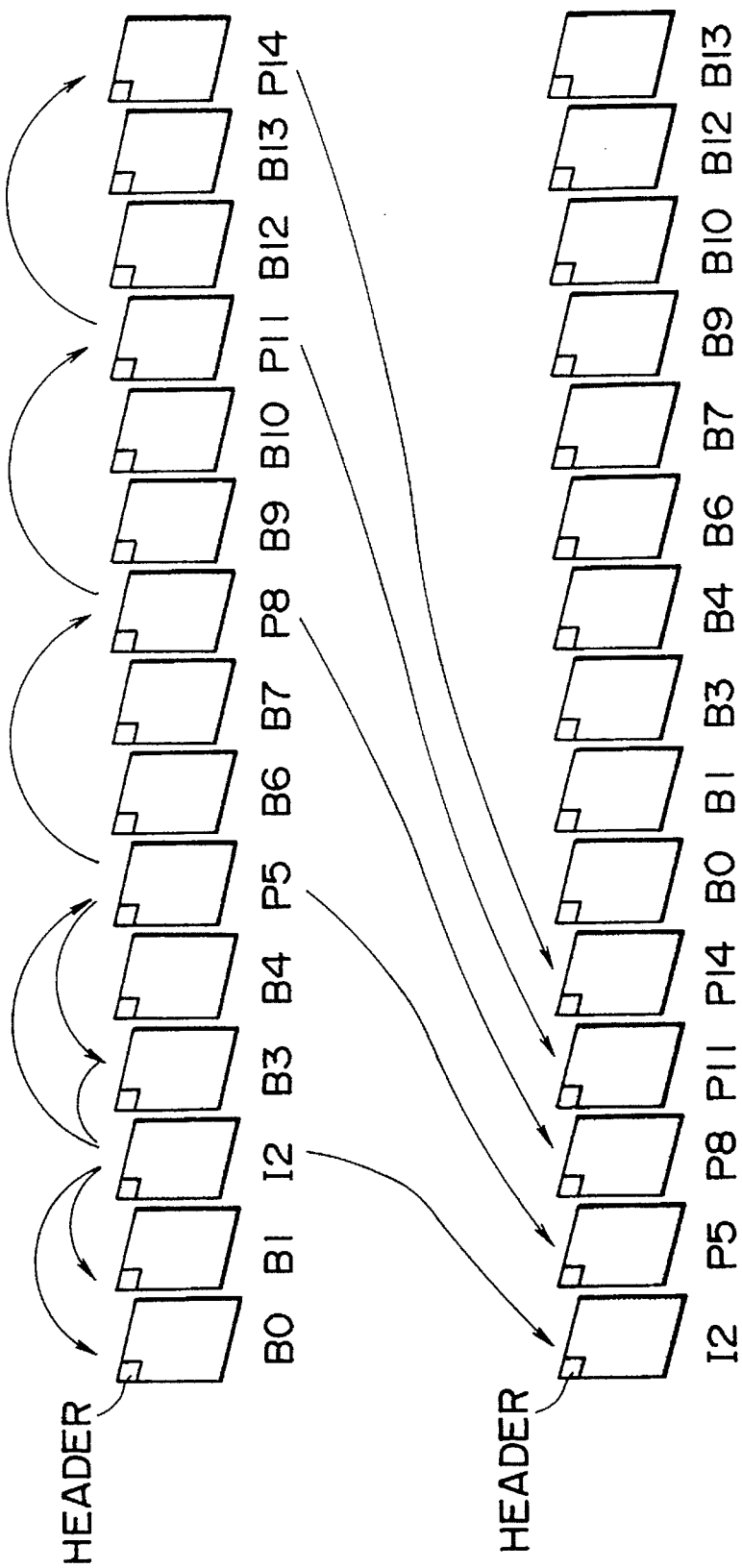
FIG. 10 is a diagrammatic view illustrating the relationship between a GOP and pictures for high speed reproduction in the picture signal coding apparatus shown in FIG. 1.

As a result, on the recording medium 10, frames of a signal inputted to the picture signal coder 1 in the order of the frames B0 to P14 are recorded in the order of the frames I2, P5, P8, P11, P14 (frames for high speed reproduction), B0, B1, B3, B4, B6, B7, B9, B10, B12 and B13 (the other frames) as shown in FIG. 10. In other words, the data for high speed reproduction are recorded collectively in units of a GOP at the top of each sector.

Figure 11B:
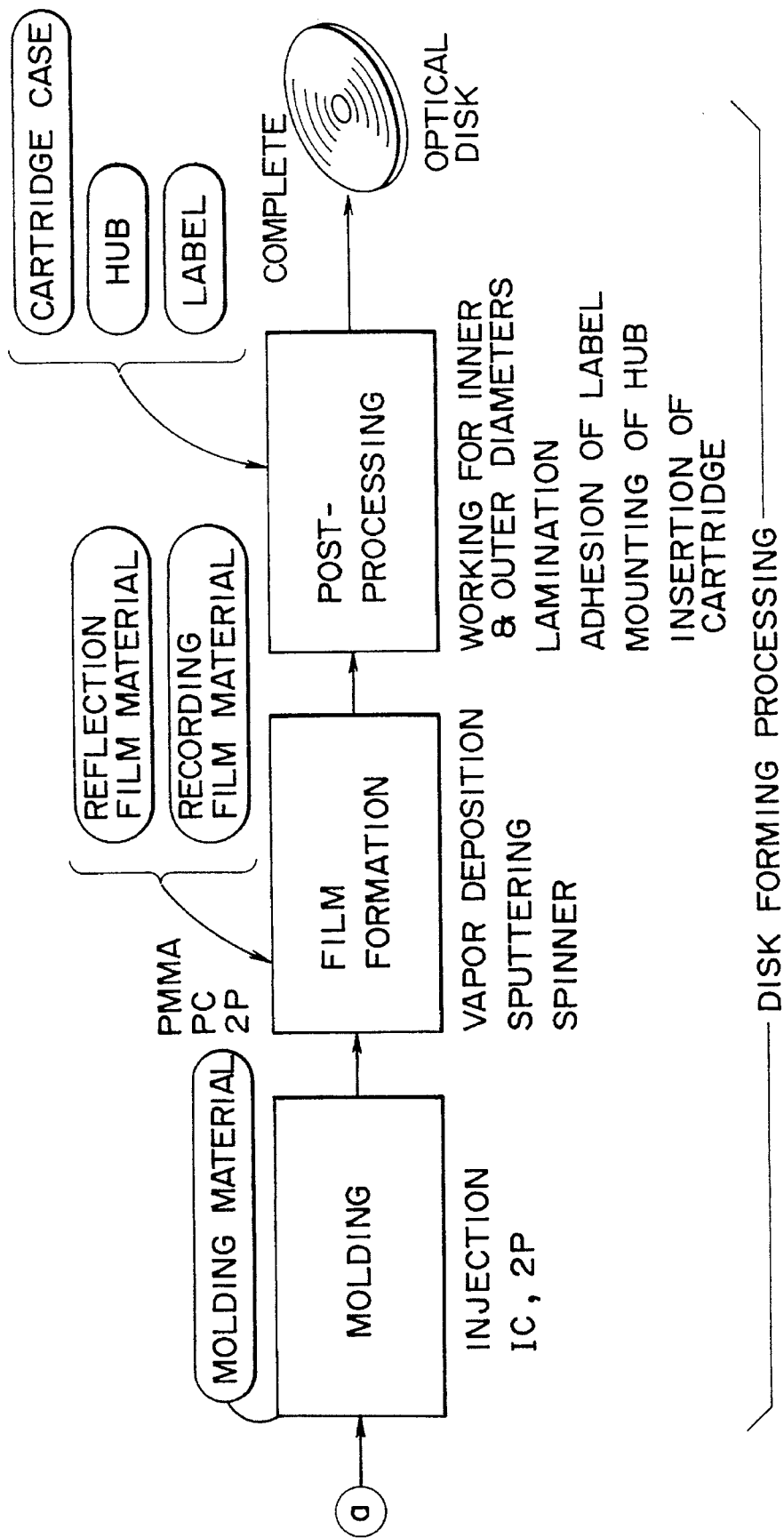
FIG. 11 is a block diagram illustrating a process of manufacturing an optical disk to which the present invention is applied.

Here, where the recording medium 10 is, for example, an optical disk, it is manufactured in such a manner as illustrated in FIG. 11. In particular, referring to FIG. 11, an original plate made of, for example, glass is prepared, and a recording material such as, for example, a photoresist is applied to the original plate. Consequently, a recording original plate is completed.

Meanwhile, a bit stream (software) obtained by the processing by the picture signal coding apparatus of FIG. 1 described above is edited (pre-mastering) when necessary so that a signal of a format to be recorded onto an optical disk is produced. Then, a laser beam is modulated in response to the recording signal and irradiated upon the photoresist on the original plate to record the recording signal on the photoresist on the original plate.

Thereafter, the original plate is developed so that pits are produced on the original plate. The original plate prepared in this manner is processed, for example, by electroforming to produce a metal original plate to which the pits on the glass original plate are transferred. A metal stamper is produced from the metal original plate and is used as a metal mold for molding.

Such a material as PMMA (acrylic) or PC (polycarbonate) is injected, for example, by injection into the metal mold and then left to cure. Otherwise a material such as 2P (resin which cures with ultraviolet rays) may be applied to the metal stamper and then ultraviolet rays are irradiated upon the metal stamper to cause the material to cure. Consequently, the pits on the metal stamper can be transferred to the replica made of a resin.

A reflection film is formed by vapor deposition, sputtering or a like means on the replica produced in this manner. Otherwise, the such reflection film may be formed by spin coating.

Thereafter, necessary processing such as working for inner and outer diameters or lamination of two disks is performed. Further, a label is adhered to and a hub is mounted onto the disk, and the disk is inserted into a cartridge. The optical disk is completed in this manner.

Figure 12A:
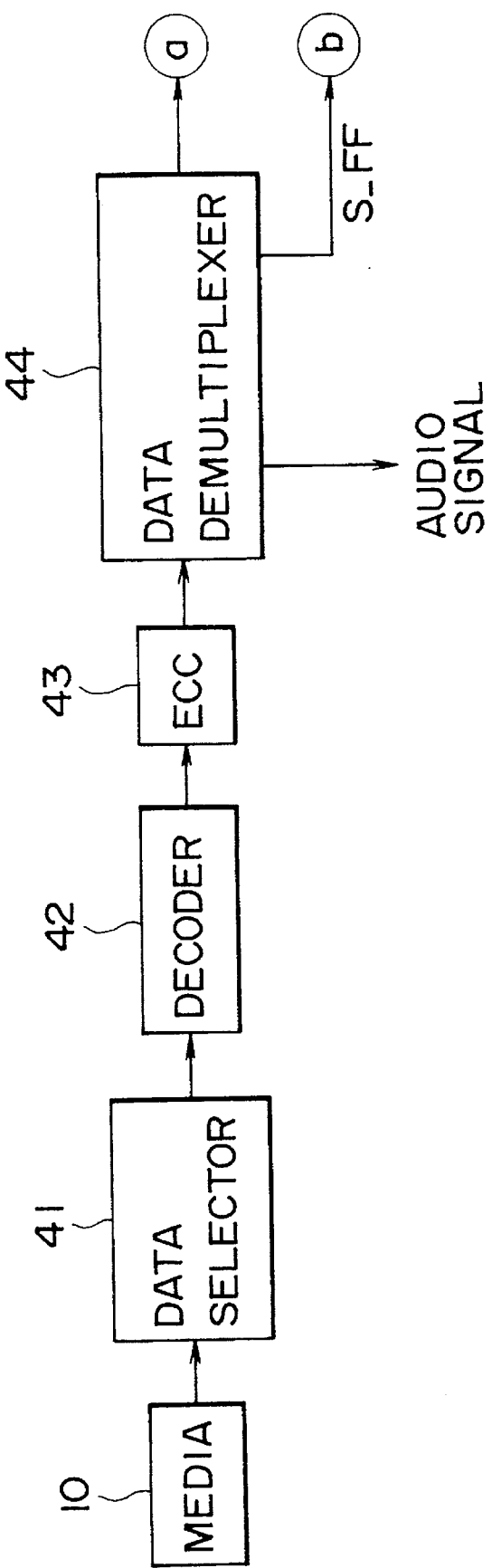
FIG. 12 is a block diagram of an image signal decoding apparatus to which the present invention is applied.

Referring now to FIG. 12, there is shown a picture signal decoding apparatus (decoder) for reproducing data recorded on the recording medium 10. A data reader 41 accesses to the recording medium 10 to reproduce data recorded on the recording medium 10 and outputs the data to a demodulator 42. When the recording medium 10 is a magnetic disk, the data reader 41 is a magnetic head, but when the recording medium 10 is an optical disk, the data reader 41 is an optical head. The demodulator 42 demodulates the data supplied thereto from the data reader 41. The thus decoded data are processed by detection and correction of an error by an error detection and correction circuit (ECC) 43 and are then inputted to a data demultiplexer 44. The data demultiplexer 44 demultiplexes the data into a video signal and an audio signal and outputs the audio signal to a circuit not shown.

The data demultiplexer 44 further decodes the data mode signal S_FF in a subcode (FIG. 7) and outputs it to a data discriminator 45. Meanwhile, the video signal separated by the data demultiplexer 44 is inputted to the data discriminator 45.

Figure 13:
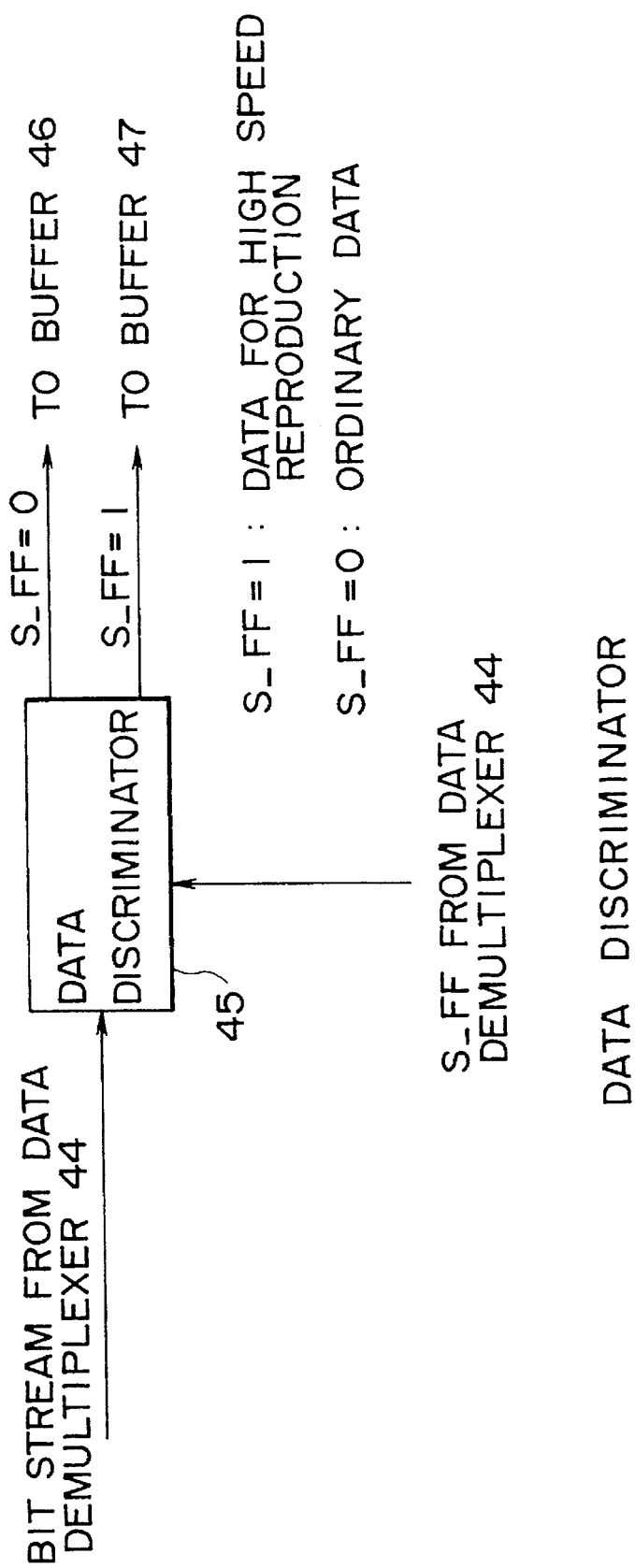
FIG. 13 is a diagrammatic view illustrating operation of a data discriminator of the image signal decoding apparatus shown in FIG. 12.

Referring to FIG. 13, the data discriminator 45 distributes data supplied thereto from the data demultiplexer 44 in response to the data mode signal S_FF also supplied thereto from the data demultiplexer 44. In particular, when the data mode signal S_FF is 1, since the picture data inputted then are data for high speed reproduction, the picture data are supplied to a buffer 46. On the other hand, when the data mode signal S_FF is 0, since the picture data inputted then are data of the other kind, the picture data are supplied to another buffer 47.

In this manner, of data of one GOP, the data of the frames I2, P5, P8, P11 and P14 (data for high speed reproduction) are stored into the buffer 46 while the data of the other frames B0, B1, B3, B4, B6, B7, B9, B10, B12 and B13 (other data) are stored into the other buffer 47 as seen from FIG. 14.

As illustrated in FIG. 10, a header is arranged at the top of the data of each frame, and the picture type of the frame and an ID representative of the frame number are arranged in the header. A buffer selector 48 reads the ID and discriminates to which one of the frames B0 to P14 of a GOP the data of the frame belong. Then, the buffer selector 48 reads, upon ordinary reproduction, data in the order of I2, B0, B1, P5, B3, B4, P8, B6, B7, P11, B9, B10, P14, B12 and B13 and outputs them to a picture signal decoder 49. The picture signal decoder 49 decodes the picture signal inputted thereto and re-arranges the data back into order the same as that when the picture signal was inputted to the picture signal coder 1, that is, into the order of B0, B1, I2, B3, B4, P5, B6, B7, P8, B9, B10, P11, B12, B13 and P14. The picture signal decoder 49 outputs the data in the thus re-arranged order.

Figure 15B:
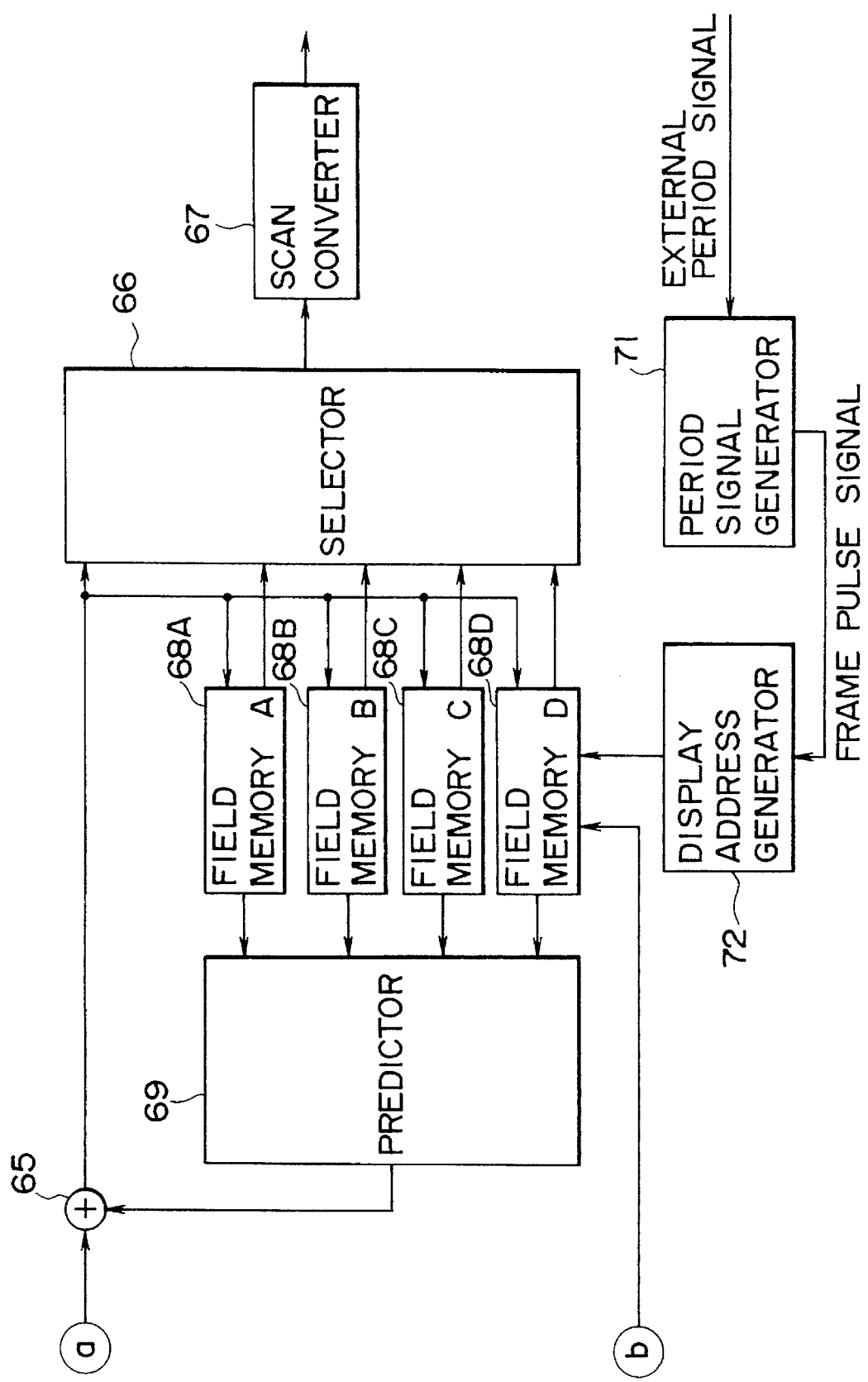
FIG. 15 is a block diagram showing an example of construction of a picture signal decoder of the image signal decoding apparatus shown in FIG. 12.

The picture signal decoder 49 is constructed, for example, in such a manner as shown in FIG. 15. A code bit stream input from the buffer selector 48 is temporarily stored into a buffer 61. The data are read out from the buffer 61 and decoded by inverse variable length coding (variable length decoding) by an inverse variable length coder (IVLC) 62. The thus decoded data are inputted to a dequantizer 63, by which they are dequantized for each block in accordance with information (a quantization step) extracted from the bit stream. The dequantized data from the dequantizer 63 are transformed by inverse DCT (IDCT) by an IDCT circuit 64. The dequantizer 63 and the IDCT circuit 64 operate complementarily to the quantizer 24 and the DCT circuit 24 of FIG. 2, respectively.

A read address generator 70 varies the read address of one of field memories 68A to 68D in response to a predictive mode and a motion vector separated from the input data by the inverse variable length coder 62. Consequently, data are read out from the one of the field memories 68A to 68D and processed by motion compensation by a predictor 69, and the output of the predictor 69 is inputted to an adder 65. The adder 65 adds the output of the predictor 69 to the output of the IDCT circuit 64 to regenerate an original picture. The thus regenerated picture is stored as a next predictive picture into the field memories 68A to 68D.

Picture signals stored at the address generated by a display address generator 72 are read out from the field memories 68A to 68D and supplied to a scan converter 67 by way of a selector 66. The scan converter 67 converts the number of lines of the data inputted thereto and outputs the resulted data to a display such as a CRT (cathode ray tube) not shown. A picture reproduced from the recording medium 10 is displayed in this manner.

It is to be noted that a period signal generator 71 generates a frame pulse signal as a period signal synchronized with an external period signal outputted, for example, from the display and outputs the frame pulse signal to the display address generator 72. The display address generator 72 generates a display address in synchronism with the frame pulse signal.

Figure 16:
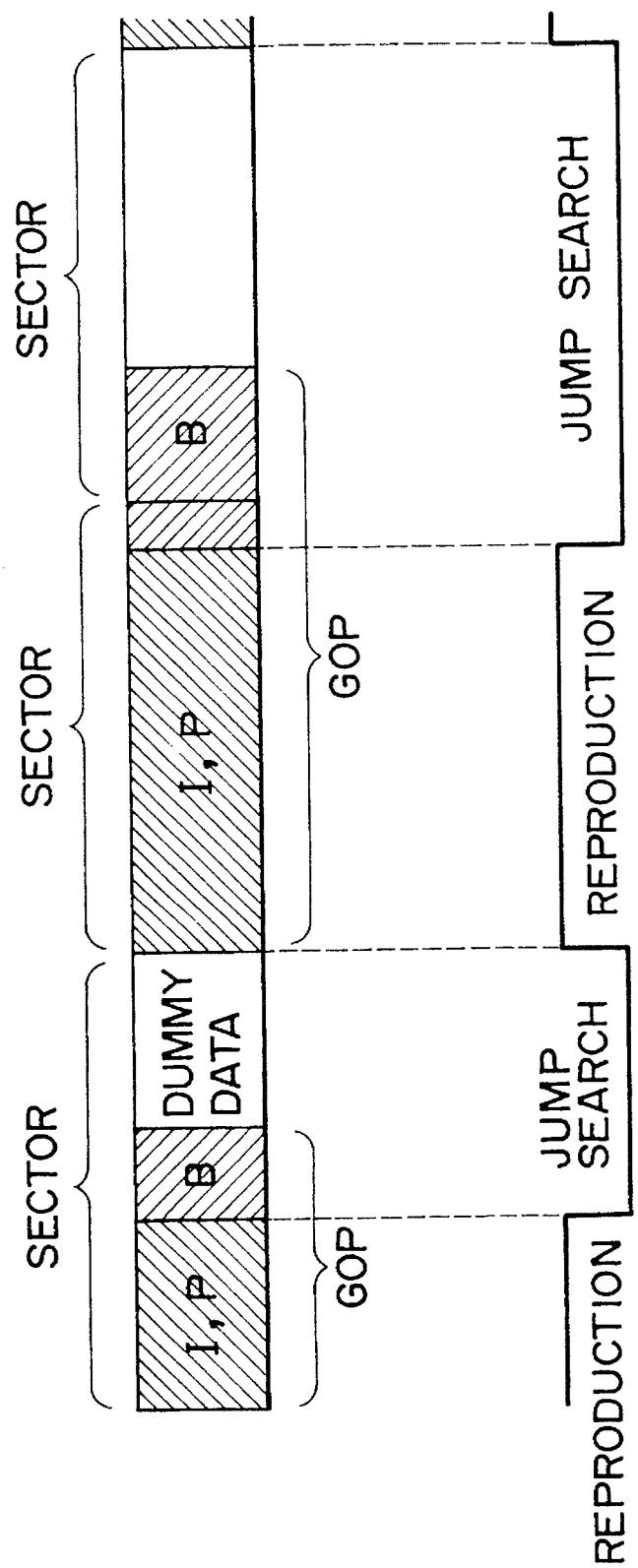
FIG. 16 is a time chart illustrating operation of the image signal decoding apparatus shown in FIG. 12 upon high speed reproduction.

When high speed reproduction is to be performed, only data for high speed reproduction of an I-picture and P-pictures recorded collectively at the top of each sector as shown in FIG. 16 are decoded. In particular, the data reader 41 reads data for high speed reproduction from the top of the sector. After the reading is completed, the data reader 41 performs track jumping to a next sector in which data for high speed reproduction are recorded, and then waits while the disk rotates. When the top of the sector in which data for high speed reproduction are recorded comes to the data reader 41, the data reader 41 reads the data for high speed reproduction recorded at the top of the sector. The data for high speed reproduction thus read are decoded similarly as upon ordinary reproduction by the picture signal decoder 49. The sequence of operations described above is repeated to effect high speed reproduction.

<Second Embodiment>

A picture signal coding apparatus (encoder) in accordance with second embodiment of the present invention is constructed similarly to the picture signal coding apparatus of the first embodiment, except as discussed below.

1. Data for high speed reproduction are not necessarily written at the top of a GOP.

2. The top of data of each GOP does not necessarily coincide with the top of a sector.

Figure 17:
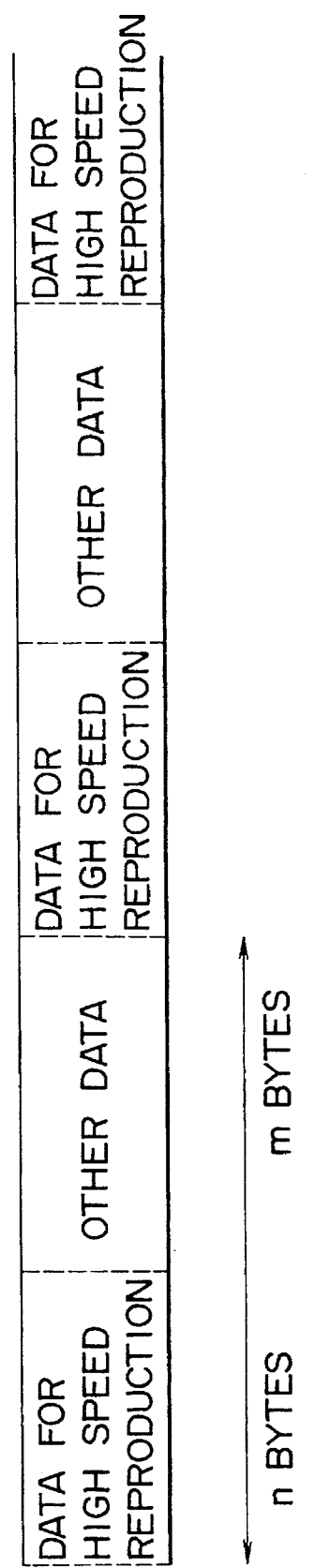
FIG. 17 is a diagrammatic view illustrating another positional relationship between data for high speed reproduction and other data according to a second embodiment of the present invention.

In particular, in the second embodiment, the buffer selector 5 shown in FIG. 1 supervises the buffers 3 and 4 and reads out and outputs the outputs of the buffers 3 and 4 at the ratio of, for example, n:m to the data multiplexer 6. Consequently, data for high speed reproduction and the other data are written at the ratio of n:m onto the recording medium 10 as seen from FIG. 17.

Figure 18:
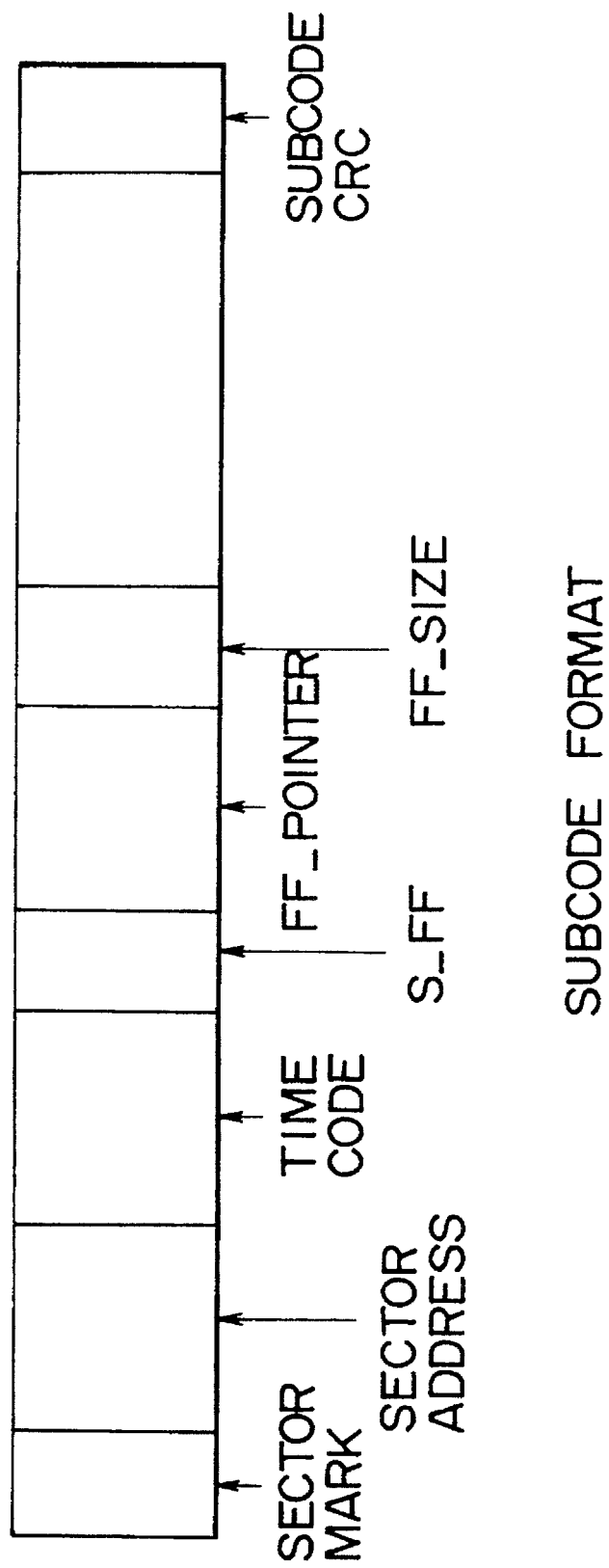
FIG. 18 is a diagrammatic view showing a subcode format in the second embodiment of the present invention.

Further, in the second embodiment, the sector allocator 7 adds a subcode in accordance with such a format as shown in FIG. 18. In particular, in the present embodiment, signals FF_Pointer and FF_Size are recorded in addition to the data mode signal S_FF as can be seen with comparison to the subcode format in the first embodiment shown in FIG. 7.

Figure 19:
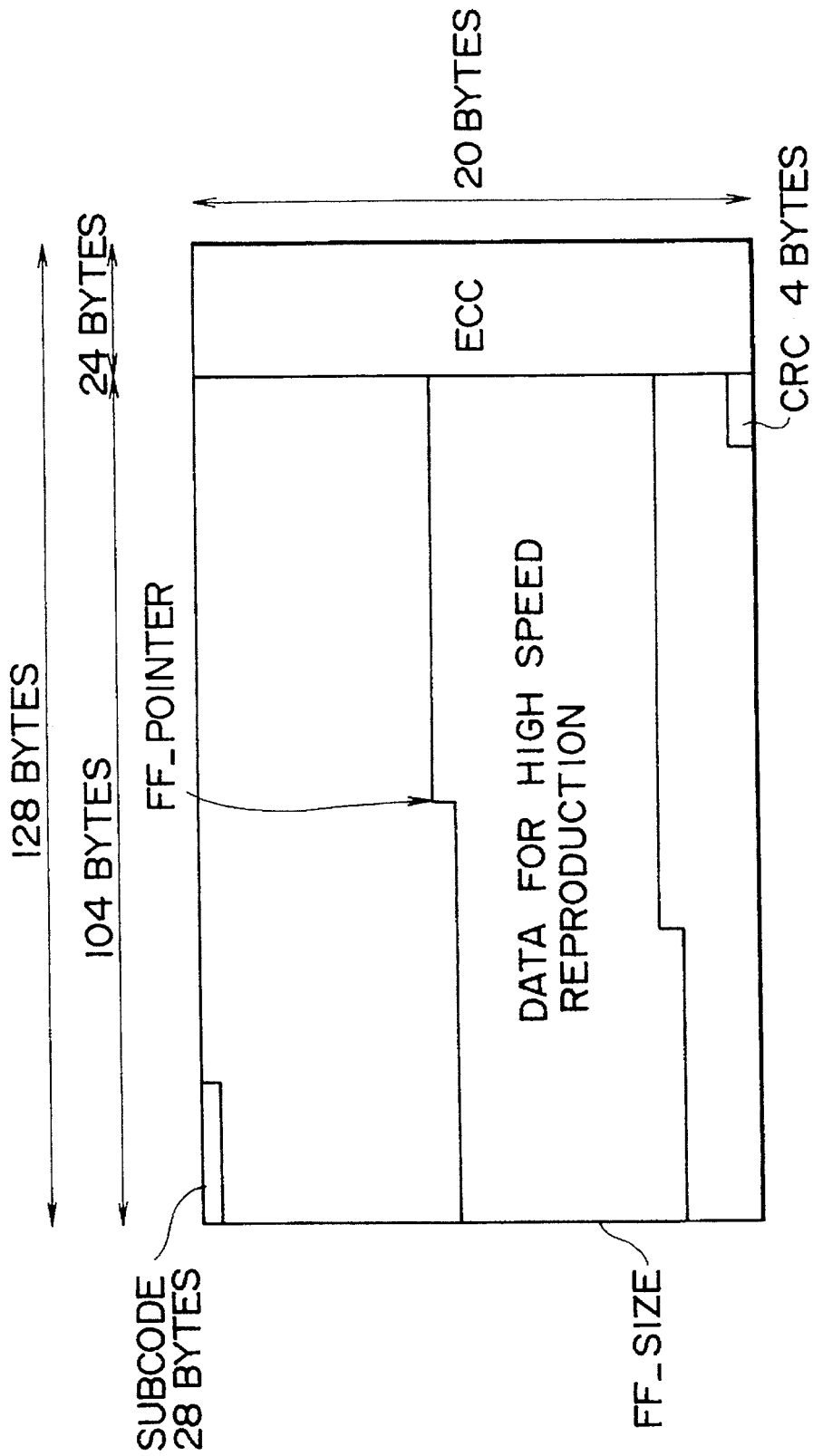
FIG. 19 is a diagrammatic view showing the construction of a sector in the second embodiment of the present invention.

The signal FF_Pointer represents a top address (entry pointer) of data for high speed reproduction in each sector as seen from FIG. 19. Meanwhile, the signal FF_Size represents an amount of the range indicated by slanting lines in FIG. 19, that is, an amount of data for high speed reproduction.

Thus, in the second embodiment, the head of data for high speed reproduction does not necessarily coincide with the head of a sector. Therefore, rapid reproduction of data for high speed reproduction is permitted by recording the top address of data for high speed reproduction in each sector into a Subcode and transmitting the same.

A picture signal decoding apparatus (decoder) in the second embodiment is constructed similarly to the picture signal decoding apparatus of the first embodiment shown in FIG. 12 except in the details of the data discriminator 45.

In particular, the data discriminator 45 in the second embodiment reads, from the subcode of a sector indicated by S_FF=1, that is, a sector which includes data for high speed reproduction, a top address (entry point) of the data for high speed reproduction and a data amount (FF_Size) of the data for high speed reproduction. Then, the data discriminator 45 separates the data within the range indicated by the signal FF_Size from the entry point as data for high speed reproduction and outputs the data to the buffer 46. Further, the data discriminator 45 separates any other data as data of the other type and outputs the other data to the buffer 47.

The picture signal decoding apparatus in accordance with the second embodiment operates similarly to the picture signal decoding apparatus in accordance with the first embodiment except that described above.

<Third Embodiment>

A picture signal coding apparatus in accordance with a third embodiment of the invention is constructed similarly to the picture signal coding apparatus of the second embodiment, except for the details the sector allocator 7.

Figure 20:
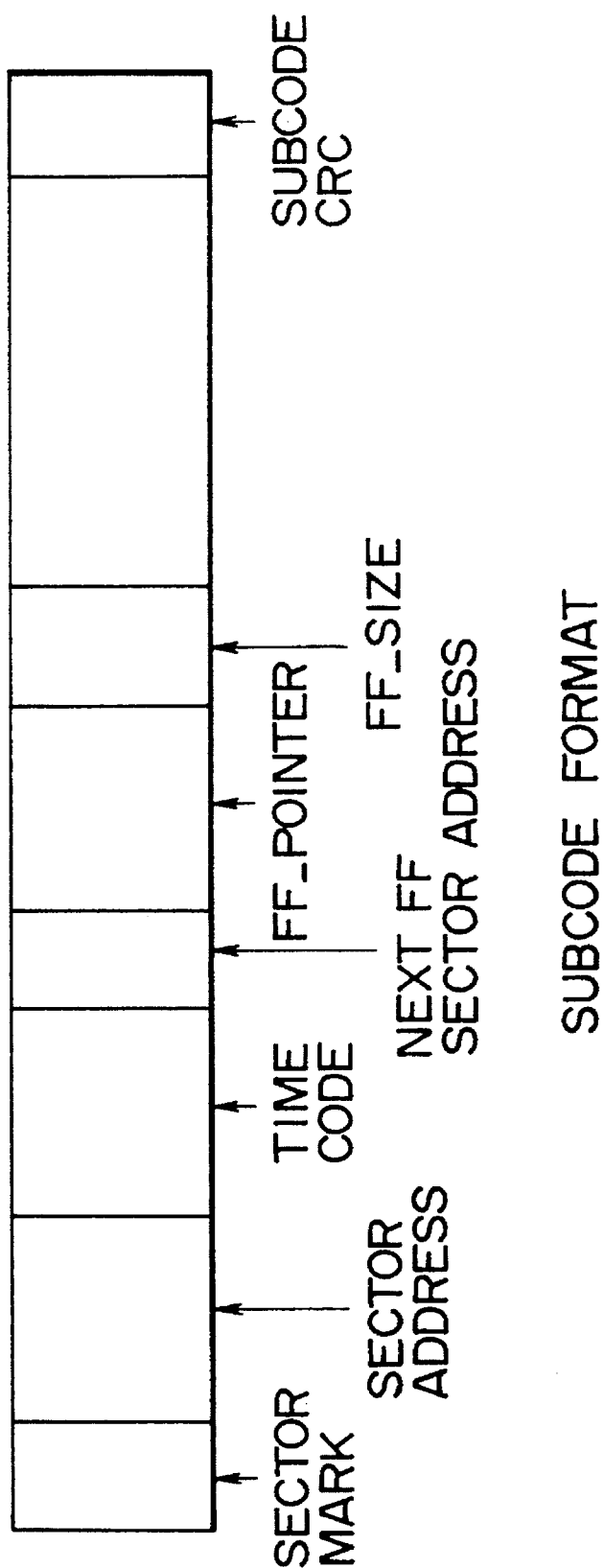
FIG. 20 is a diagrammatic view showing a subcode format employed in a third embodiment of the present invention.

In accordance with the third embodiment, a top address (Next Sector Address) of a sector in which next data for high speed reproduction are recorded is recorded together with the signals FF_Pointer and FF_Size into a subcode as shown in FIG. 20 by the sector allocator 7.

Accordingly, a picture signal decoding apparatus in accordance with the third embodiment reads and stores, when a predetermined sector including data for high speed reproduction is to be read in in order to perform high speed reproduction, an address of a sector which includes next data for high speed reproduction in advance. Then, when reading of the data for high speed reproduction of the sector is completed, the data reader 41 is moved in response to the address thus stored and waits while the disk rotates to effect reproduction of the next data for high speed reproduction.

<Fourth Embodiment>

The fourth embodiment in accordance with the invention is constructed similarly to the second embodiment except that an address of a recording position (entry point) of data for high speed reproduction is written in the TOC (Table of Contents) of the recording medium 10.

In particular, while the TOC is recorded at the top (for example, in an innermost circumferential track) of the recording medium (disk) 10, in the present embodiment, addresses of sectors of data for high speed reproduction of the recording medium 10 (addresses of entry points) are written in advance in the TOC as seen in FIG. 21 (N entry points are written in the example shown in FIG. 21).

An example of construction of a picture signal coding apparatus in accordance with the present embodiment will be described with reference to FIG. 22. As can be seen by comparison of FIG. 22 to FIG. 1, in accordance with the fourth embodiment, a TOC addition circuit 84 is interposed between the data multiplexer 6 and the sector allocator 7. Further, an entry point detector 81 for detecting an entry point from the output of the data multiplexer 6 is provided, and an entry point detected by the entry point detector 81 is supplied to and stored into an entry point storage apparatus 82. A TOC data generator 83 generates TOC data corresponding to entry points stored in the entry point storage apparatus 82 and outputs the TOC data to the TOC addition circuit 84. The TOC data are arranged in form as a TOC and inputted to the TOC addition circuit 84, by which the TOC data are added to the top of multiplexed data.

Consequently, the TOC data including the entry points are recorded onto the innermost circumferential track of the recording medium 10.

Figure 23A:
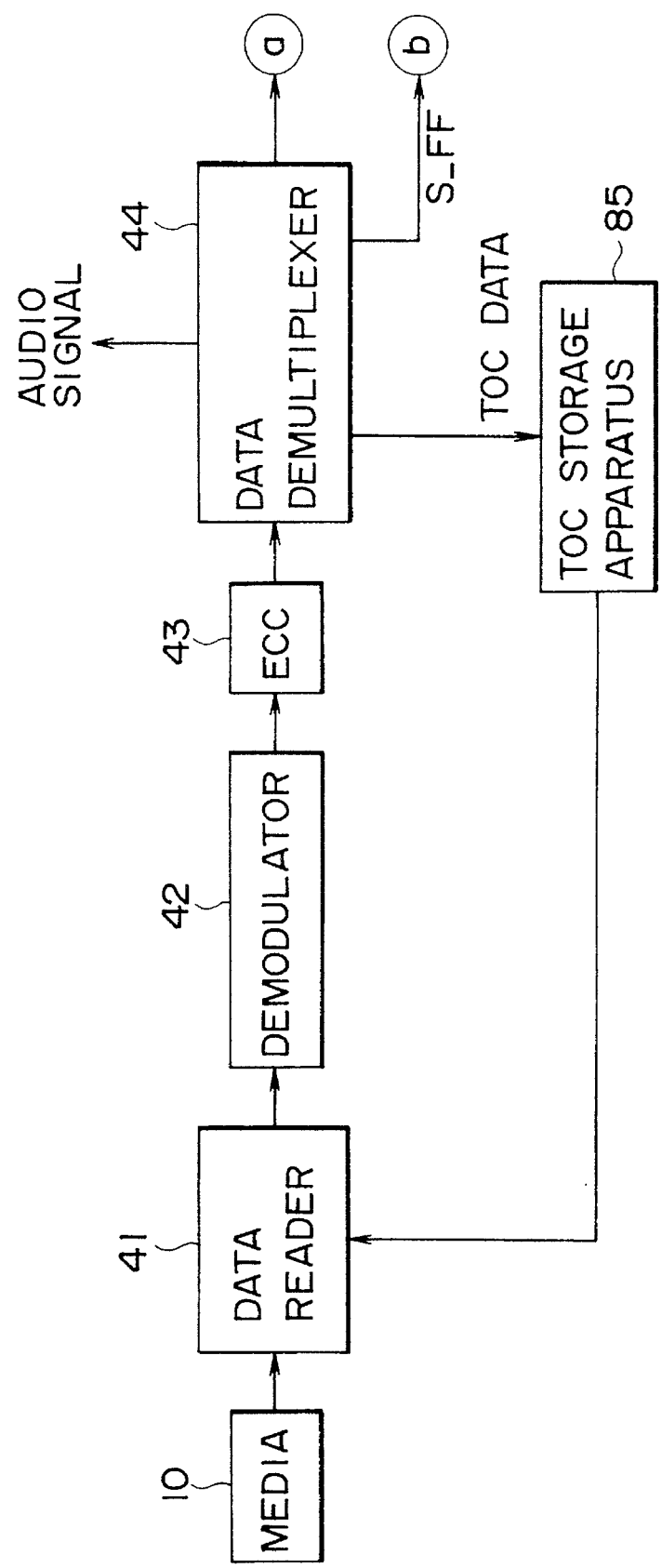
FIG. 23 is a block diagram of a further picture signal decoding apparatus to which the present invention is applied.

FIG. 23 shows an example of construction of a picture signal decoding apparatus in accordance with the fourth embodiment. Information of the TOC recorded on the innermost circumferential track of the recording medium 10 is demultiplexed by the demultiplexer 44 and stored into a TOC storage apparatus 85.

When high speed reproduction is to be performed, the data reader 41 reads the TOC information stored in the TOC storage apparatus 85, calculates an address of next data for high speed reproduction and moves to the position of the address. Then, the data reader 41 reads out the data for high speed reproduction to regenerate an original picture signal. The sequence of operations described so far is repeated.

<Fifth Embodiment>

Figure 24A:
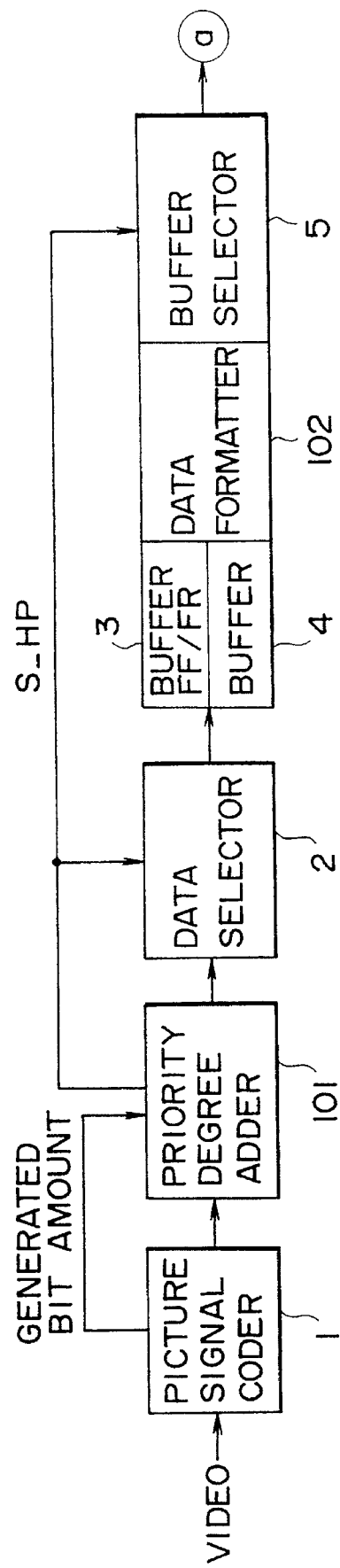
FIG. 24 is a block diagram of a still further picture signal coding apparatus to which the present invention is applied.

An example of construction of a picture signal coding apparatus (encoder) in accordance with a fifth embodiment of the present invention is shown in FIG. 24. Referring to FIG. 24, in accordance with the fifth embodiment, a priority degree adder 101 is connected between the picture signal coder 1 and the data selector 2. A priority degree signal S_HP outputted from the priority degree adder 101 is supplied to the data selector 2 and the buffer selector 5 in place of the picture type signal PTYPE from the picture signal coder 1 shown in FIG. 22. Further, the TOC data generator 83 and the TOC addition circuit 84 shown in FIG. 22 are omitted, and the output of the entry point storage apparatus 82 is supplied directly to the sector allocator 7. Further, a data formatter 102 is interposed between the buffers 3 and 4 and the buffer selector 5. The other construction of the picture signal coding apparatus of the embodiment is similar to that of the picture signal coding apparatus shown in FIG. 22.

The picture signal coder 1 is constructed in such a manner as shown, for example, in FIG. 25. Referring to FIG. 25, the basic construction of the picture signal coder 1 is substantially similar to that of the picture signal coding apparatus shown in FIG. 2 except that the buffer 27 outputs a generated bit amount signal corresponding to the amount of bits generated therefrom to the priority degree adder 101.

Figure 26:
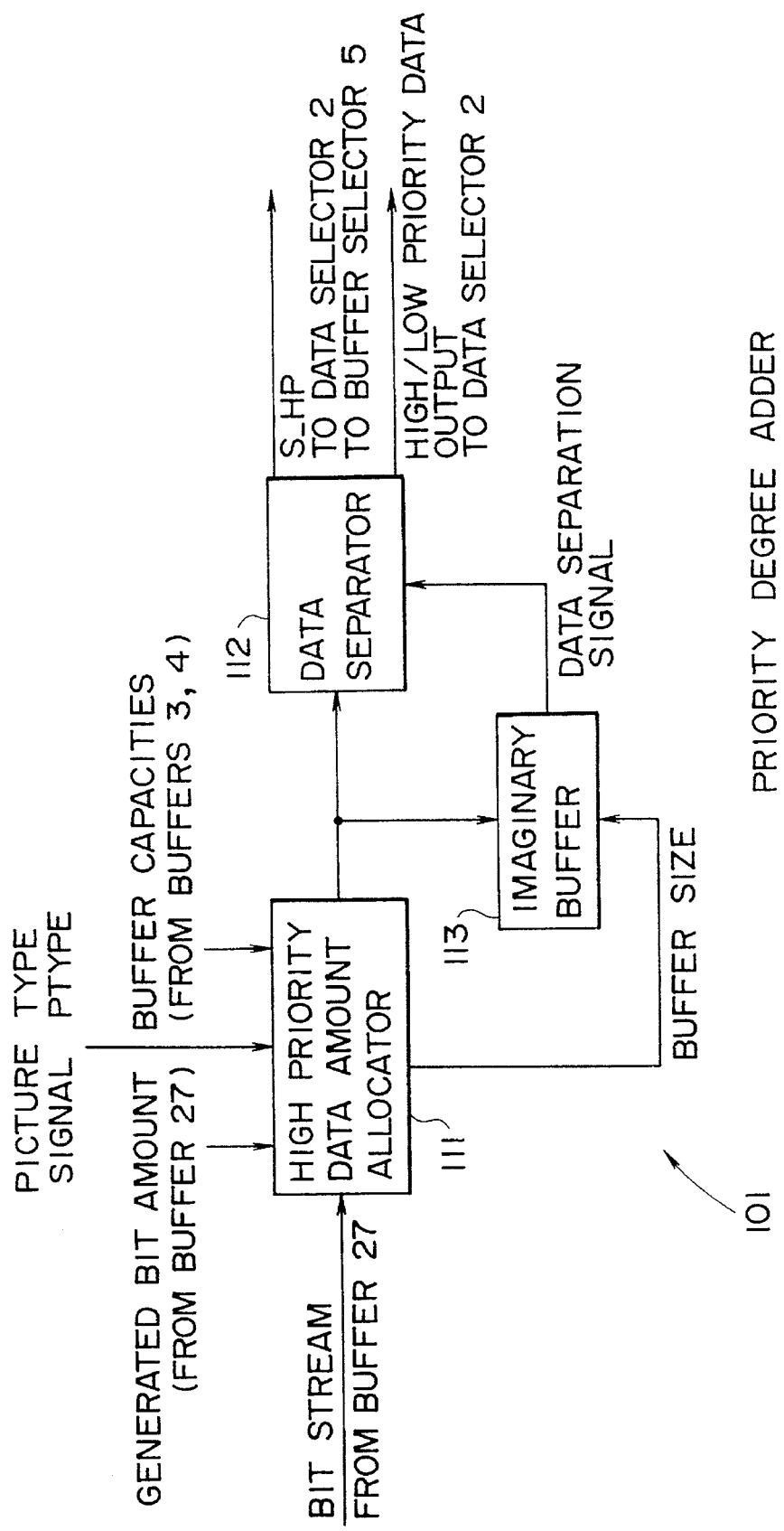
FIG. 26 is a block diagram showing the construction of a priority degree adder of the picture signal coding apparatus shown in FIG. 24.
Figure 27:
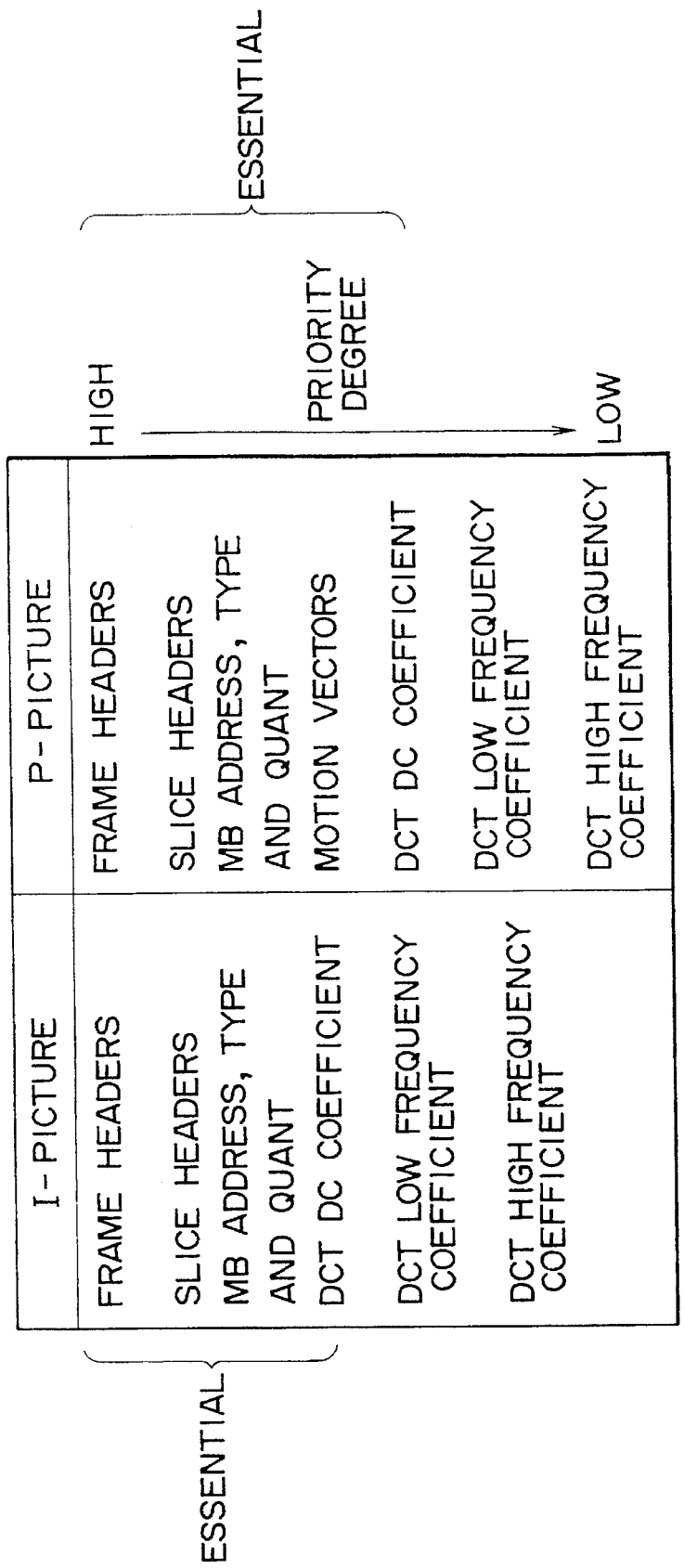
FIG. 27 is a diagrammatic view illustrating the degree of priority of data in the picture signal coding apparatus Shown in FIG. 24.

The priority degree adder 101 is constructed in such a manner as shown, for example, in FIG. 26. Referring to FIG. 26, data supplied from the picture signal coder 1 are inputted to a high priority data amount allocator 111. The priority data amount allocator 111 applies priority order numbers to the data inputted thereto. Data of I- and P-pictures are provided with such priority order numbers as shown in FIG. 27.

In particular, for an I-picture, priority order numbers are applied in the order of the frame headers (Frame Headers), the slice headers (Slide Headers), the address (Address), type (Type) and quantization (Quant) of the macro block (MB), the DC coefficient for DCT, the low frequency coefficient for DCT and the high frequency coefficient for DCT. Of those data, the frame headers (Frame Headers), the slice headers (Slide Headers), the address (Address), type (Type) and quantization (Quant) of the macro block (MB) and the DC coefficient for DCT are essential data and cannot be omitted.

For a P-picture, priority order numbers are applied in the order of the frame headers (Frame Headers), the slice headers (Slide Headers), the address (Address), type (Type) and quantization (Quant) of the macro block (MB), the motion vectors (Motion Vectors), the DC coefficient for DCT, the low frequency coefficient for DCT and the high frequency coefficient for DCT. Of those data, the frame headers (Frame Headers), the slice headers (Slide Headers), the address (Address), type (Type) and quantization (Quant) of the macro block (MB), the motion vectors (Motion Vectors) and the DCT coefficient for DCT are essential and cannot be omitted.

Since the essential data of an I-picture and a P-picture are data absolutely necessary for decoding and cannot be omitted, they are always decoded, but since the other data, that is, the low frequency coefficient for DCT and the high frequency coefficient for DCT have a comparatively low degree of priority (they are necessary only to enhance the picture quality), they can be omitted from decoding when necessary.

Data of a B-picture are regarded as data having a low degree of priority, and decoding of them can be omitted.

The data amount allocator 111 outputs data in the order of the degree of priority to a data separator 112 and an imaginary buffer 113.

Further, the data amount allocator 111 sets a buffer size (storage capacity) of the imaginary buffer 113 in response to a generated bit amount generated from the buffer 27 of the picture signal decoder 1 and stored amounts of data in the buffers 3 and 4. Data outputted from the data amount allocator 111 are successively inputted to and stored into the imaginary buffer 113 in the descending order of the degree of priority. Then, when the stored data amount of the imaginary buffer 113 reaches the storage capacity thus set as a buffer size, the imaginary buffer 113 outputs a data separation signal to the data separator 112.

The data separator 112 outputs data inputted thereto in accordance with the order of priority from the data amount allocator 111 as data having a high degree of priority to the data selector 2 for a period until after a data separation signal is inputted from the imaginary buffer 113 to the data separator 112. Further, after a data separation signal is inputted from the imaginary buffer 113, the data separator 112 outputs data inputted thereto from the data amount allocator 111 as data having a low degree of priority to the data selector 2.

The allocation of the priority degree is described in more detail below. In particular, the priority degree allocation is performed in units of one slice. In other words, a data separation point (a separation point between data of a high priority degree and data of a low priority degree) is determined for each one slice.

Figure 28:
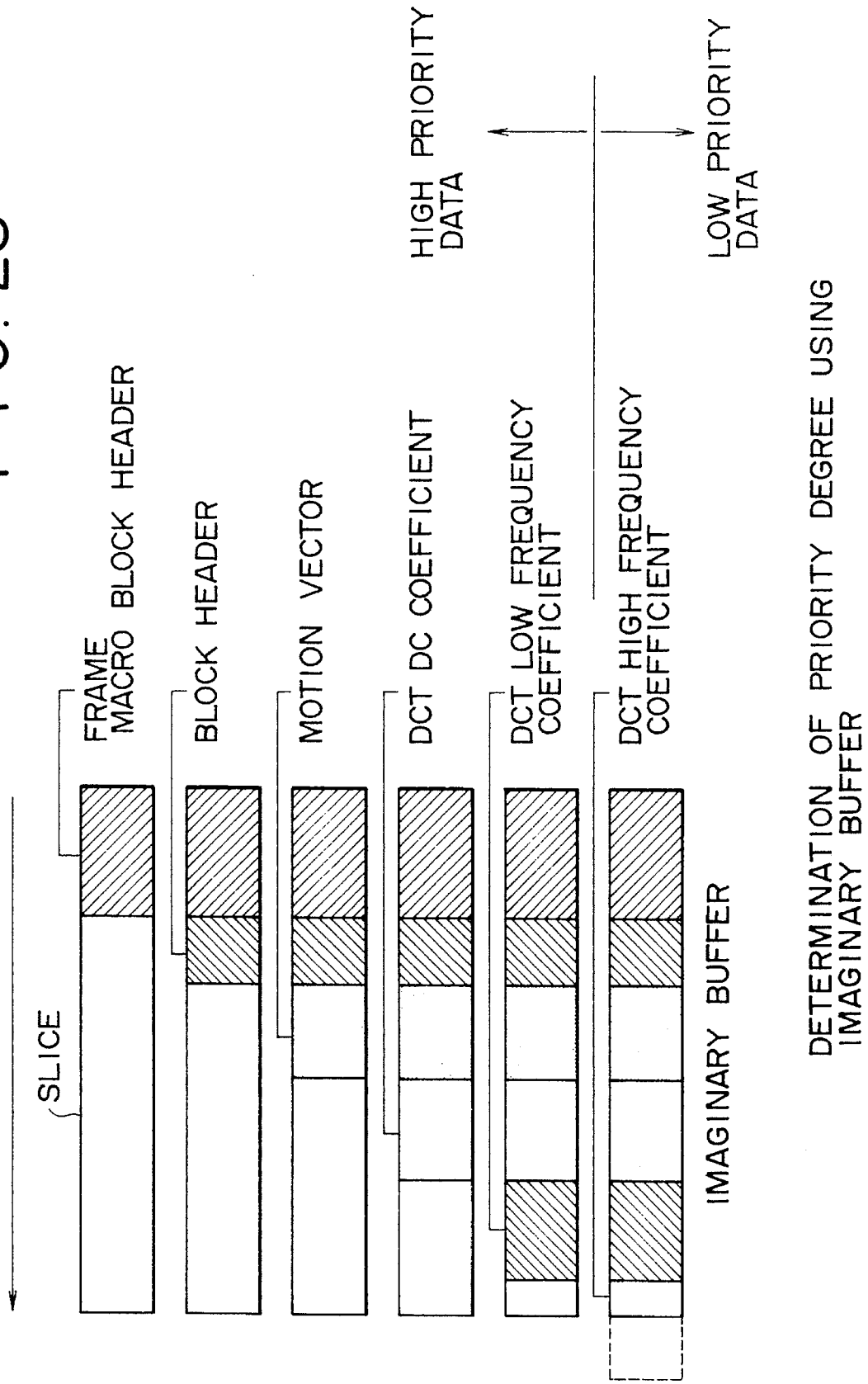
FIG. 28 is a diagrammatic view illustrating operation of an imaginary buffer in the picture signal coding apparatus shown in FIG. 24.

A concrete example of the procedure of the priority degree allocation is illustrated in FIG. 28. First, a region of a size equal to a storage capacity (buffer size) determined by the high priority data amount allocator 11 is assured on the imaginary buffer 113. Then, the data amount allocator 111 inputs data to the imaginary buffer 113 in accordance with the priority order illustrated in FIG. 27. FIG. 28 illustrates a manner wherein the frame headers, the macro block headers, the block headers, the motion vectors, the DC coefficient for DCT, the low frequency coefficient for DCT and the high frequency coefficient for DCT are successively written into the imaginary buffer 113 so that the amount of data stored in the imaginary buffer 113 increases gradually.

In this instance, the amount of data inputted to the imaginary buffer 113 is supervised, and those data inputted before a maximum amount of data which does not exceed the capacity set for the imaginary buffer 113 is inputted to the imaginary buffer 113 are determined as data of a high priority degree. Data after then are determined as data of a low priority degree. The point at which a data separation signal makes a data separation point.

Figure 29:
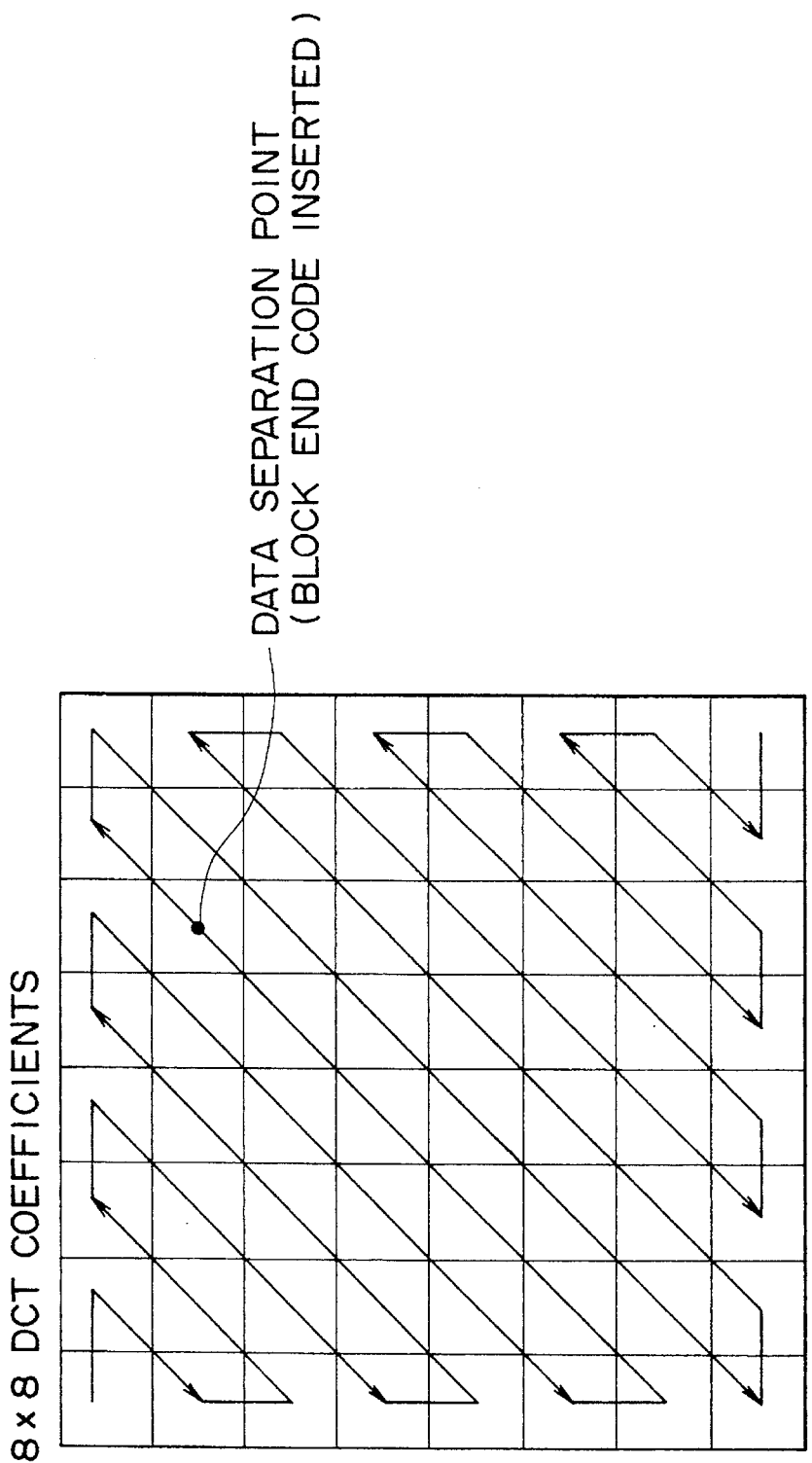
FIG. 29 is a diagrammatic view showing a data separation point in the picture signal coding apparatus shown in FIG. 24.

FIG. 29 illustrates an example of separation of DCT coefficients at a separation point into data of a high priority degree and data of a low priority degree. DCT coefficients of a block including 8×8 picture elements are scanned by zigzag scanning as seen from FIG. 29 and thus inputted in this order to the imaginary buffer 113. At a point of time when the preset capacity of the imaginary buffer 113 is exceeded, a data separation signal is outputted to the data separator 112. The data separator 112 adds a block end code (EOB: End of Block) to the last end of each block of data of a high priority degree. Consequently, the end position of each block can be discriminated only from data of a high priority degree.

It is to be noted that, on the decoder side, when data of a high priority degree and data of a low priority degree are to be combined in order to effect ordinary reproduction, the block end code (EOB) added by the coder to each data separation point is eliminated.

Since the block end code EOB is added to the end of data of a high priority degree, a bit stream including only data of a high priority degree satisfies the syntax of the main profile level and the main level of the MPEG2, and accordingly, it can be decoded similarly to a bit stream which includes data of all kinds.

The data separator 112 further transfers, together with data of a high priority degree or data of a low priority degree, a priority degree signal S_HP for identification of whether the data are data of a high priority degree or data of a low priority degree. The priority degree signal S_HP is 1 for data of a high priority degree but is 0 for data of a low priority degree.

Figure 30:
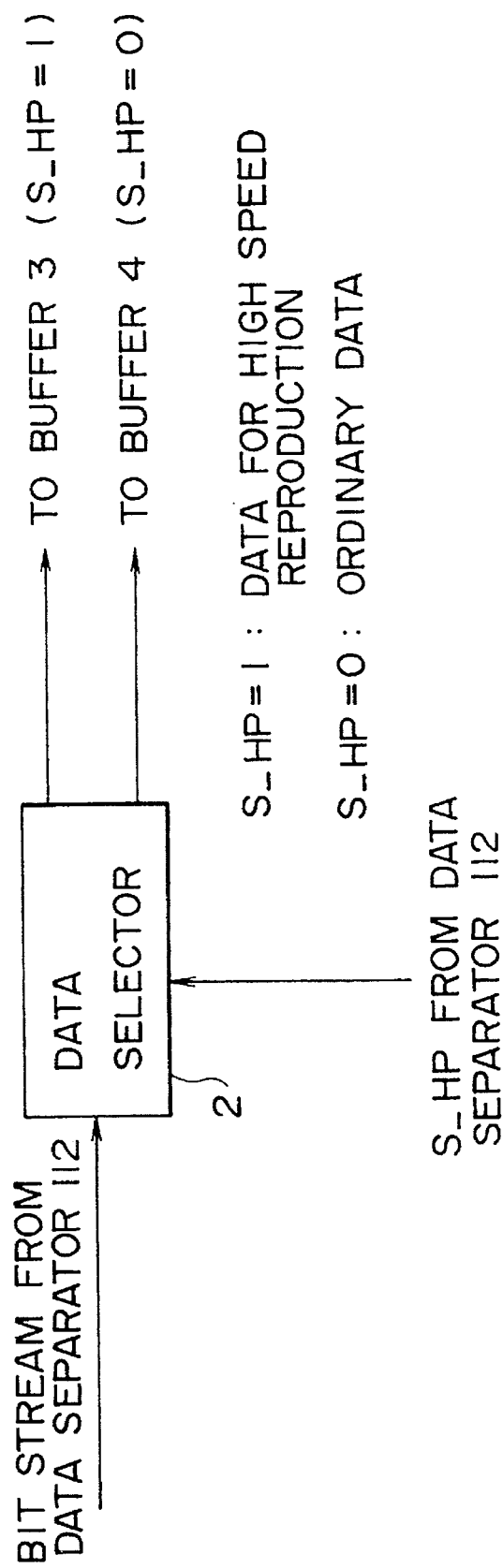
FIG. 30 is a diagrammatic view illustrating operation of a data selector of the picture signal coding apparatus shown in FIG. 24.

Operation of the data selector 2 is now described with reference to FIG. 30. The data selector 2 outputs, in response to the priority degree signal S_HP, picture data inputted thereto as data of a high priority degree (data for high speed reproduction) when the priority signal S_HP is equal to 1. But when S_HP=0, the data selector 2 outputs picture data inputted thereto as data of a low priority degree (data of the other kind) to the buffer 4.

Figure 31:
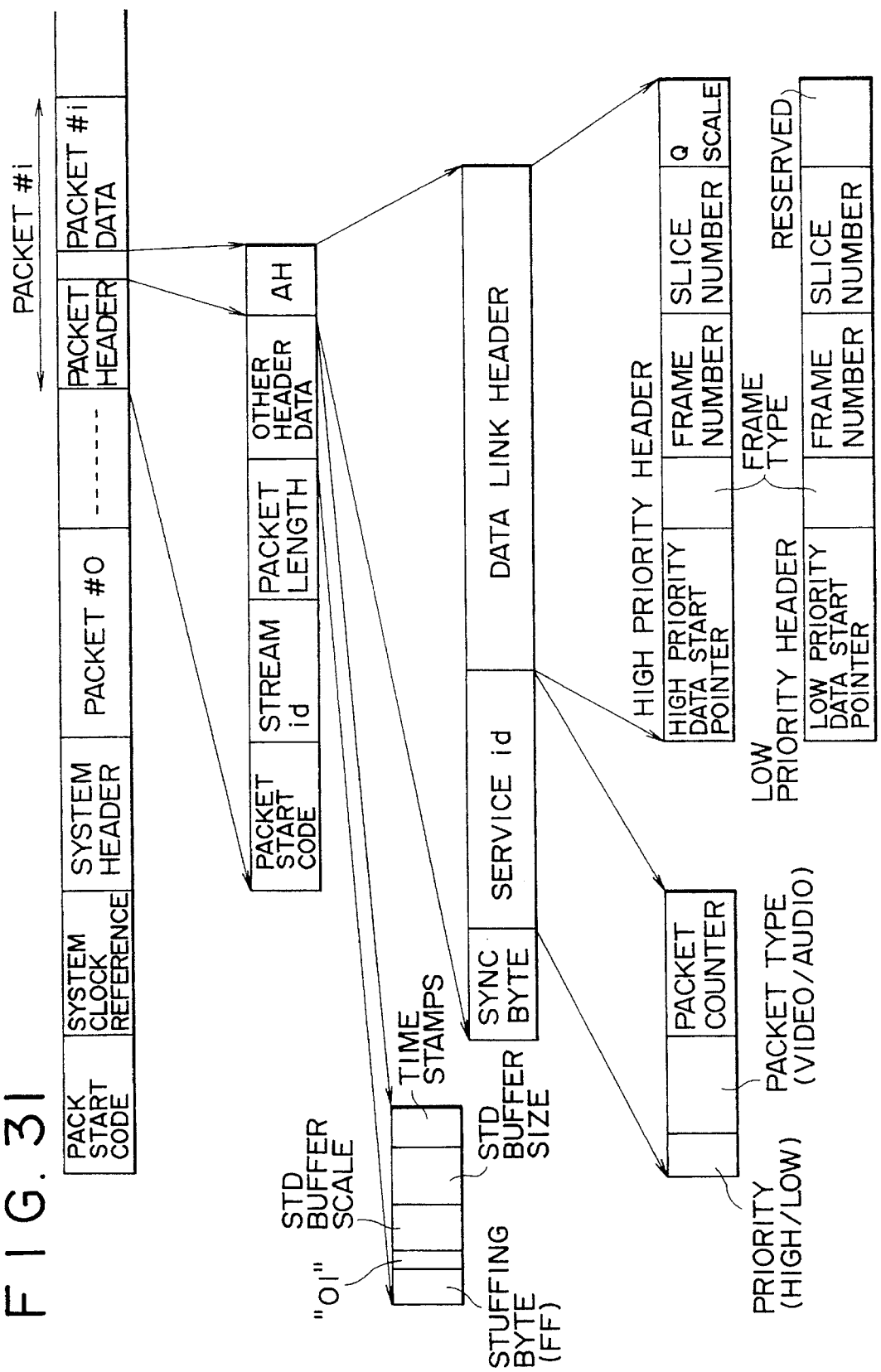
FIG. 31 is a diagrammatic view showing a pack format used in a data formatter of the picture signal coding apparatus shown in FIG. 24.

The data formatter 102 adds a header of a packet to data of a high priority degree and a low priority degree. Data of a high priority degree and data of a low priority degree are combined into a single packet in units of a packet so that the data of two kinds may not be mixed with each other. Data for one sector are constituted from a plurality of packs, and each pack is constituted from a plurality of packets. FIG. 31 shows a format of a pack. As shown in FIG. 31, a pack start code (Pack Start Code), a system clock reference (System Clock Reference) and a system header (System Header) are added to the top of the pack, and packets are arranged subsequently to them.

A packet header (Packet Header) is disposed at the top of each packet, and a packet start code (Packet Start Code), a stream ID (Stream ID), a packet length (Packet Length), other necessary header information (Other Header Data) and an adaptation header (AH: Adaptation Header) are disposed in the packet header.

The other necessary header information (Other Header Data) includes a stuffing byte (Stuffing byte), a reservation code "01", a buffer scale (STD buffer scale), a buffer size (STD buffer scale) and a time stamp (Time stamp) arranged therein.

In the adaptation header AH, a synchronization byte (Sync Byte), a service ID (Service ID) and a data link header (Data Link Header) are arranged. In other words, information necessary for recovery when, for example, an error occurs with a packet so that data are lost is recorded in the adaptation header AH.

In particular, a priority flag (Priority) corresponding to the priority degree signal S_HP is recorded in the service ID. When the priority degree signal S_HP is equal to 1, the flag is also set to 1 (high), but when S_HP=0, the flag is also set to 0 (low). In the packet type (Packet Type), a flag for identification between data recorded in the packet are a video signal or an audio signal is recorded. In the packet counter (Packet Counter), a consecutive number corresponding to the packet is recorded so that the continuity of packets can be checked. It is to be noted that different count values obtained by counting data of a high priority degree and data of a low priority degree independently of each other are recorded in the packet counter.

In the data link header for containing data of a high priority degree and data of a low priority degree to reconstruct an input picture signal, a high priority data start pointer (when Priority=1) or a low priority data start pointer (when Priority=0), a frame type (Frame Type), a frame number (Frame Number), a slice number (Slice Number) and a quantization step (Q scale) (when Priority=1) or a reservation code (reserved) (when Priority=0) are recorded. Here, a slice is data constituted from data of, for example, 16 lines of a picture of one frame.

Figure 32:
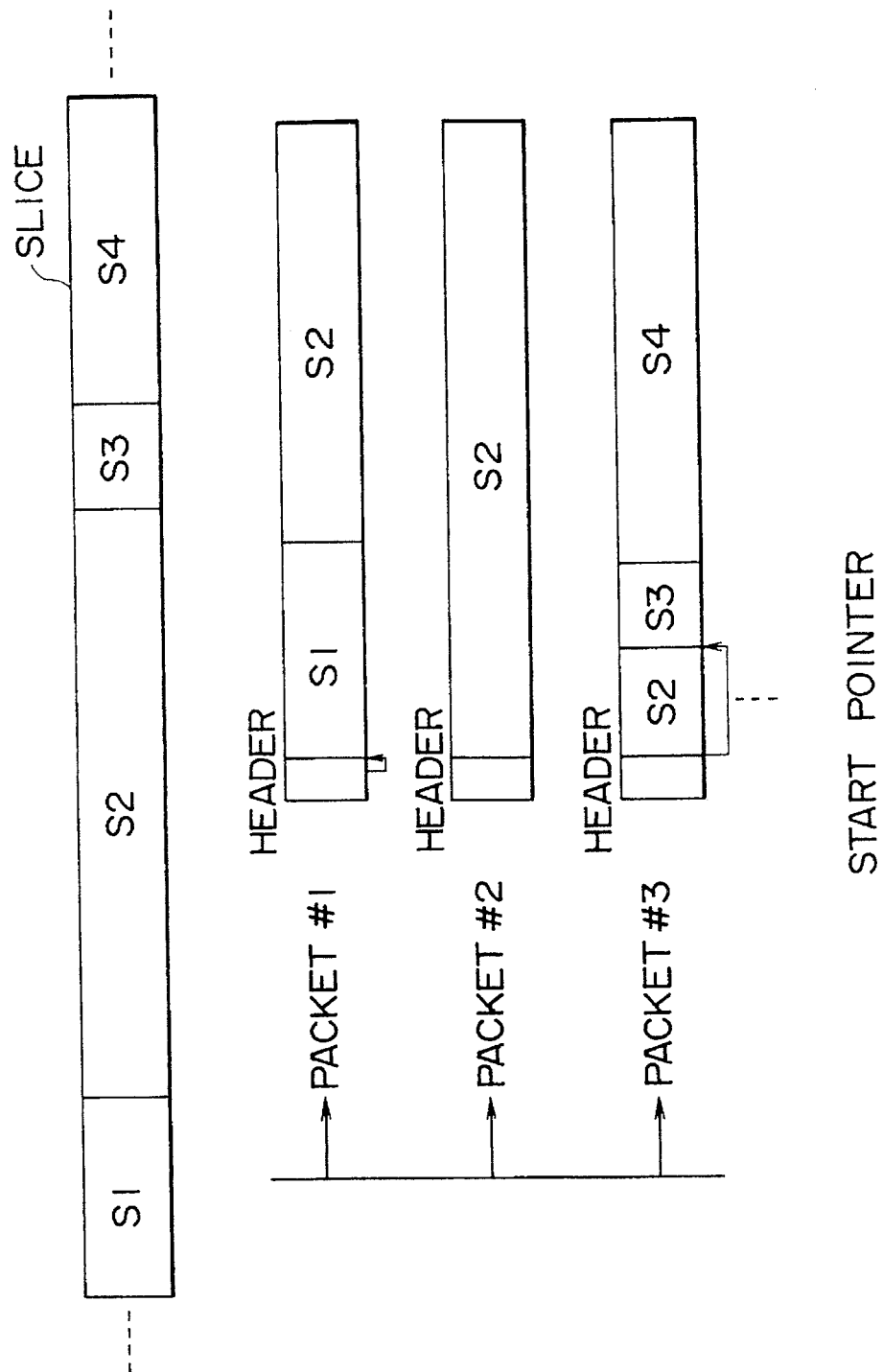
FIG. 32 is a diagrammatic view illustrating the function of a start pointer in the pack format shown in FIG. 31.

FIG. 32 schematically illustrates a function of a start pointer of a high priority degree or a low priority degree. In particular, if it is assumed that data of slices S1, S2, S3, S4, . . . are successively allocated to packets 1, 2, 3, . . . , in the top header of each packet, the address of the first slice whose header is included in the packet (for example, the top address of a slice S1 for the packet 1, and the top address of a slice S3 for the packet 3) is recorded as a start pointer. Accordingly, if the address recorded in the header is accessed, then data for which complete decoding can be performed can be obtained (if, for example, the slice S2 in the packet 3 is accessed, then since the data of the slide S2 continue from the preceding packet 2, the data cannot be decoded completely).

Data of a high priority degree or data of a low priority degree to which a packet header has been added in this manner are outputted to the data multiplexer 6 by way of the buffer selector 5 (FIG. 24). The buffer selector 5 supervises the buffers 3 and 4 and a sector allocated by the sector allocator 7 and outputs the outputs of the buffers 3 and 4 at the ratio of, for example, n:m to the data multiplexer 6. Consequently, data of a high priority degree (data for high speed reproduction) and data of a low priority degree (the other data) are written at the ratio of n:m onto the recording medium 10. The data multiplexer 6 multiplexes picture data and audio data.

To the thus multiplexed signal, a sector on the recording medium 10 is allocated by the sector allocator 7. The sector allocator 7 further transmits, when the sector includes data for high speed reproduction, an address of a sector which includes next data for high speed reproduction.

Figure 33:
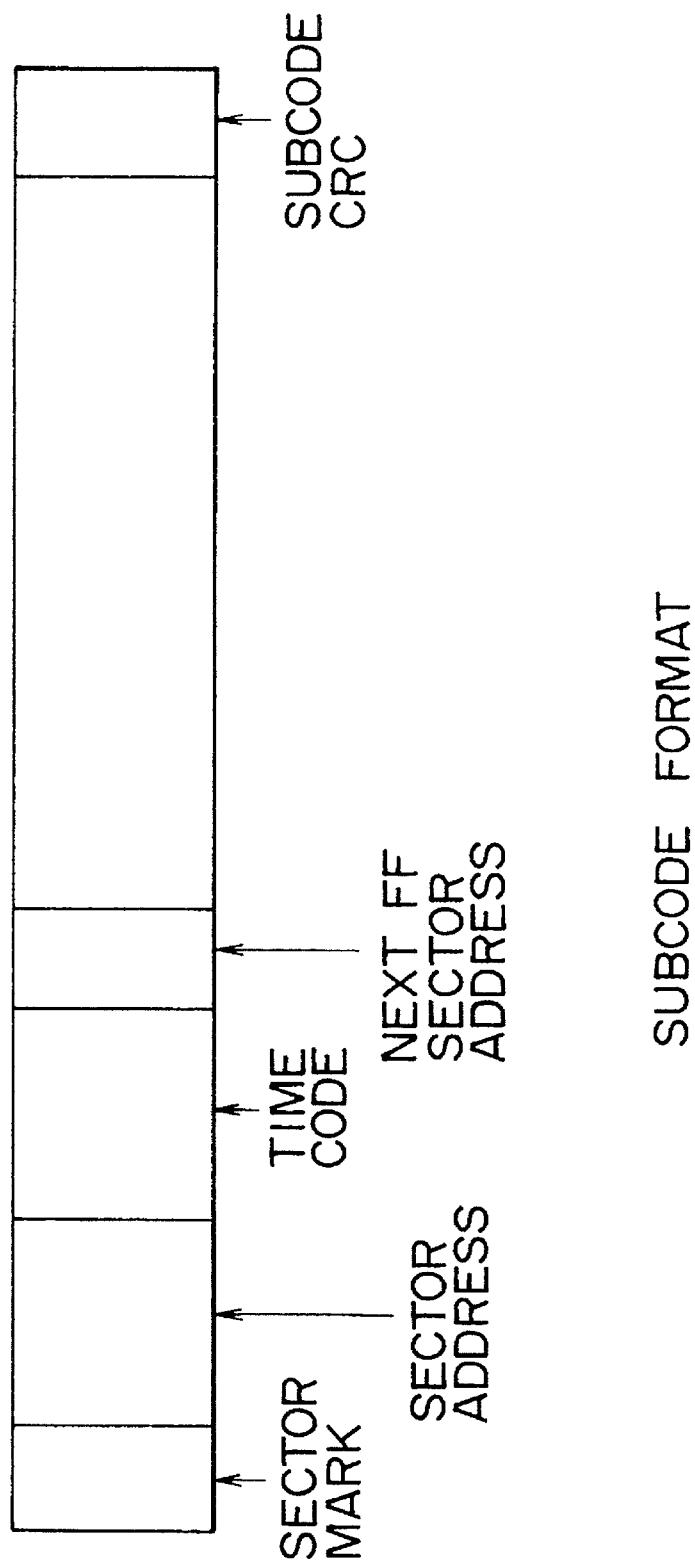
FIG. 33 is a diagrammatic view showing a subcode format used in the picture signal coding apparatus shown in FIG. 24.

Each sector is constructed in such a manner as illustrated in FIG. 19 similarly to that described hereinabove. To the top of each sector, a Subcode of 28 bytes indicative of contents of the sector is added. The format of the Subcode in the present embodiment is such as illustrated in FIG. 33. As seen from FIG. 33, a top address Next FF Sector Address (entry point) of a sector in which next data for high speed reproduction are recorded is recorded in the Subcode of the sector in which data for high speed reproduction are recorded.

Figure 34:
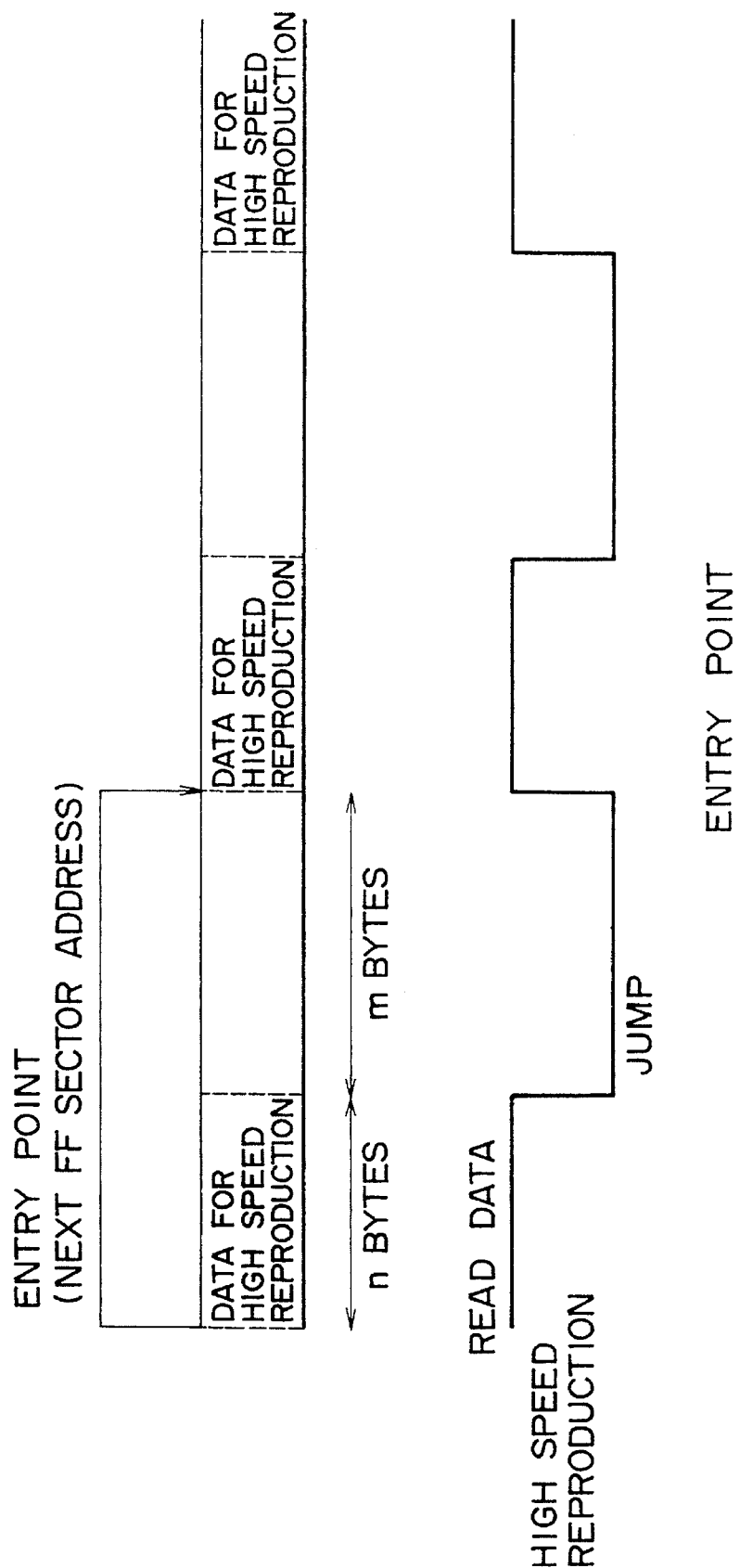
FIG. 34 is a diagrammatic view illustrating the function of an entry point used in the picture signal coding apparatus shown in FIG. 24.

Accordingly, when preceding data for high speed reproduction are to be read, the top address Next FF Sector Address of a sector in which next data for high speed reproduction are recorded is read simultaneously as seen from FIG. 34, and when reproduction of the preceding data for high speed reproduction is completed, the data reader can immediately jump to the sector in which the next data for high speed reproduction are recorded.

The entry point detector 81 detects an address (entry point address), in which the Next FF Sector Address is recorded, from the output of the data multiplexer 6. The entry point address is stored into the entry point storage apparatus 82. When the coding is completed, the sector allocator 7 writes the entry point stored in the entry point storage apparatus 81 into the Subcode.

Figure 36A:
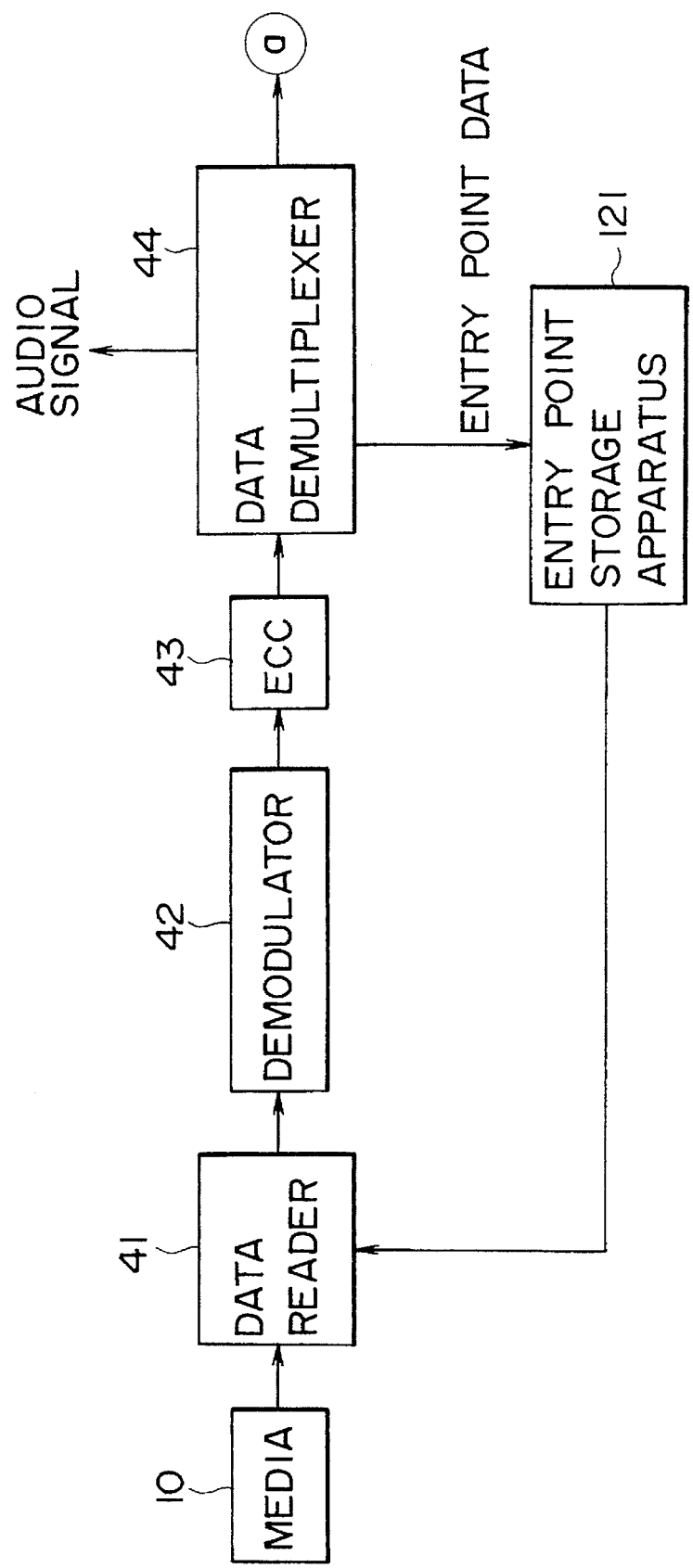
FIG. 36 is a block diagram showing a still further image signal decoding apparatus to which the present invention is applied.
Figure 37:
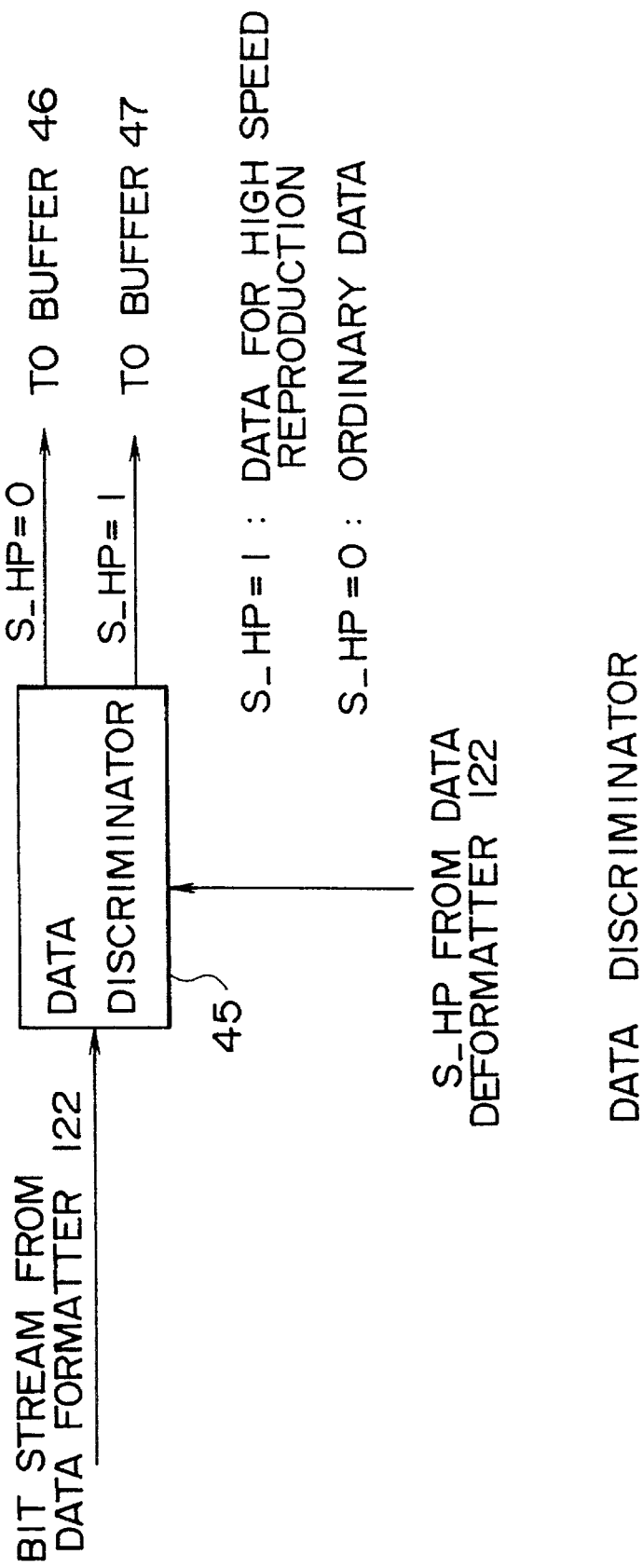
FIG. 37 is a diagrammatic view illustrating operation of a data discriminator in the image signal decoding apparatus shown in FIG. 36.

An example of construction of a picture signal decoding apparatus (decoder) in accordance with the fifth embodiment is shown in FIG. 36. In the fifth embodiment, as apparently seen from comparison with the embodiment shown in FIG. 12, entry point data are separated by the data demultiplexer 44 and supplied to and stored into the entry point storage apparatus 121. Then, the data reader 41 is controlled in response to the storage value to vary the accessing position thereof.

Further, a data deformatter 122 is interposed between the data demultiplexer 44 and the data discriminator 45, and a priority degree decoder 123 is interposed between the buffer selector 48 and the picture signal decoder 49. The data deformatter 122 separates the priority degree signal S_HP (Priority) and the data link header (FIG. 31) from the Subcode of data inputted thereto and supplies them to the data discriminator 45 and the priority degree decoder 123. The other construction of the picture signal decoding apparatus is similar to that of the picture signal decoding apparatus shown in FIG. 12.

The data demultiplexer 44 separates picture data and audio data from each other and decodes and supplies and stores an entry point to and into the entry point storage apparatus 121. The picture data are inputted to the data deformatter 122, by which data are extracted from each packet. In this instance, the data demultiplexer 44 reads, from the priority degree flag Priority of the packet header, whether or not data in the packet are data of a high priority degree (whether or not the priority degree flag S_HP is equal to 1) and outputs a result of the reading to the data discriminator 45.

The data discriminator 45 discriminates, from the priority degree flag S_HP inputted thereto from the data deformatter 122, whether or not the input data are data for high speed reproduction (data of a high priority degree). When S_HP=1, since the picture data inputted are data for high speed reproduction, the data discriminator 45 supplies the data to the buffer 46, but when S_HP=0, since the picture data inputted are data of the other kind, the data discriminator 45 supplies the data to the buffer 47.

Figure 35:
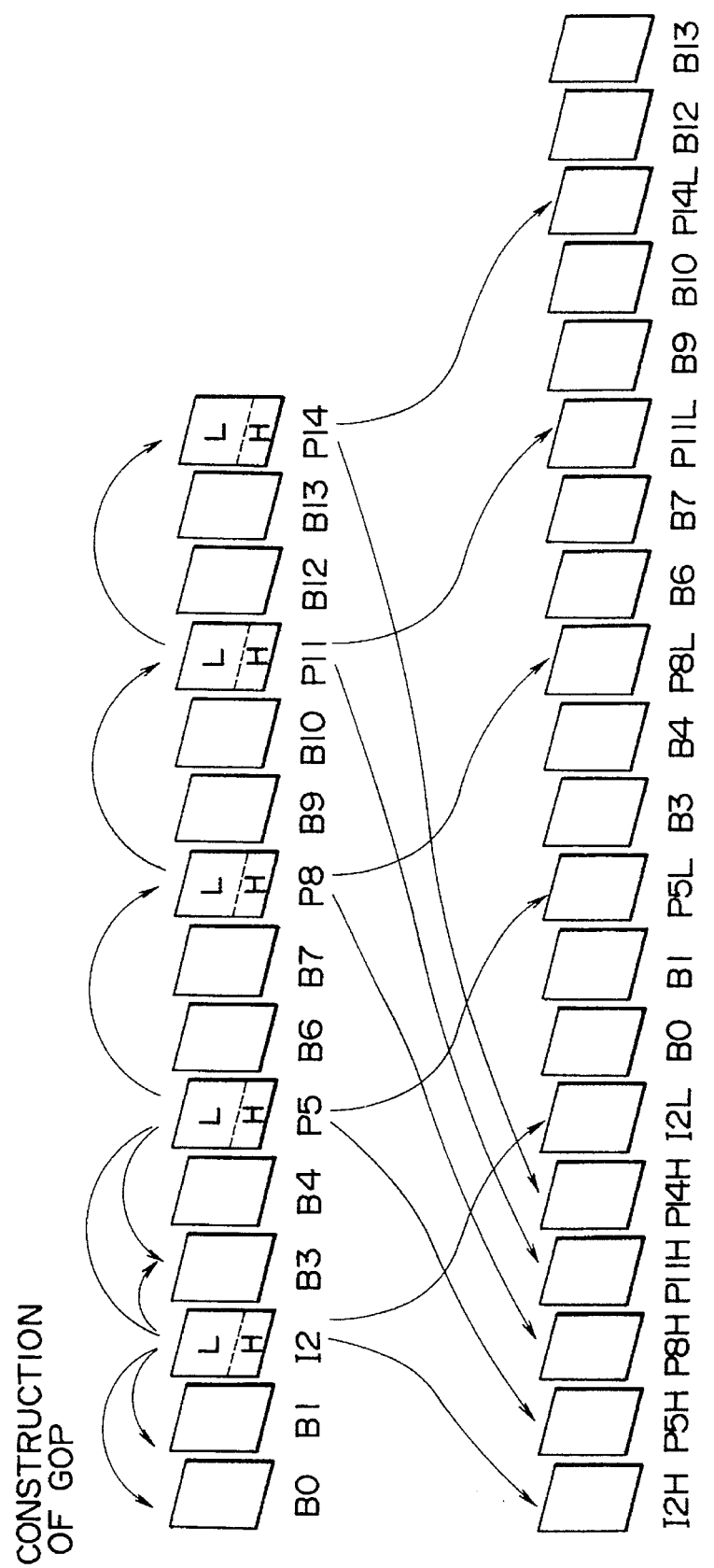
FIG. 35 is a diagrammatic view illustrating the relationship between a picture of a high degree of priority and another picture of a low degree of priority in the picture signal coding apparatus shown in FIG. 24.
Figure 38:
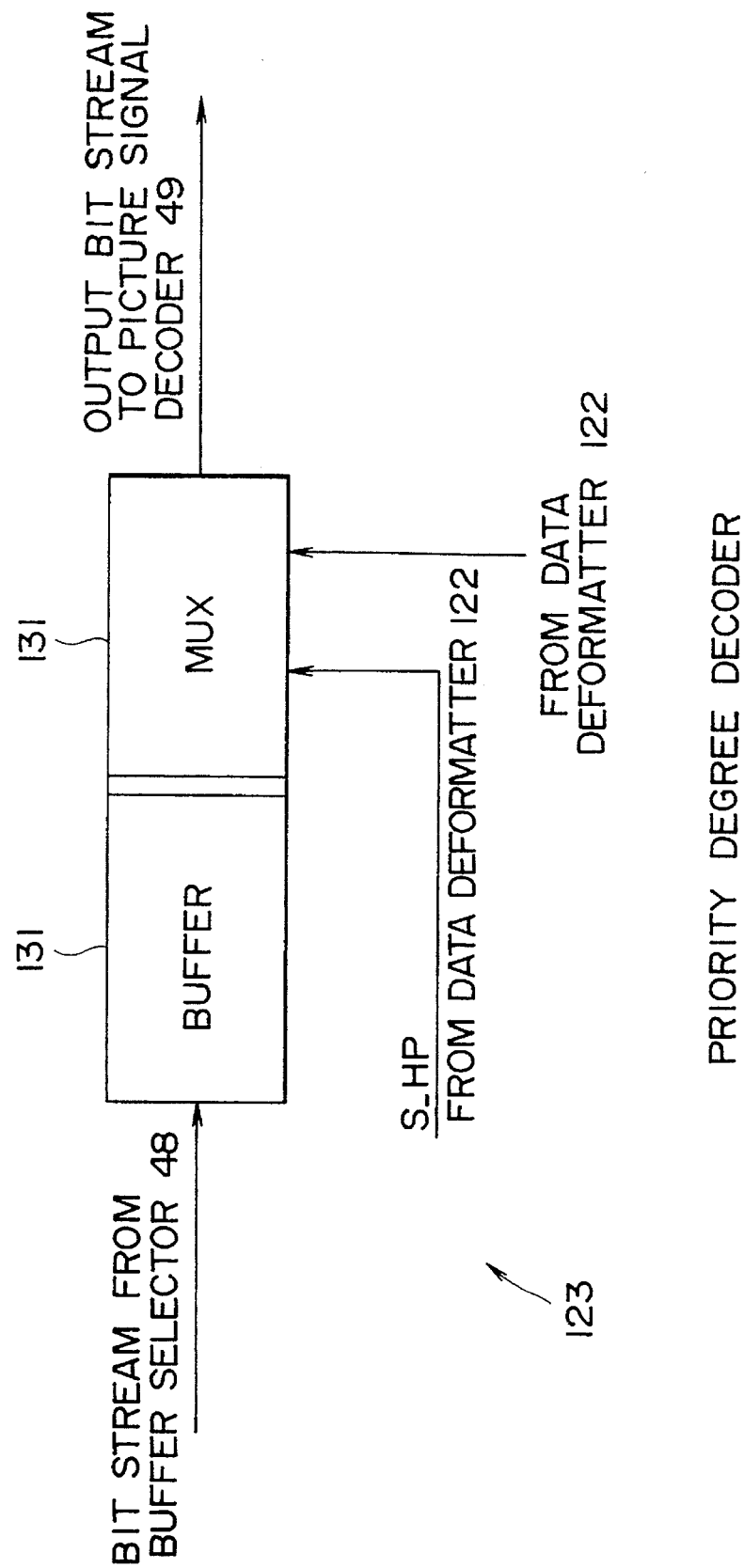
FIG. 38 is a block diagram showing an example of construction of a priority degree decoder in the image signal decoding apparatus shown in FIG. 36.

The priority degree decoder 123 is constituted, as shown, for example, in FIG. 38, from a buffer 131 and a multiplexer (MUX) 132. Upon high speed reproduction, high priority data I2H, P5H, P8H, P11H and P14H illustrated in FIG. 35 are supplied from the buffer 46 by way of the buffer selector 48 to and stored into the buffer 131. In this instance, since the priority degree flag S_HP is inputted from the data deformatter 122, the multiplexer 132 reads out the data and outputs them as they are to the picture signal decoder 49.

When predetermined data for high speed reproduction are read, the entry pointer recorded in the subcode of the sector is read and stored into the entry point storage apparatus 121. When the reading of the data for high speed reproduction is completed, the data reader 41 performs track jumping to the entry point indicated by the thus stored entry pointer.

The sequence of operations described above is repeated to effect high speed reproduction.

On the other hand, upon ordinary reproduction, high priority data I2H, P5H, P8H, P11H and P14H stored in the buffer 46 and low priority data I2L, B0, B1, P5L, B3, B4, P8L, B6, B7, P11L, B9, B10, P14L, B12 and B13 stored in the buffer 47 are supplied by way of the buffer selector 48 to and stored into the buffer 131 of the priority degree decoder 123.

The multiplexer 132 combines data of a high priority degree and data of a low priority degree in response to the data link header (FIG. 31) in the packet header supplied thereto from the data deformatter 122 to reconstruct the original decoded picture signal. In particular, the data I2H, P5H, P8H, P11H and P14H and the data I2L, P5L, P8L, P11L and P14L are combined to produce data I2, P5, P8, P11 and P14.

FIG. 39 illustrates a method of restoring the original data encoded in this manner. Referring to FIG. 39, first at step S11, a start code (Sync Byte in FIG. 31) of a GOP is determined. Then at step S12, a start code for data of a high priority degree is determined (the Service id whose Priority in FIG. 31 is 1 is sought). Further at step S13, a start code for data of a low priority degree is determined (the Service id whose Priority in FIG. 31 is 0 is sought). Then at step S14, the Frame Number and the Slice number determined at steps S12 and S13, respectively, are compared with each other. If they coincide with each other, then the control sequence advances to step S15, at which the data found out at steps S12 and S13 are combined. It is to be noted that, in this instance, the block end code provided at the last end of each block of the data of a high priority degree is removed.

After the original data are restored in this manner, the multiplexer 132 changes the order of the pictures of the GOP to I2, B0, B1, P5, B3, B4, P8, B6, B7, P11, B9, B10, P14, B12 and B13 and outputs the resulted data to the picture signal decoder 49.

<Sixth Embodiment>

The sixth embodiment is similar to the fifth embodiment in accordance with the present invention described hereinabove except that addresses of sectors which include data of a high priority degree for high speed reproduction are written in the TOC (Table of Contents). The construction of the TOC is similar to that illustrated in FIG. 21 described hereinabove.

Figure 40B:
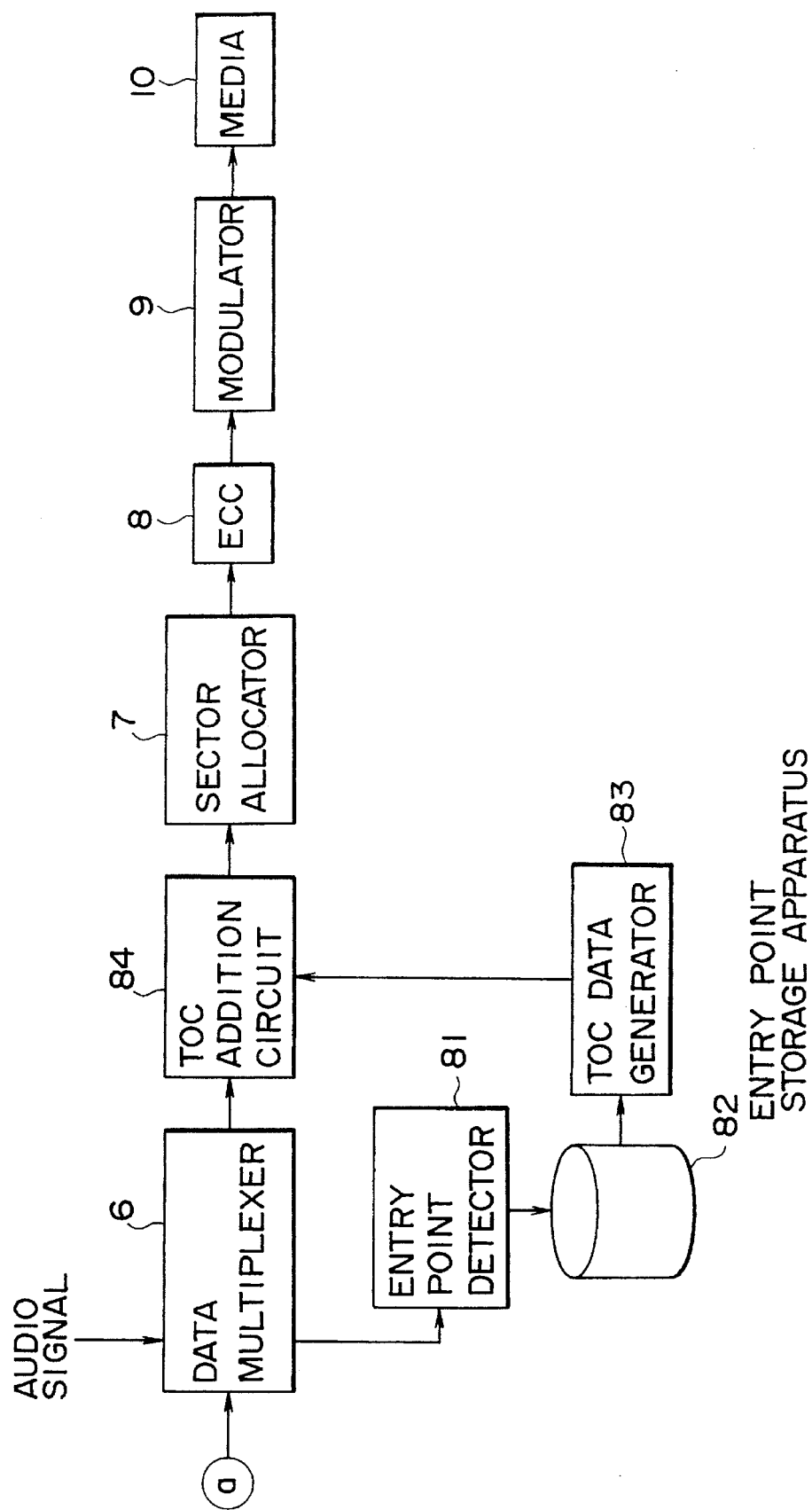
FIG. 40 is a block diagram showing a yet further image signal coding apparatus to which the present invention is applied.

An example of construction of a picture signal coding apparatus (encoder) in the present embodiment is shown in FIG. 40. Referring to FIG. 40, in the present embodiment, a TOC addition circuit 84 is interposed between the data multiplexer 6 and the sector allocator 7 shown in FIG. 24. The entry point detector 81 detects an entry point from the output of the data multiplexer 6 and stores it into the entry point storage apparatus 82. The TOC data generation circuit 83 generates TOC data corresponding to data in the entry point storage apparatus 82 and outputs the TOC data to the TOC addition circuit 84. The TOC addition circuit 84 multiplexes the TOC data with picture data outputted from the data multiplexer 6.

Figure 22A:
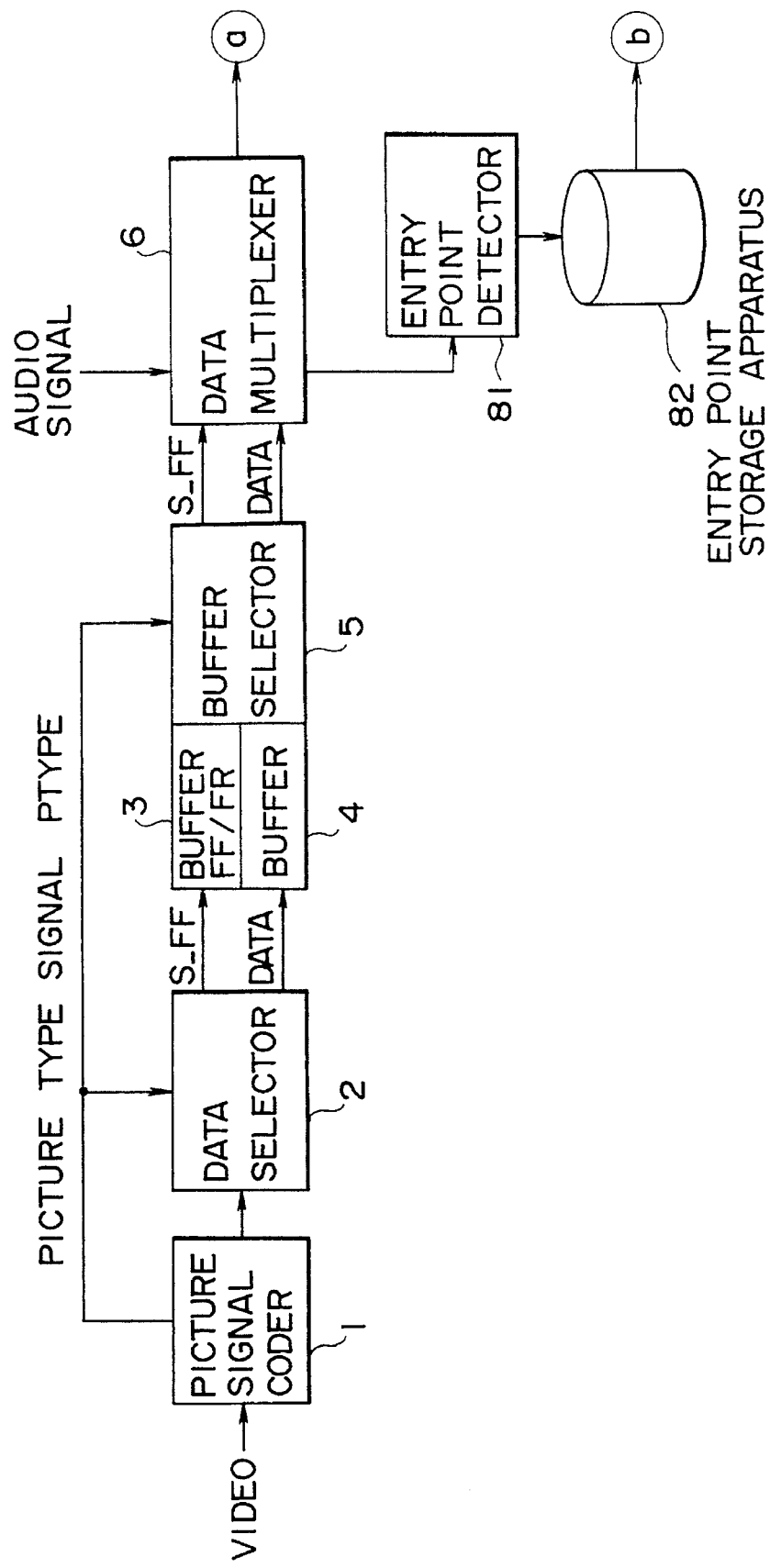
FIG. 22 is a block diagram of a further picture signal coding apparatus to which the present invention is applied.

Operation of the TOC addition circuit 84 is similar to that in the embodiment shown in FIG. 22, and accordingly, overlapping description thereof is omitted herein to avoid redundancy.

Figure 41A:
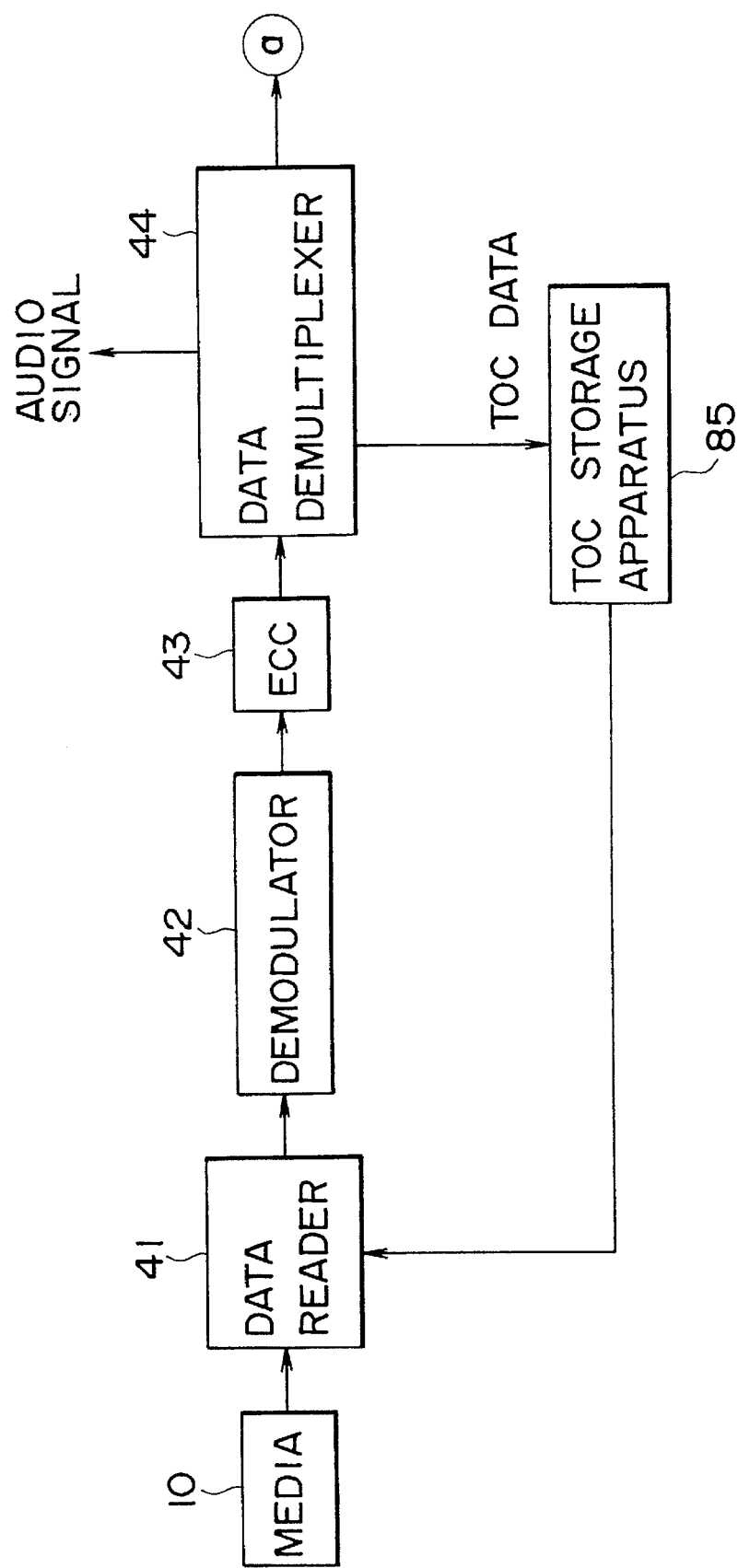
FIG. 41 is a block diagram showing a yet further image signal decoding apparatus to which the present invention is applied.

An example of construction of a picture signal decoding apparatus (decoder) in the sixth embodiment is shown in FIG. 41. In the present embodiment, a TOC storage apparatus 85 is connected to the data demultiplexer 44 in place of the entry point storage apparatus 121 shown in FIG. 36. Thus, TOC data separated by the data demultiplexer 44 are stored into the TOC storage apparatus 85, and the accessing position of the data reader 41 is controlled in response to the stored data in the TOC storage apparatus 85.

Operation of the picture signal decoding apparatus is similar to that in the embodiment of FIG. 23, and accordingly, overlapping description of it is omitted herein to avoid redundancy.

<Seventh Embodiment>

The seventh embodiment in accordance with the present invention is similar to the fifth embodiment except for the details of buffer selector 5 and the sector allocator 7 (FIG. 24).

The buffer selector 5 in the seventh embodiment performs separation between data of a high priority degree for high speed reproduction and data of a low priority degree in units of a GOP. The sector allocator 7 in the seventh embodiment performs allocation of sectors so that the head of each GOP and the head of a corresponding sector may coincide with each other. Further, data of a high priority degree for high speed reproduction in units of a GOP are allocated to the head of the sector. The arrangement of the data recorded on the recording medium 10 in such a manner as described above is such as shown in FIG. 35. As seen from FIG. 35, of a GOP which includes pictures B0 to P14, high priority data I2H, P5H, P8H, P11H and P14H of the pictures I2, P5, P8, P11 and P14 are first recorded collectively. Subsequently to them, low priority data I2L, P5L, P8L, P11L and P14L of the pictures I2, P5, P8, P11 and P14 are disposed such that two B-pictures may be interposed between each two adjacent ones of them, that is, in the order of I2L, B0, B1, P5L, B3, B4, P8L, B6, B7, P11L, B9, B10, P14L, B12 and B13.

<Eighth Embodiment>

The eighth embodiment in accordance with the invention is similar to the fifth embodiment except for the buffer selector 5 and the sector allocator 7. The buffer selector 5 in the eighth embodiment performs separation of data of a high priority degree for high speed reproduction and data of a low priority degree in units of a frame. Data for high speed reproduction are allocated in units of a frame to the top of the frame.

<Ninth Embodiment>

The ninth embodiment in accordance with the invention is similar to the fifth embodiment except for the priority degree adder 101 (FIG. 24). The priority degree adder 101 in the ninth embodiment determines an intra-macro block in each frame as data of a high priority degree and determines any other data as data of a low priority degree.

<Tenth Embodiment>

Figure 42A:
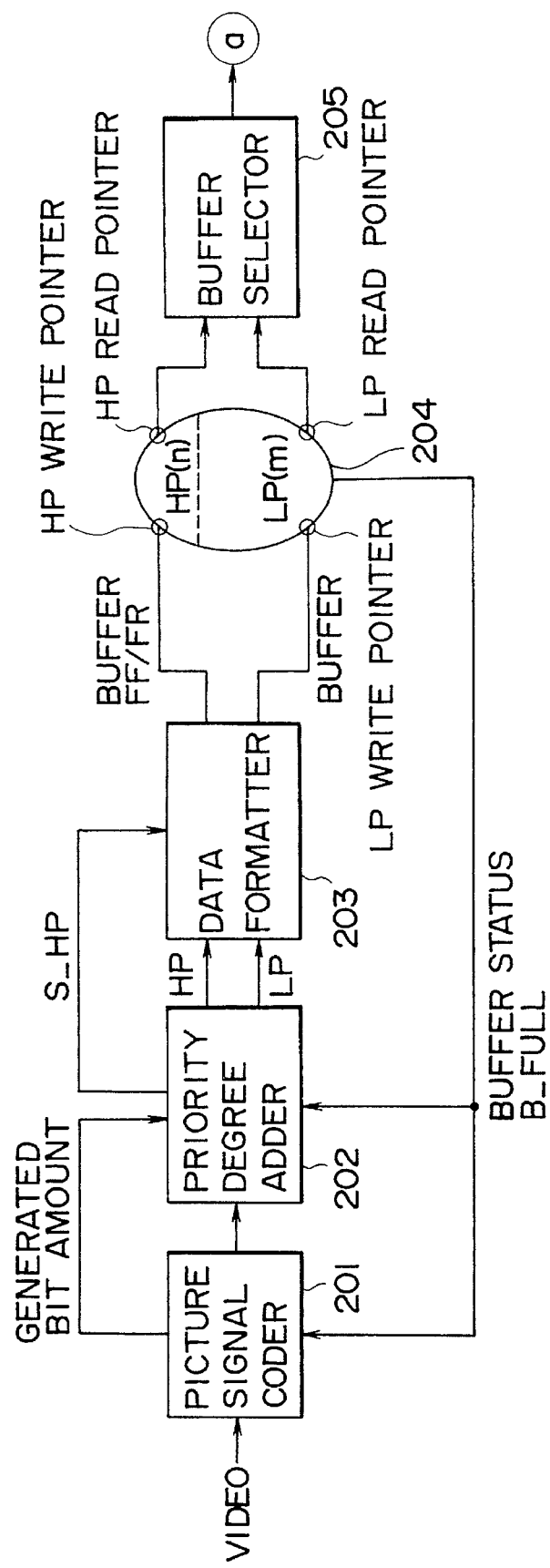
FIG. 42 is a block diagram showing a yet further image signal coding apparatus to which the present invention is applied.

The construction of a picture signal encoding apparatus (encoder) in accordance with the tenth embodiment is shown in FIG. 42. It is to be noted that like elements to those of FIG. 24 are denoted by like reference numerals.

Figure 43B:
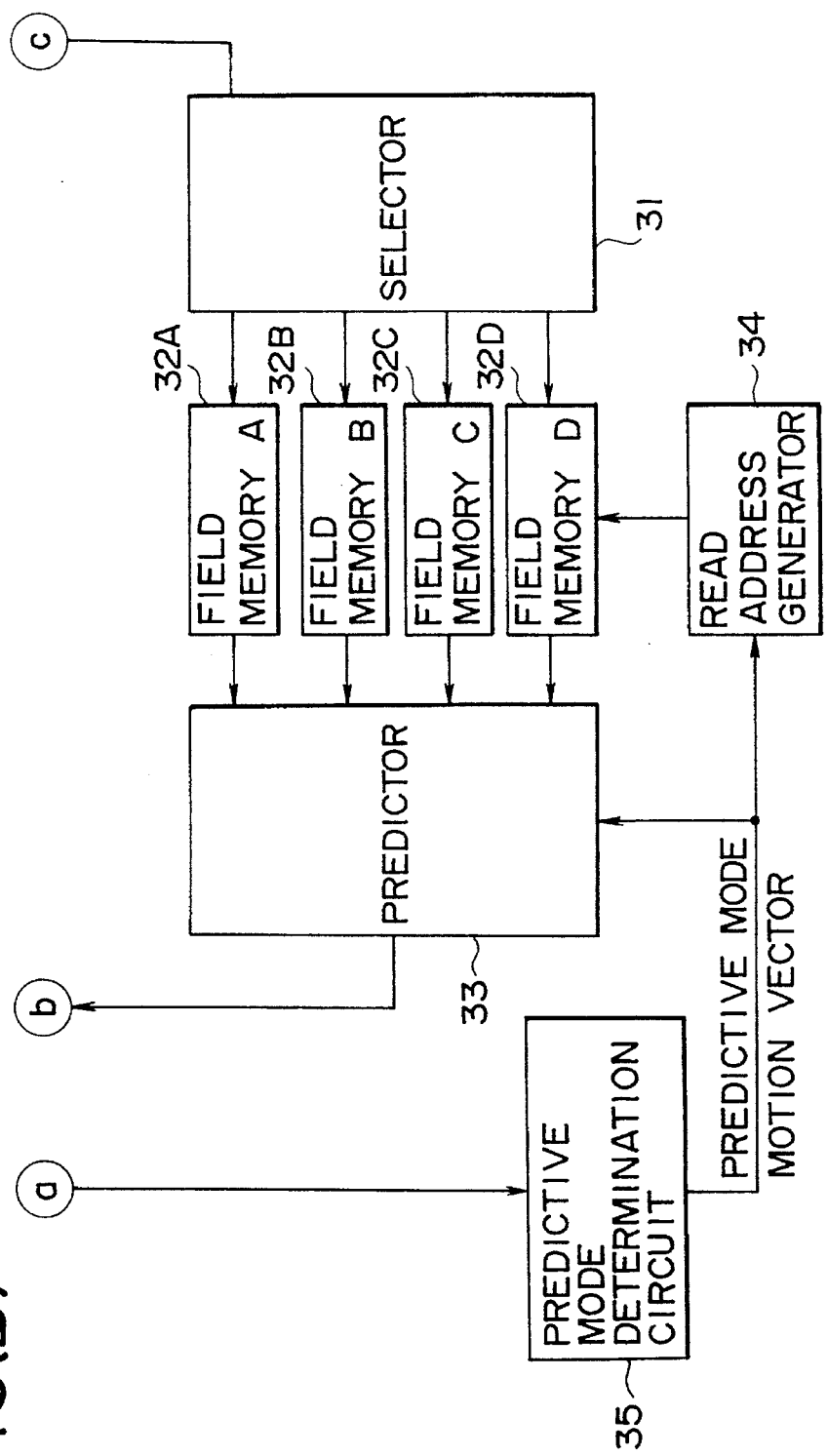
FIG. 43 is a block diagram showing an example of construction of a picture signal coder of the image signal coding apparatus shown in FIG. 42.

A picture signal coder 201 is constructed in such a manner as shown in FIG. 43. In particular, the picture signal coder 201 is constructed in a similar manner to the picture signal coder 1 described hereinabove in connection with the fifth embodiment with reference to FIG. 25 except that the buffer 27 is omitted and the generated bit amount outputted from the buffer 27 in FIG. 25 is outputted from the variable length coder 26.

Accordingly, the picture signal coder 201 codes a picture signal in a similar manner as described hereinabove with reference to FIG. 25 and outputs the coded data together with a code amount of the coded data (a generated bit amount).

It is to be noted that, to the quantizer 25 (dequantizer 28) constituting the picture signal coder 201 of FIG. 43, a signal (Buffer status B_FULL) representative of an accumulated amount (HP +LP) of high priority data HP and low priority data LP in a two-point buffer 204, which will be hereinafter described, is supplied in place of a generated bit amount so that the quantization step (dequantization step) of the quantizer (25 (dequantizer 28) is controlled so as not to cause an overflow or an underflow.

Accordingly, it is considered that, in the present picture signal coding apparatus (FIG. 42), the two-point buffer 204 serves also as the buffer 27 of the picture signal coding apparatus shown in FIG. 25.

Coded data and a generated bit amount of the coded data outputted from the picture signal coder 201 are inputted to a priority degree adder 202. It is to be noted that the coded data are inputted in the descending order of the degree of priority to the priority degree adder 202 as described hereinabove with reference to FIG. 27.

Figure 44:
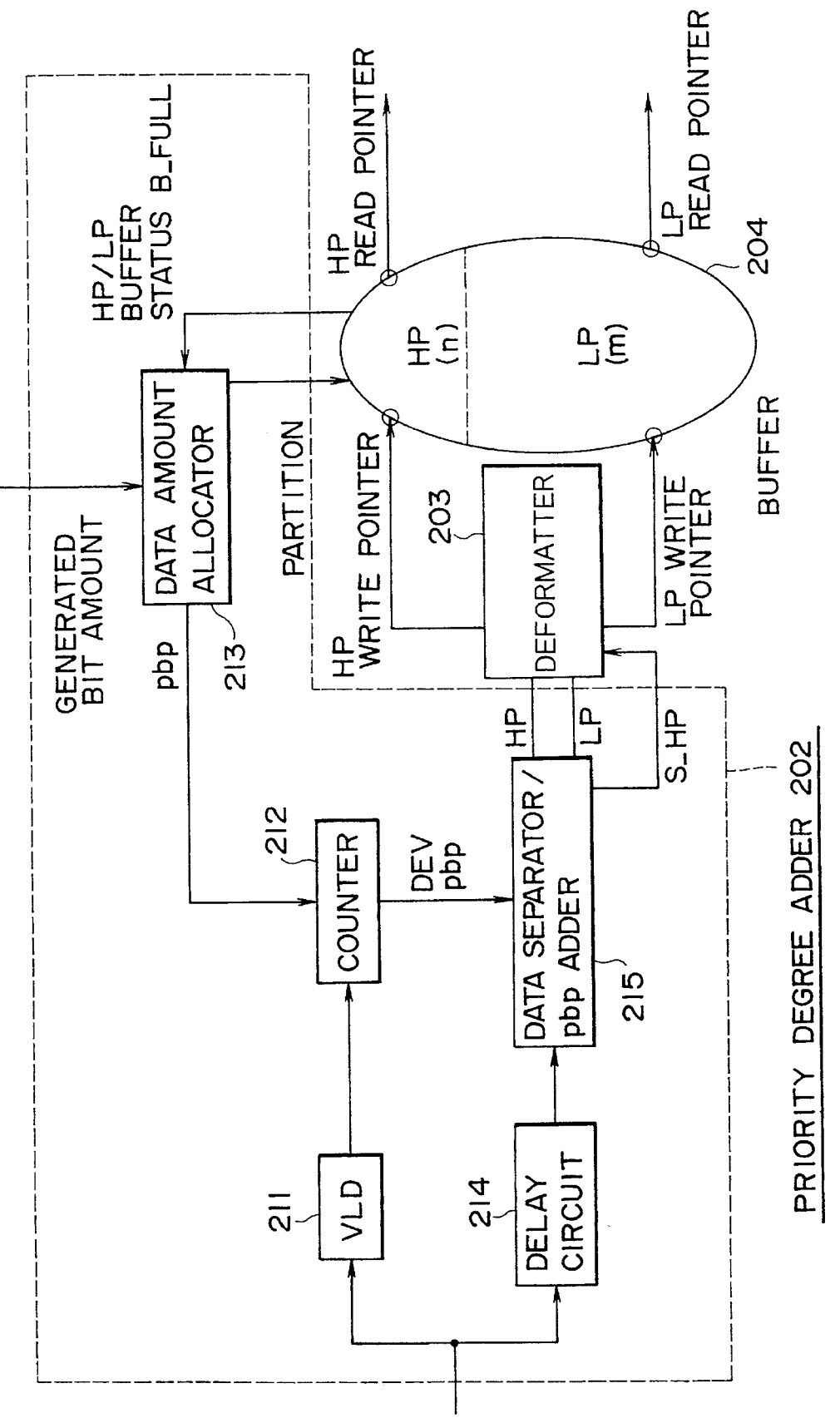
FIG. 44 is a block diagram showing an example of construction of a priority degree adder of the Image signal coding apparatus shown in FIG. 42.

The priority degree adder 202 is constructed, for example, in such a manner as shown in FIG. 44. Referring to FIG. 44, the priority degree adder 202 is supplied with, in addition to coded data and a generated bit amount of the coded data from the picture signal coder 201, a signal (Buffer status B_FULL) representative of a total accumulated amount of high priority data HP and low priority data LP of the two-point buffer 204.

Coded data are inputted to a syntax analysis (VLD) circuit 211 and a delay circuit 214. The VLD circuit 211 analyzes the coded data by syntax analysis and outputs a result of the analysis to a counter 212. In particular, the VLD circuit 211 processes the coded data by inverse variable length coding to detect an event (VLC event) of variable length coding processing, which has been performed for the coded data by the variable length coder 26 (FIG. 43) of the picture signal coding apparatus 201.

The VLC event is now described. The variable length coder 26 performs coding with a set (run and level) of a number (run) of data which successively precede to certain non-zero data in a data train inputted thereto and a value (level) of the non-zero data. Such set (run and level) is called VLC event.

The VLD circuit 211 outputs a detection signal to the counter 212 each time a VLC event is detected from coded data.

Meanwhile, coded data inputted to the delay circuit 214 are delayed by a time corresponding to the time of processing by the VLD circuit 211 and then outputted to a data separation/pbp adder 215.

Meanwhile, a generated bit amount of coded data and a signal (Buffer status B_FULL) representative of an accumulated amount of the two-point buffer 204 are inputted to a data allocator 213. The data allocator 213 determines the number of VLC events corresponding to an amount of data which can be allocated to high priority data in response to the generated bit amount of the coded data and the signal (Buffer status B_FULL) representative of the accumulated amount of the two-point buffer 204.

In other words, the data allocator 213 determines the number of VLC events to a separation point at which DCT coefficients (AC coefficients) are separated into data of a high priority degree and data of a low priority degree.

The number of VLC events determined by the data allocator 213 will be hereinafter referred to as pbp (priority break point). It is to be noted that the pbp and a data—partition—flag and a priority class, which will be hereinafter described, are described in AVC-491b version 2, Test Model 5, ISO/IEC JTC1/SC29/WG11, pp. 110–116, April, 1993.

The pbp is influenced principally by the generated bit amount of coded data from between the generated bit amount of coded data and the accumulated amount (Buffer status B_FULL) of the two-point buffer 204. In particular, where the generated bit amount of coded data is great, the pbp has a low value since the amount of data which can be allocated to high priority data is great, but on the contrary where the generated bit amount is small, the pbp has a high value since the amount of data which can be allocated to high priority data is great.

Further, where the accumulated amount (Buffer status B_FULL) of the two-point buffer 204 is great, the pbp has a low value, but on the contrary where the accumulated amount is small, the pbp has a high value.

The pbp is described in (added to) the header of an MB (macro block) of coded data outputted from the delay circuit 214 by the data separation/pbp adder 215 which will be hereinafter described.

Here, coded data are numbered, in priority class (Priority class), 0, 1, 2, . . . in the descending order of the priority degree as seen in FIG. 45, and data having the priority class of up to 4, that is, all data of a sequence, a GOP and a picture layer, data from the top of a slice layer to the pbp described in the MB header, data of the MB from the MB (macro block) stuffing (MB stuffing) to the MB type (MB type), data of motion vectors of the forward prediction, data of motion vectors of the rearward prediction and data of the MB from the CBP (Coded Block Pattern) to the DC coefficient of DCT coefficient (coefficient of the (0, 0)th component) are determined as essential data and hence as high priority data.

Meanwhile, coded data having the priority classes equal to or higher than 5, that is, data of a lower priority degree, are determined as coefficients (AC coefficients) of a higher order except the DC coefficient of DCT coefficients.

In particular, data whose priority class is 5, 6, . . . are first, second, . . . non-zero coefficients (AC coefficients) succeeding to the DC coefficient (coefficient of the (0, 0)th component) of DCT coefficients in the order of zigzag scanning of the DCT coefficients.

Since the pbp is the number of VLC events involved up to a separation point at which DCT coefficients (AC coefficients) are separated into data of a high priority degree and data of a low priority degree as described hereinabove, it is equal to the number of non-zero coefficients (AC coefficients) succeeding to the DC coefficient (coefficient of the (0, 0)th component) of the DCT coefficients in the order of zigzag scanning of the DCT coefficients.

Accordingly, if the value of the pbp is represented as j, then the priority class is represented as j+4.

It is to be noted that the number of DCT coefficients (AC coefficients) of a block of 8×8 picture elements except the DC coefficient is 63, and accordingly, the number of non-zero AC coefficients is 63 at the greatest. Therefore, the variable j ranges from 1 to 63, inclusive.

On the other hand, where all of the AC coefficients are low priority data, that is, where only essential data up to the DC coefficient of DCT coefficients whose priority is 4 are determined as high priority data, the pbp as the number of non-zero coefficients (AC coefficients) succeeding to the DC coefficient in the order of scanning of the DCT coefficients is 0.

From the foregoing, the pbp outputted from the data allocator 213 assumes a value ranging from 0 to 63.

Furthermore data whose priority class ranges from 0 to 3 as essential data illustrated in FIG. 45, values which are not used as yet such as, for example, 65 to 68, are allocated as the pbp, the pbp of any of the values will not be outputted to the data allocator 213 at all.

Further, the pbp is determined for each slice by the data allocator 213 at a timing at which, for example, the top of the slice is inputted to the priority degree adder 202, and is outputted to the counter 212. Accordingly, the values of the pbp of blocks constituting a certain slice all have an equal value.

After such a pbp as described above is determined, the data allocator 213 determines a size of a region of the two-point buffer 204 into which high priority data HP are to be stored, and outputs a signal "partition" representative of the size to the two-point buffer 204.

In response to the signal "partition", the two-point buffer 204 assures a region n into which high priority data HO are to be stored. It is to be noted that the remaining region is determined as a region into which low priority data LP are to be stored.

The pbp determined by the data allocator 213 is outputted to the counter 212. The counter 212 is reset to zero at a timing at which the block end coder (EOB) is inputted to the VLD circuit 211, and counts the detection signal outputted from the VLD circuit 211 and indicating that a VLC event is detected from coded data. Then, when the count value becomes equal to the pbp from the data allocator 213, the counter 212 outputs a division signal DEV and the pbp from the data allocator 213 to the data separation/pbp adder 215.

The data separation/pbp adder 215 outputs coded data, which have been inputted in the descending order of priority to and delayed by the delay circuit 214, as high priority data to the data formatter 203 and outputs a priority degree signal S_HP of 1 to the data formatter 203.

Then, at a timing at which the division signal DEV is supplied from the counter 212, the data separation/pbp adder 215 outputs coded data inputted thereto after then as low priority data LP to the data formatter 203 and outputs the priority degree signal S_HP of 0 to the data formatter 203. Thereafter, when a block end code (EOB) is outputted from the delay circuit 214, the data separation/pbp adder 215 outputs coded data inputted thereafter then as high priority data again to the data formatter 203 and outputs the priority degree signal S_HP of 1 to the data formatter 203.

The processing described above is repeated so that coded data are allocated as either high priority data and low priority data. In this instance, the position at which the high priority data and the low priority data are separated from each other can be known from the pbp, and accordingly, the necessity of adding a block end code (EOB) to a data separation point is eliminated.

It is to be noted that, when the number of VLC events in the AC coefficients of DCT coefficients in a block is smaller than the pbp outputted from the data allocator 213, that is, when a block end code is inputted to the data separation/pbp adder 215 before a division signal DEV is outputted from the counter 212, the data separation/pbp adder 215 outputs all of the data of the block as high priority data HP to the data formatter 203. Further, in this instance, the counter 212 is reset.

Figure 46:
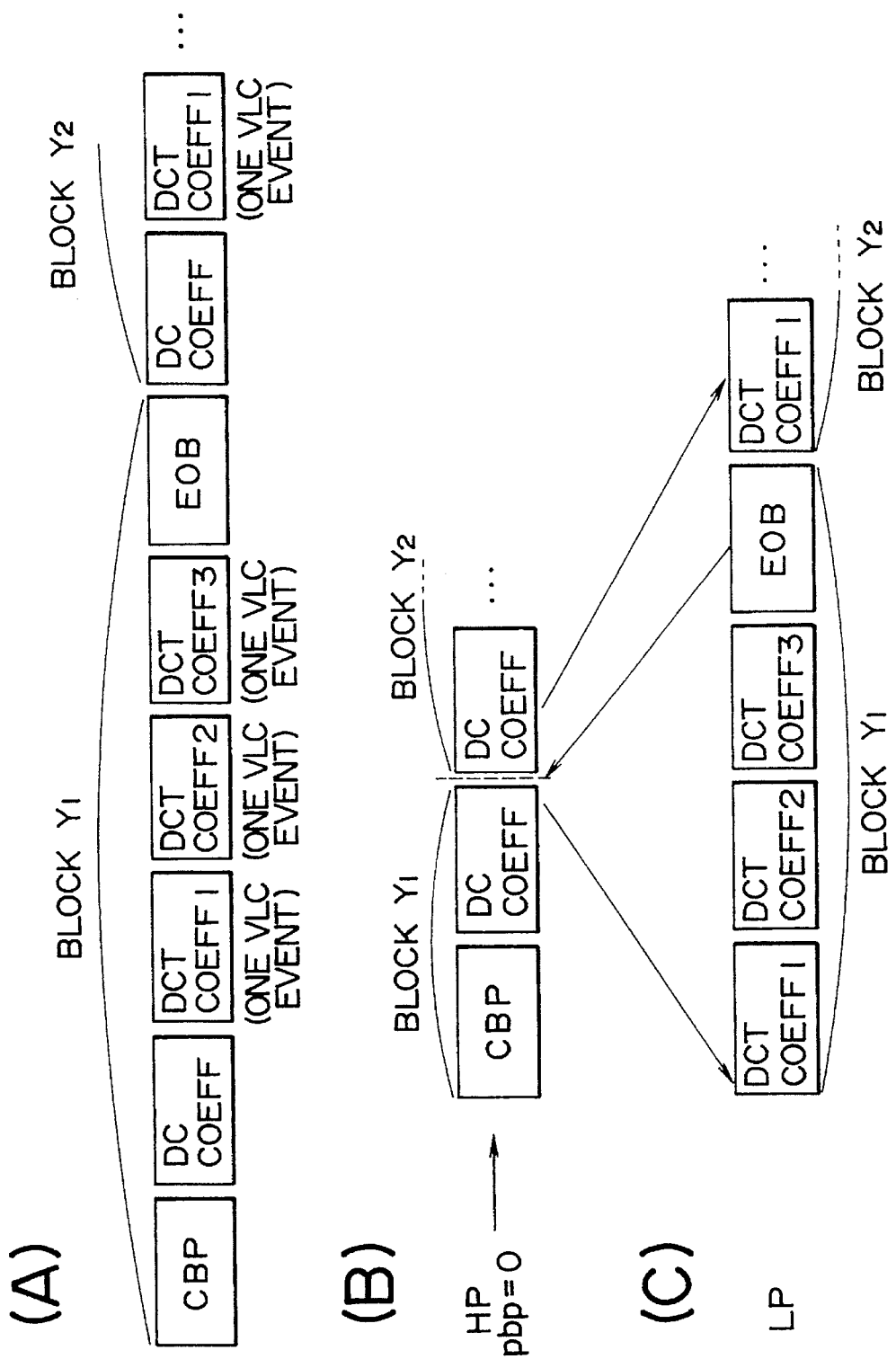
FIG. 46 is a diagrammatic view illustrating operation of a data separation/pbp adder constituting the priority degree adder shown in FIG. 44.

A concrete example of the priority allocation is illustrated in FIG. 46. As shown in (A) of FIG. 46, in the case of coded data inputted in the descending order of priority like the CBP of the head of an MB (macro block), the DC coefficient (DC Coeff) of a block Y1, the AC coefficients of the block Y1 (DCT Coeff1, DCT Coeff2 and DCT Coeff3), a block end coder (EOB), the DC coefficient (DC Coeff) of another block Y2, the AC coefficients (DCT Coeff1, . . . ) of the block Y2, . . . , when the pbp is determined to be, for example, 0, the CBP as essential data is first determined as high priority data HP ((B) of FIG. 46).

Further, since the DC coefficient (DC Coeff) of the block Y1 succeeding to the CBP is essential data, it is determined as high priority data HP ((B) in FIG. 46)).

Then, since the pbp, that is, the number of non-zero coefficients (AC coefficients) to appear succeeding to the DC coefficient in the order of zigzag scanning of the DCT coefficients, is determined to be 0, the data separation point is at the position of the DC coefficient, and accordingly, the AC coefficients of the block Y1 (DCT Coeff1, DCT Coeff2 and DCT Coeff3) succeeding to the DC coefficient (DC Coeff) of the block Y1 are all determined as low priority data LP ((C) in FIG. 46).

Further, when the block end code (EOB) of the block Y1 is inputted ((C) of FIG. 46), in the data of the block Y2 (DC Coeff, DC Coeff1, . . . ) to be inputted after then, only the DC coefficient is determined as high priority data ((B) of FIG. 46) while the AC coefficient is determined as low priority data ((C) of FIG. 46) similarly as in the case of the block Y1 described above.

Referring back to FIG. 44, in the data separation/pbp adder 215, in addition to the priority degree allocation described above, a pbp outputted from the counter 212 is written together with other necessary information into such a sequence header, a picture header or a slice header corresponding to high priority data or low priority data as illustrated in FIG. 47.

In particular, into the sequence header ((A) of FIG. 47), a flag data_partition_flag indicating whether or not priority degree allocation should be performed, that is, whether or not coded data should be separated into high priority data and low priority data, is described. It is to be noted that the flag data_partition_flag is set only when priority degree allocation should be performed.

Further, if the flag data_partition_flag is set, then a pbp regarding an intra-macro block is described into the picture header ((B) of FIG. 47).

Further, if the flat data_partition_flag is set, then a pbp determined by the data allocator 213 (FIG. 44) is described into the slice header ((C) of FIG. 47) subsequently to a slice start code slice_start_code and a quantization step Quantizer_scale.

It is to be noted that essential data allocated to high priority data without fail as described above by the priority degree adder 202 (that is, data whose priority class ranges from 0 to 4 in FIG. 45) are only I- and P-pictures. Accordingly, the priority degree adder 202 allocates other data of the I- and P-pictures (data other than the essential data described above) and data of B-pictures as one of high priority data and low priority data in response to the pbp.

The data formatter 203 (FIG. 42) adds a header of a packet illustrated in FIG. 48 which will be hereinafter described to high priority data or low priority data outputted from the priority degree adder 202. Further, the high priority data and the low priority data are gathered together in units of a packet so that the data of the two kinds may not be present in a mixed condition with each other in the one packet. The packet of the high priority data and the low priority data is stored into the two-point buffer 204, which is divided at n:m into two regions in such a manner as described hereinabove, and then read out at the ratio of n:m from the two-point buffer 204 to the buffer selector 205. It is to be noted that, in this instance, the high priority data and the other data (low priority data) are successively read out in this order from the two-point buffer 204 and outputted to the buffer selector 205.

The buffer selector 205 converts the packets of the high priority data and the low priority data thus read out into a pack.

Figure 48:
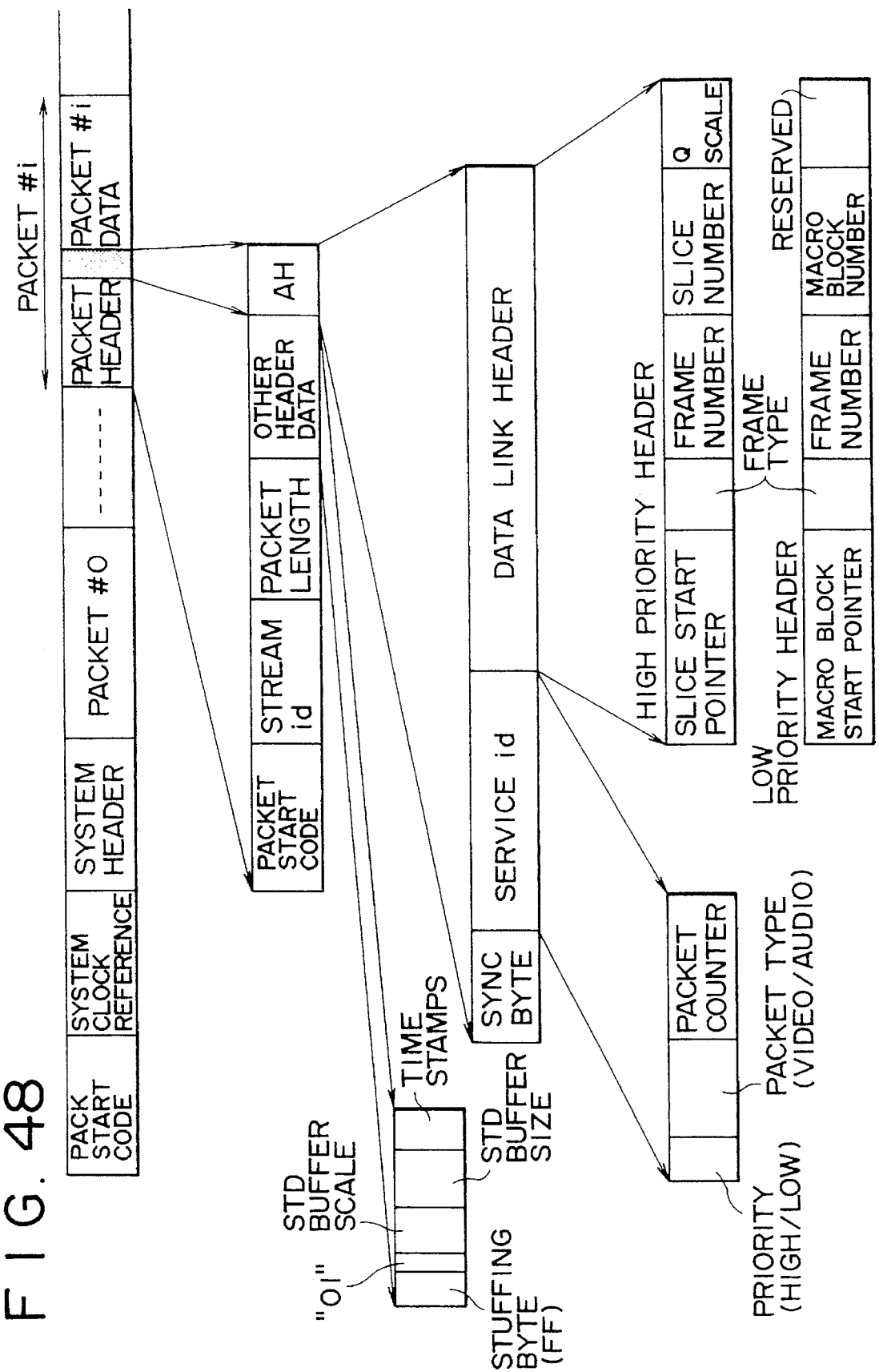
FIG. 48 is a diagrammatic view illustrating a format of a pack in the image signal coding apparatus shown in FIG. 42.

FIG. 48 shows a format of a pack outputted from the buffer selector 205. Referring to FIG. 48, the pack shown has the same structure as the format of the pack described hereinabove with reference to FIG. 31 except for the data link header (Data Link Header) which constitutes the adaptation header AH of the packet header.

In particular, into the data link header for combining data of a high priority degree and data of a low priority degree to reconstruct the original picture signal, a high priority data start pointer, a frame type (Frame Type), a frame number (Frame Number), a slice number (Slice Number) and a quantization step (Q scale) are recorded when Priority=1 (high).

On the other hand, when Priority=0 (low), a low priority data start pointer, a frame type (Frame Type), a frame number (Frame Number), a macro block number (Macro Block Number) and a reservation code (reserved) are recorded into the data link header.

Accordingly, in the present tenth embodiment, a slice number of high priority data is described into the link header, and consequently, data which can be decoded completely can be obtained in units of a slice similarly as to the fifth embodiment. Meanwhile, as regards low priority data, since a macro block number is described into the link header, if corresponding high priority data have been decoded, then data which can be decoded completely can be obtained in units of an MB (macro block).

The packets of the high priority data and the low priority data packed in such a manner as described above are outputted to the data multiplexer 6. Then, similarly as in the case described hereinabove with reference to FIG. 24, the data of a high priority degree (data for high speed reproduction) and the data of a low priority degree (data of the other type) are written onto the recording medium 10.

The two-point buffer 204 is formed as a ring buffer such that the storage region thereof is divided into two regions including an area n, into which high priority data HP are to be stored, and another area m, into which low priority data LP are to be stored, as indicated by a broken line in FIGS. 42 and 44 in response to a signal "partition" (FIG. 44) supplied thereto from the data allocator 213 of the priority degree adder 202 as described hereinabove.

In the two-point buffer 204, reading or writing of data from or into the region n is controlled by an HP read pointer or an HP write pointer while reading or writing of data from or into the region m is controlled by an LP read pointer or an LP write pointer.

Accordingly, the packet of the high priority data from the data formatter 203 is written into an address designated by the HP write pointer. Then, the packet of the high priority data is read out from an address designated by the HP read pointer and is outputted to the buffer selector 205. Meanwhile, the packet of the low priority data from the data formatter 203 is written into an address designated by the LP write pointer. Then, the packet of the low priority data is read out from an address designated by the LP read pointer and is outputted to the buffer selector 205.

When a decoder for decoding a bit stream recorded on the recording medium 10 is considered, the decoder has a so-called code buffer which temporarily stores the bit stream transmitted thereto.

Consequently, on the encoder side, an imaginary buffer having an equal capacity to that of the code buffer on the decoder side so that the code buffer may not overflow or underflow is assumed, and a bit stream produced as a result of coding is temporarily stored into and then outputted from the imaginary buffer and the amount of data accumulated in the imaginary buffer is supervised to effect control of the amount of codes to be generated (bit allocation for quantization).

In an encoder which conforms to the MPEG, in order that the code buffer on the decoder side may not overflow or underflow, the accumulated data amount when a bit stream is outputted from the imaginary buffer for a period of time after the bit stream is inputted to the imaginary buffer until it is outputted is described into vbv_delay of a picture header, and on the decoder side, when the accumulated data amount of the code buffer becomes equal to the data amount indicated by the vbv_delay described in the picture header, a bit stream corresponding to the pictures is read out from the code buffer.

Here, in the picture signal coding apparatus (FIG. 24) of any of the embodiments preceding to the ninth embodiment, for example, the fifth embodiment, the two buffers 3 and 4 for storing high priority data and low priority data, respectively, are provided. Consequently, also the picture signal decoding apparatus (FIG. 36) for decoding a bit stream outputted from such picture signal coding apparatus requires the two buffers 46 and 47 for storing high priority data and low priority data, respectively.

Accordingly, in this instance, two vbv_delay flags corresponding to high priority data and low priority data are required. This is because, even when the sum value (HP and LP) of high priority data HP and low priority data LP is high with respect to the total of the storage capacities of the two buffers that neither overflow nor underflow occurs, there still remains the possibility that one of the two buffers may overflow or underflow.

Therefore, in the picture signal coding apparatus in the tenth embodiment, the two-point buffer 204 constructed as a ring buffer is divided into the two regions n and m for storing high priority data and low priority data, respectively, so that only description of one vbv_delay may be required.

By this means, it is not required to supervise the accumulated amounts of high priority data and low priority data, that is, two accumulated amounts, but to supervise only the total of the two accumulated amounts.

Reading and writing of data from and into the two-point buffer 204 is controlled with the HP read pointer, the HP write pointer, the LP read pointer and the LP write pointer as described above, and in this instance, if it is assumed that each pointer moves in the counterclockwise direction on the ring buffer as the two-point buffer 204, then the pointers are controlled so that the LP read pointer may not pass the LP write pointer, the HP write pointer may not pass the LP read pointer, the HP read pointer may not pass the LP write pointer, and the LP write pointer may not pass the HP read pointer.

In the ring buffer as the two-point buffer 204, high priority data are stored within the range from the HP read pointer to the HP write pointer in the counterclockwise direction, and the magnitude of the range is controlled so that it may not exceed the magnitude of the region n when the two-point buffer 204 is divided at the ratio of n:m into two regions as described hereinabove. Similarly, low priority data are stored within the range from the LP read pointer to the LP write pointer in the clock wise direction, and the magnitude of the range is controlled so that it may not exceed the magnitude of the region m when the two-point buffer 204 is divided at the ratio of n:m into two regions as described hereinabove.

It is to be noted that, for example, at the main profile main level of the MPEG2, the capacity of such buffer as described above is defined to be 1.75 Mbits, and also the two-point buffer 204 is formed so that it has an equal storage capacity.

Meanwhile, the region division of the two-point buffer 204 may be adaptively changed over in response to the signal "partition" from the data allocator 213, or the division ratio may be fixed, for example, to n:m=1:4.

The construction of a picture signal decoding apparatus (decoder) in accordance with the tenth embodiment is shown in FIG. 50. It is to be noted that, in FIG. 50, like elements to those of FIG. 36 are denoted by like reference numerals.

A bit stream recorded on the recording medium 10 is inputted, similarly as in the picture signal decoding apparatus shown in FIG. 36, by way of a data reading apparatus 41, a demodulation circuit 42 and an ECC circuit 43 to a data demultiplexer 44, by which it is demultiplexed into a video signal and an audio signal, which is outputted to a circuit not shown.

The data demultiplexer 44 further decodes a data mode signal S_FF in a Subcode and outputs it to a data discriminator 221. Further, the video signal separated by the data demultiplexer 44 is inputted to the data discriminator 221.

The data discriminator 221 distributes, in response to the data mode signal S_FF supplied thereto from the data demultiplexer 44, the data supplied thereto also from the data demultiplexer 44. In particular, when the data mode signal S_FF is 1, the data discriminator 221 discriminates data (packet) supplied thereto then as high priority data and supplies them to the two-point buffer 222. But when the data mode signal S_FF is 0, the data discriminator 221 discriminates picture data (packet) inputted thereto then as low priority data (packet) and supplies them to a two-point buffer 222.

The two-point buffer 222 is constructed in a similar manner to that of the two-point buffer 204 shown in FIG. 42 and has a region which is divided into two regions for storing high priority data and low priority data. Thus, high priority data or low priority data from the data discriminator 221 are read in to an address designated by the HP write pointer or the LP write pointer, and high priority data or low priority data stored at an address designated by the HP read pointer or the LP read pointer are read out and outputted to a data deformatter 223.

The data deformatter 223 extracts a data link header from a packet of high priority data or low priority data inputted thereto and then extracts and outputs high priority data HP or low priority data LP to a priority degree decoder 224. Further, the data deformatter 223 refers to the packet counter (Packet Counter) (FIG. 48) at the adaptation header AH of the packet of high priority data or low priority data and, when the packet counter is discontinuous, the data deformatter 223 outputs an HP/LP error detection signal, which indicates that data is missing due to, for example, a transmission error, to the priority degree decoder 224.

Figure 51:
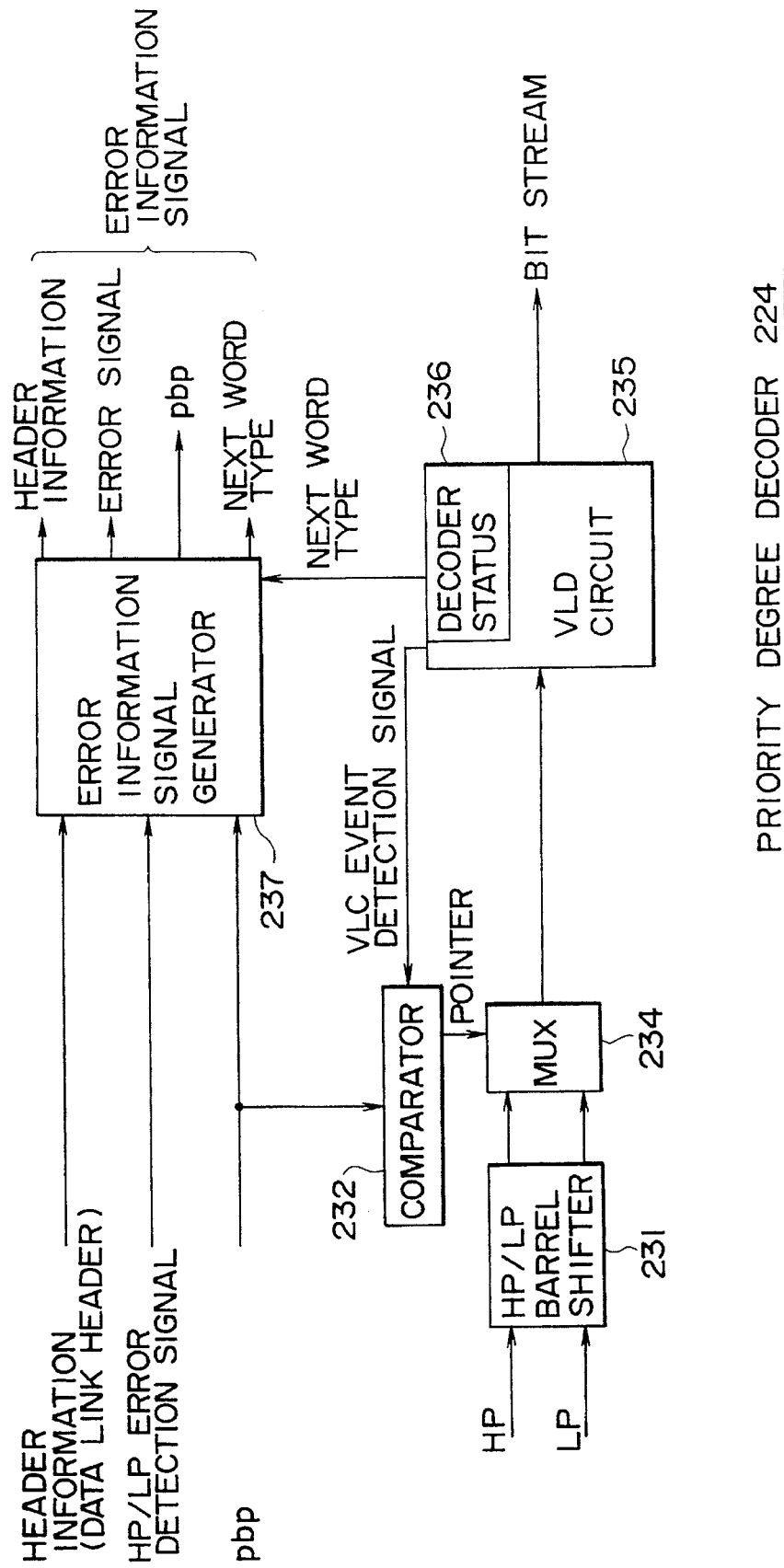
FIG. 51 is a block diagram showing the construction of a priority degree decoder of the image signal decoding apparatus shown in FIG. 50.

The priority degree decoder 224 is constructed in such a manner as shown in FIG. 51 and performs recombination of high priority data HP and low priority data LP. Further, when an HP/LP error detection signal is received from the data deformatter 223, the priority degree decoder 224 outputs information (an error information signal) for error recovery processing to a picture signal decoder 225 at a next stage.

Referring to FIG. 51, in the priority decoder 224, a pbp described in the slice header for high priority data or low priority data from the data deformatter 223 is first detected by a circuit not shown and outputted to a comparator 232 and an error information signal generator 237.

Meanwhile, high priority data HP and low priority data LP from the data deformatter 223 are inputted to and stored into a barrel shifter (HP/LP Barrel Shifter) 231. Then, of the high priority data HP and the low priority data LP stored in the barrel shifter 231, the high priority data are read out first by a multiplexer (MUX) 234 and outputted to a VLD (syntax analysis) circuit 235.

The syntax analysis (VLD) circuit 235 outputs the high priority data supplied thereto from the multiplexer 234 as they are and analyzes the data by syntax analysis to detect an event (VLC event) of variable length coding, which has been performed for the block by the variable length coder 26 (FIG. 43) of the picture signal coder 201. The syntax analysis circuit 235 thus outputs a detection signal of such event to the comparator 232.

The comparator 232 counts the detection signal of a VLC event outputted from the VLD circuit 235. Then, the comparator 232 compares the count value with the pbp and outputs, when the count value is equal to the pbp, a signal POINTER to the multiplexer 234. It is to be noted that the count value of the comparator 232 is reset to zero at the timing at which a block end coder (EOB) is inputted to the VLD circuit 235.

The multiplexer 234 varies the read address to the barrel shifter 231 when it receives the signal POINTER, and starts reading of low priority data LP corresponding (succeeding) to the high priority data HP which have been read out before then. The low priority data LP are outputted as they are by way of the VLD circuit 235.

Meanwhile, for example, where data of a block are constituted only from high priority data, the multiplexer 234 will detect a block end code EOB from the inputted data of the block before the signal POINTER is received, and also in this instance, the read address of the barrel shifter 231 is varied and reading of high priority data of a next block is started.

As described above, as low priority data corresponding to high priority data are outputted subsequently to the high priority data, re-combination of the high priority data and the low priority data is performed by the priority degree decoder 224.

Referring back to FIG. 50, the thus re-combined data are inputted to a picture signal decoder 225. The picture signal decoder 225 is constructed in such a manner as shown in FIG. 52. As seen from FIG. 52, the picture signal decoder 225 is constructed in a similar manner to that of the picture signal decoder 49 shown in FIG. 15 except that an error corrector 241 is provided integrally with the inverter variable length coder 62.

Accordingly, the re-combined data inputted to the picture signal decoder 225 is decoded in such a manner as described hereinabove with reference to FIG. 15 by the picture signal decoder 225 and is outputted to and displayed on a display such as a CRT not shown.

Ordinary reproduction is performed in such a manner as described above.

On the other hand, upon high speed reproduction, only high priority data are reproduced form the recording medium 10 (FIG. 50) and stored into the region of the two-point buffer 222 formed by division so as to store high priority data as described hereinabove with reference to FIG. 36. Then, the high priority data are supplied to the priority degree decoder 224 by way of the data deformatter 223. In the priority degree decoder 224, the high priority data are stored into the barrel shift 231 and thereafter read out by the multiplexer 234.

The high priority data read out by the multiplexer 234 are supplied by way of the VLD circuit 235 to and decoded by the picture signal decoder 225 (FIG. 50).

High speed reproduction of the high priority data which are data for high speed reproduction is performed in such a manner as described above.

It is to be noted that, in this instance, the multiplexer 234 (FIG. 51) generates, when the signal POINTER is received from the comparator 232, a block end signal EOB and outputs it to the picture signal decoder 225 by way of the VLD circuit 235. Consequently, the structure of data inputted to the picture signal decoder 225 is the same upon high speed reproduction as upon ordinary reproduction, and accordingly, high speed reproduction can be performed without modifying the operation control of the picture signal decoder 225 from that for ordinary reproduction.

When data is missing due to, for example, a transmission error and consequently an HP/LP error detection signal is outputted from the data deformatter 225 (FIG. 50) to the priority degree decoder 224, the HP/LP error detection signal is received by an error information signal generator 237 (FIG. 51) of the priority degree decoder 224.

Referring to FIG. 51, the error information signal generator 237 is supplied with, in addition to the HP/LP error detection signal, a data link header (header information) from the data deformatter 223, the pbp described hereinabove, and a next word type (Next Word Type) from a type generator (Decoder Status) 236. Thus, when the HP/LP error detection signal is received, the error information signal generator 237 outputs the signals supplied thereto including the detection signal as an error information signal.

Here, the type generator 236 is formed integrally with the VLD circuit 235 and refers to a result of syntax analysis of the VLD circuit 235 to generate a next word type (Next Word Type) as a signal representative of a layer (for example, a GOP or a sequence) to be decoded subsequently. The next word type is supplied to the error information signal generator 237.

Further, after the type generator 236 refers to a result of syntax analysis of the VLD circuit 235 when an HP/LP error detection signal is outputted from the data deformatter 223 to generate a next word type (Next Word Type), the VLD circuit 235 is reset.

The error information signal outputted from the error information signal generator 237 is supplied to the error corrector 241 of the picture signal decoder 225 (FIG. 52). Further, of the error information signal, the next word type (Next Word type) is supplied to the data deformatter 223 (FIG. 50).

The data deformatter 223 controls the HP or LP read pointer of the two-point buffer 222 to read out, from the two-point buffer 222, data corresponding to a layer to be decoded subsequently, which is indicated by a next word type (Next Word Type) which is returned when there is a the data deformatter 223 outputs an HP/LP error detection signal to the priority degree decoder 224, and supplies the data to the picture signal decoder 225 by way of the priority degree decoder 224.

Further, in the picture signal decoder 225 shown in FIG. 52, the inverse variable length coder 62 is controlled in response to the error information signal supplied thereto from the error information signal generator 237 (FIG. 51) of the priority degree decoder 224 by the error corrector 241, and under the control, the inverse variable length coder 62 starts inverse variable length coding processing beginning with data supplied thereto by way of the priority degree decoder 224 and corresponding to a layer to be decoded after an error occurs.

When there is high priority data miss due to an error, since a slice number is described in the link header of the high priority data, recovery from the error is performed in units of a slice. In particular, in this instance, decoding is started from that one of slices succeeding to the slice, in which the error has occurred, from which a start pointer (FIG. 32) is obtained earliest.

On the other hand, when low priority data miss, since a macro block number (FIG. 48) is described in the link header of the low priority data, if decoding of corresponding high priority data has been completed already, then recovery for the error is performed in units of an MB (macro block). In particular, in this instance, decoding is started from that one of macro blocks succeeding to the macro block, in which an error has occurred, from which a start pointer is obtained earliest.

And in this instance, only high priority data which are data for high speed reproduction are reproduced at an ordinary speed and a picture is displayed until after decoding of low priority data is started.

Figure 53:
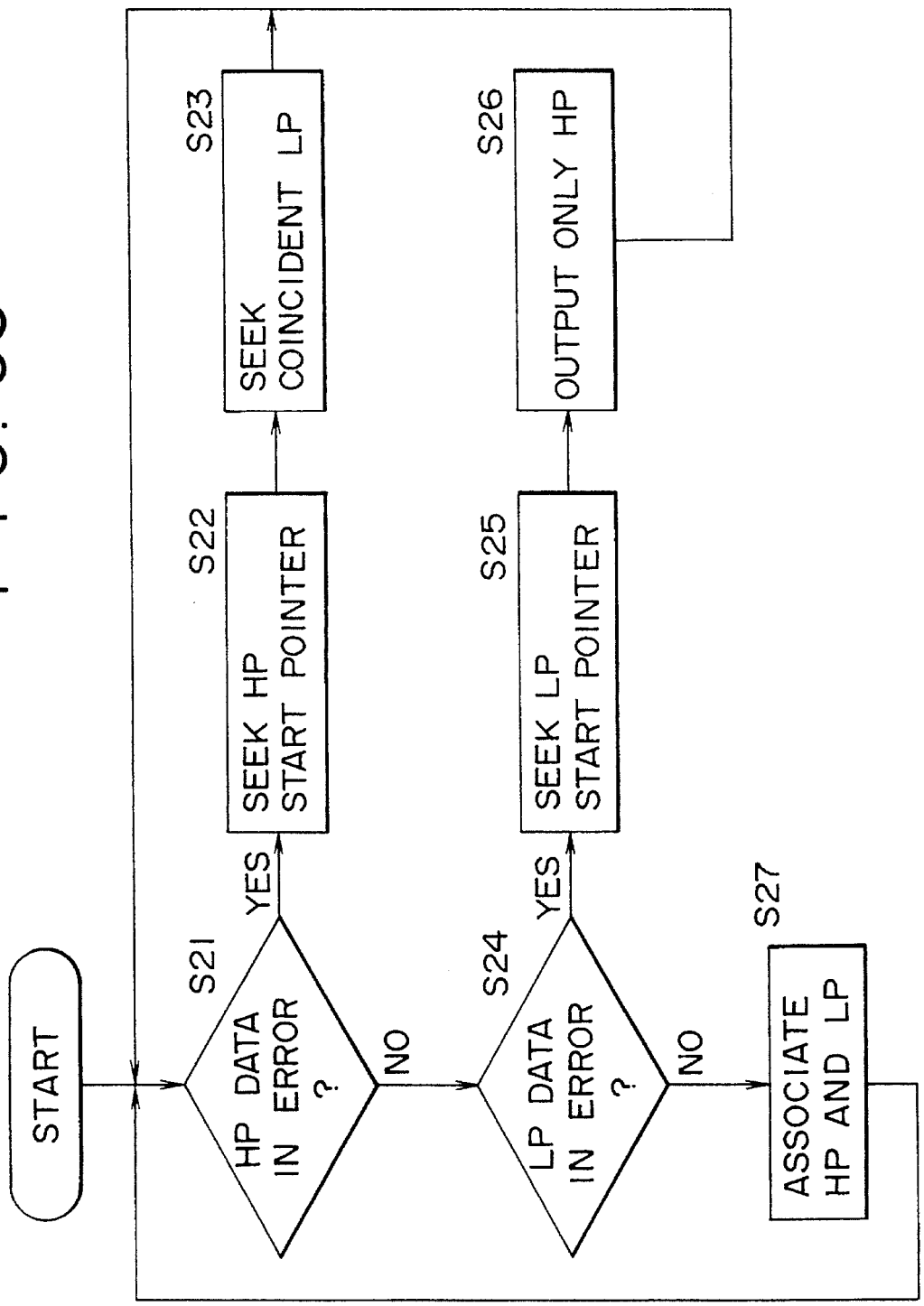
FIG. 53 is a flow chart illustrating error recovery processing in the image signal decoding apparatus shown in FIG. 50.

The error recovery processing described above will be described in more detail with reference to FIG. 53. First at step S21, it is determined whether or not an error has occurred with high priority data HP, and if it is determined that an error has occurred with the high priority data HP, the control sequence advances to step S22, at which outputting of low priority data LP corresponding to the high priority data HP from the priority degree decoder 224 to the picture signal decoder 225 is stopped and the start pointer of the high priority data HP succeeding to the high priority data HP with which the error has occurred is sought in units of a slice.

Here, seeking of the start pointer of the high priority data HP is performed by decoding the adaptation header of the packet header shown in FIG. 48 and then checking whether or not a Slice Start Pointer is described in the adaptation header.

Then, reproduction of the high priority data HP whose start pointer has been sought out is started, whereafter the control sequence advances to step S23, at which low priority data LP corresponding to the high priority data HP, that is, low priority data LP whose frame number (Frame Number) in the data link header (FIG. 48) is a number equal to the frame number of the high priority data HP whose start pointer has been sought out or another number corresponding to a frame in the future (later in time) with respect to the frame of the high priority data HP and for which a Macro Block Start Pointer is described are sought and reproduced.

Thereafter, the control sequence returns to step S21 to repeat the sequence of operations beginning with step S21.

On the other hand, if it is determined at step S21 that no error has occurred with the high priority data, the control sequence advances to step S24, at which it is determined whether or not an error has occurred with the low priority data LP. If it is determined at step S24 that an error has occurred with the low priority data LP, the control sequence advances to step S25, at which the start pointer of low priority data LP succeeding to the low priority data LP with which an error has occurred is sought in units of a macro block.

Here, the seeking of the start pointer of the low priority data LP is performed by decoding the adaptation header of the packet header shown in FIG. 48 and then checking whether or not a Macro Block Start Pointer is described in the adaptation header.

Thereafter, the control sequence advances to step step S26, at which the high speed HP which are data for high speed reproduction are reproduced at an ordinary speed while the start pointer of the low priority data LP is sought, whereafter the control sequence returns to step S21. It is to be noted that, when the start pointer of the low priority data LP is sought out, re-combination of the high priority data HP and the low priority data LP is thereafter performed to effect reproduction of a picture.

On the other hand, when it is determined at step S24 that no error has occurred with the low priority data LP, the control sequence advances to step S27, at which the high priority data HP and the low priority data LP are re-combined and reproduction of a picture is performed based on the thus re-combined data, whereafter the control sequence returns to step S21.

As described above, when an error has occurred with high priority data, recovery from the error is performed in units of a slice, but where no error has occurred with the high priority data but an error has occurred only with low priority data, reproduction of an image based on the high priority data is performed and the error of the low priority data is recovered in units of a macro block. Consequently, the loss of a picture upon occurrence of a data error can be minimized.

It is to be noted that, when, for example, the GOP header is required for error recovery processing, in the data deformatter 223 (FIG. 50), a packet of high priority data having a GOP header and a start pointer (Slice Start Pointer) is read out from the two-point buffer 222, and then a packet of low priority data LP whose frame number (Frame Number) in the data link header (FIG. 48) is a number equal to the frame number of the high priority data HP thus read out or another number corresponding to a frame in the future (later in time) with respect to the frame of the high priority data HP and for which a Macro Block Start Pointer is described is read out from the two-point buffer 222. Consequently, synchronization of high priority data and low priority data from a GOP is recovered.

Further, while, in the present embodiment, high priority data are selected from within data of I- and P-pictures, it is also possible to select high priority data only from I-pictures and use them as data for high speed reproduction.

<Eleventh Embodiment>

The eleventh embodiment is similar to the tenth embodiment except that addresses of sectors which include high priority data are written in the TOC (Table of Contents). The construction of the TOC is similar to that described hereinabove with reference to FIG. 21.

An example of construction of a picture signal coding apparatus (encoder) in the present embodiment is shown in FIG. 54. Referring to FIG. 54, in the present embodiment, a TOC addition circuit 84 is interposed between the data multiplexer 6 and the sector allocator 7 shown in FIG. 42. The entry point detector 81 detects an entry point from the output of the data multiplexer 6 and stores it into the entry point storage apparatus 82. The TOC data generator 83 generates TOC data corresponding to such data stored in the entry point storage apparatus 82 and outputs the TOC data to the TOC addition circuit 84. The TOC addition circuit 84 multiplexes the TOC data with picture data outputted from the data multiplexer 6.

Since operation of the present picture signal coding apparatus is basically similar to that of the picture signal coding apparatus shown in FIG. 22, overlapping description thereof is omitted herein to avoid redundancy.

Figure 55A:
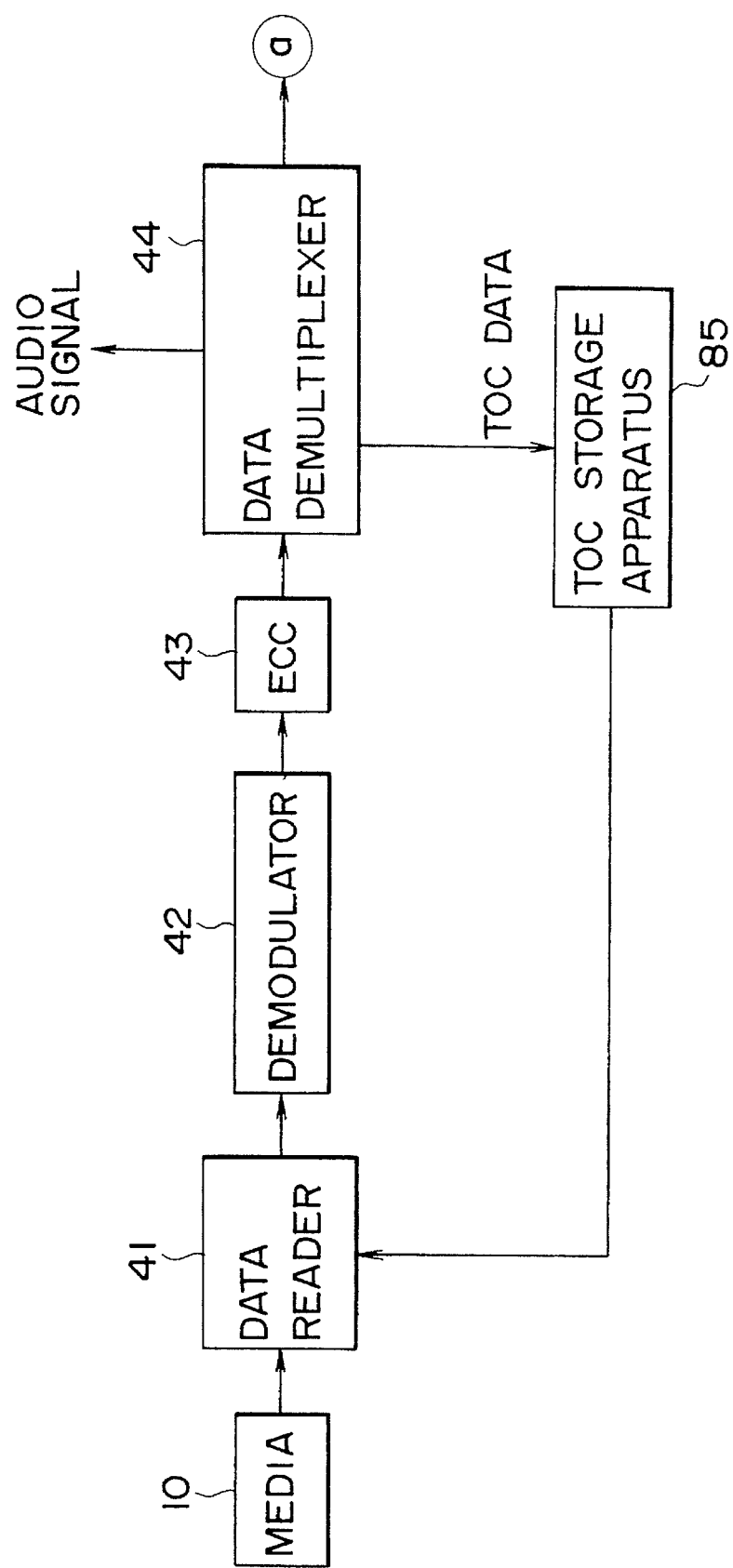
FIG. 55 is a block diagram showing a yet further picture signal decoding apparatus to which the present invention is applied.

An example of construction of a picture signal decoding apparatus (decoder) in accordance with an eleventh embodiment is shown in FIG. 55. The picture signal decoding apparatus is constructed such that the entry point storage apparatus 121 in FIG. 50 is replaced by a TOC storage apparatus 85 connected to the data demultiplexer 44. TOC data separated by the data demultiplexer 44 are stored into the TOC storage apparatus 85, and the accessing position of the data reader 41 is controlled in response to the stored data of the TOC storage apparatus 85.

Operation of the present picture signal decoding apparatus is similar to that of the picture signal decoding apparatus shown in FIG. 23, and accordingly, overlapping description thereof is omitted herein to avoid redundancy.

<Twelfth Embodiment>

The twelfth embodiment in accordance with the present is similar to the tenth embodiment except for the buffer selector 205 and the sector allocator 7.

The buffer selector 205 in the twelfth embodiment reads out high priority data and low priority data from the two-point buffer 204 in units of a GOP. The sector allocator 7 in the twelfth embodiment performs allocation of sectors so that the top of each GOP and the top of a corresponding sector may coincide with each other. Further, in units of a GOP, high priority data are allocated to the top of a sector.

<Thirteenth Embodiment>

The thirteenth embodiment in accordance with the present invention is similar to the tenth embodiment except for the buffer selector 205 and the sector allocator 7. The buffer selector 205 in the thirteenth embodiment reads out high priority data and low priority data from the two-point buffer 204 in units of a frame. In units of a frame, high priority data are allocated to the top of a frame.

<Fourteenth Embodiment>

The fourteenth embodiment in accordance with the present invention is similar to the tenth embodiment except for the priority degree adder 202. The priority degree adder 202 in the fourteenth embodiment allocates data of an intra-macro block in each frame as high priority data and allocates any other data as high priority data or low priority data.

It is to be noted that, while, for example, in the tenth embodiment, the two-point buffer 204 is formed as a ring buffer, the two-point buffer 204 may alternatively be formed not as a ring buffer but as such a linear buffer as shown in, for example, in FIG. 56.

Referring to FIG. 56, in this instance, the two-point buffer 204 is divided into two regions, for example, along the broken line shown. The HP write pointer is controlled so that it moves from the left end in FIG. 56 toward the center of the two-point buffer 204, and after it comes to the position of the broken line, it jumps to the left end so that it thereafter moves toward the center again. The HP read pointer is controlled so that it moves following the HP write pointer. Meanwhile, the LP write pointer is controlled so that it moves from the right end of the two-point buffer 204 in FIG. 56 toward the center, and after it comes to the position of the broken line, it jumps to the right end so that it thereafter moves toward the center again. The LP read pointer is controlled so that it moves following the LP write pointer.

Further, while, for example, in the tenth embodiment, the quantization step (dequantization step) of the picture signal coder 201 is controlled based only on the total accumulated amount (B_FULL) of the two-point buffer 204, the control may alternatively be based on, in addition to the total accumulated amount of the two-point buffer 204, for example, the magnitude of the region in the entire region of the two-point buffer 204 which is allocated to high priority data.

Having now fully described the invention, it will be apparent to one of ordinary skill in the art that many changes and modifications can be made thereto without departing from the spirit and scope of the invention as set forth herein.

What is claimed is:

1. A picture signal recording method, comprising the steps of:

coding an input picture signal to produce a coded picture signal, the coded picture signal including intra-frame coded picture signals, predictive coded picture signals, and bi-directional predictive coded picture signals;

dividing the coded picture signal into coded picture signals for high speed reproduction and other coded picture signals, the coded picture signals for high speed reproduction including the intra-frame coded picture signals and at least one of the predictive-coded picture signals;

arranging the coded picture signals for high speed reproduction and the other coded picture signals within each group-of-pictures so that the coded picture signals for high speed reproduction in the group-of-pictures are positioned at the beginning of the group-of-pictures to produce a recording signal; and recording the recording signal onto a recording medium.

2. A picture signal recording method according to claim 1, wherein the recording signal is allocated so that the coded picture signals for high speed reproduction are positioned at the beginning of a sector of the recording medium.

3. A picture signal recording method according to claim 1, wherein the recording medium includes a plurality of sectors, only some of the sectors include coded picture signals for high speed reproduction, and wherein a subcode corresponding to each sector is added to the recording signal that includes an identification signal indicating whether or not the sector includes the coded picture signals for high speed reproduction.

4. A picture signal recording method, comprising the steps of:

coding an input picture signal to produce a coded picture signal which includes intra-coded picture signals, predictive-coded picture signals, and bi-directionally predictive-coded picture signals;

dividing the coded picture signal into coded picture signals for high speed reproduction and other coded picture signals, the coded picture signals for high speed reproduction including intra-coded picture signals and at least one predictive-coded picture signal;

successively arranging the coded picture signals for high speed reproduction and the other coded picture signals at a predetermined ratio to produce a recording signal; and recording the recording signal onto a recording medium.

5. A picture signal recording method according to claim 4, wherein table of contents data are added to the recording signal and the table of contents data include a signal indicative of a position on the recording medium of the sectors that include the coded picture signals for high speed reproduction.

6. A picture signal recording method according to claim 4, wherein the recording signal is allocated for each fixed amount of codes to each of a plurality of sectors of the recording medium and only some of the sectors include coded picture signals for high speed reproduction, and a subcode corresponding to each sector is added to the recording signal and includes an identification signal which indicates whether or not the sector includes the coded picture signals for high speed reproduction and a pointer signal indicative of a beginning address of the coded picture signals for high speed reproduction is added to the recording signal corresponding to each sector that includes the coded picture signals for high speed reproduction.

7. A picture signal recording method according to claim 6, wherein the subcode corresponding to each sector that includes the coded picture signals for high speed reproduction further includes a signal indicative of an amount of data of the coded picture signals for high speed reproduction included in said each sector.

8. A picture signal recording method according to claim 6, wherein the subcode corresponding to each of the sectors that includes the coded picture signals for high speed reproduction further includes a signal indicative of a position of a subsequent sector in which subsequent coded picture signals for high speed reproduction are included.

9. A picture signal recording method, comprising the steps of:

coding an input picture signal to produce a coded picture signal, the coded picture signal including intra-frame coded picture signals, predictive coded picture signals, and bi-directional predictive coded picture signals;

dividing the coded picture signal into coded picture signals of a high priority degree and coded picture signals of a low priority degree, the coded picture signals of a high priority degree including at least portions of the intra-frame coded picture signals and at least portions of at least one of the predictive-coded picture signals and the coded picture signals of a low priority degree including at least other portions of the intracoded picture signals and at least other portions of the at least one predictive-coded picture signals;

producing a recording signal of a packet construction such that the coded picture signals of a high priority degree and the coded picture signals of a low priority degree are not present in a same packet; and recording the recording signal onto a recording medium.

10. A picture signal recording method according to claim 9, wherein a position at which the coded picture signals of a high priority degree and the coded picture signals of a low priority degree are separated from each other is determined in units of a slice.

11. A picture signal recording method according to claim 9, wherein in the step of producing a recording signal of a packet construction, a block end code is added to the end of the coded picture signals of a high priority degree.

12. A picture signal recording method according to claim 9, wherein in the step of producing a recording signal of a packet construction an identification signal for indicating whether the coded picture signals in a packet are of a high priority degree or are of a low priority degree is provided in a header of the packet.

13. A picture signal recording method according to claim 9, wherein the recording signal is distributed for each fixed amount of codes to a sector of the recording medium, and a subcode corresponding to the sector is added to the recording signal and includes a signal indicative of an address of another sector in which next coded picture signals of a high priority degree are included.

14. A picture signal recording method according to claim 9, wherein the recording signal is distributed for each fixed amount of codes to a sector of the recording medium, and table of contents data are added to the recording signal and include a signal indicative of a position of a sector in which the coded picture signals of a high priority degree are included.

15. A picture signal recording method according to claim 9, wherein after dividing the coded picture signal into coded picture signals of a high priority degree and coded picture signals of a low priority degree, the coded picture signals of a high priority degree and the coded picture signals of a low priority degree are stored temporarily into respective separate regions of a storage means and wherein in the step of producing the recording signal of the packet construction, the coded picture signals of a high priority degree are read out first from the storage means and thereafter the coded picture signals of a low priority degree are read out from the storage means, and reading and writing of the coded picture signals of a high priority degree and the coded picture signals of a low priority degree from and into said storage means is controlled with separate write pointers and read pointers for each region.

16. A picture signal recording method according to claim 9, wherein the recording signal is arranged so that the coded picture signals of a high priority in the predetermined picture unit are positioned at the beginning of the predetermined picture unit.

17. A picture signal recording method according to claim 16, wherein the predetermined picture unit is a group-of-pictures.

18. A picture signal recording method according to claim 16, wherein the recording signal is applied to the sector so that the coded picture signals of a high priority degree are positioned at the beginning of the sector of the recording medium.

19. A picture signal recording method according to claim 16, wherein the predetermined picture unit is a frame.

20. A picture signal reproduction method, comprising the steps of:

reproducing a coded picture signal from a recording medium on which the coded picture signal is recorded, the coded picture signal including intra-frame coded picture signals, predictive coded picture signals, and bi-directional predictive coded picture signals and the coded picture signal being recorded on the recording medium such that coded picture signals for high speed reproduction in a predetermined picture unit and other coded picture signals in the predetermined picture unit are disposed so that the coded picture signals for high speed reproduction are positioned at the beginning of the predetermined picture unit, the coded picture signals for high speed reproduction including the intra-frame coded picture signals and at least one of the predictive-coded picture signals;

separating the coded picture signal into the coded picture signals for high speed reproduction and the other coded picture signals;

re-arranging the coded picture signals for high speed reproduction and the other coded picture signals thus separated in a predetermined order to produce a rearranged signal; and decoding the re-arranged signal to produce a decoded picture for ordinary reproduction.

21. A picture signal reproduction method according to claim 20, wherein the separation is performed based on an identification signal provided in a subcode for identification between the coded picture signals for high speed reproduction and the other coded picture signals.

22. A picture signal reproduction method, comprising the steps of:

reproducing, from a recording medium on which a coded picture signal is recorded, only coded picture signals for high speed reproduction, the coded picture signal including intra-frame coded picture signals, predictive coded picture signals, and bi-directional predictive coded picture signals and the coded picture signal being recorded on the recording medium such that the coded picture signals for high speed reproduction in a predetermined picture unit, and other coded picture signals in the predetermined picture unit are disposed so that the coded picture signals for high speed reproduction in the predetermined picture unit are positioned at the beginning of the predetermined picture unit, the coded picture signals for high speed reproduction including the intra-frame coded picture signals and at least one of the predictive-coded picture signals; and decoding the coded picture signals for high speed reproduction thus reproduced to produce a decoded picture for high speed reproduction.

23. A picture signal reproduction method according to claim 22, wherein the recording medium includes a plurality of sectors and wherein the coded picture signal is allocated to each sector so that the beginning of the predetermined picture unit coincides with the beginning of the sector of the recording medium, and only those sectors in which the coded picture signals for high speed reproduction are included are reproduced.

24. A picture signal reproduction method, comprising the steps of:

reproducing, from a recording medium, a sector of the recording medium to which coded picture signals for high speed reproduction are allocated, a coded picture signal including intra-frame coded picture signals, predictive coded picture signals, and bi-directional predictive coded picture signal recorded on the recording medium such that coded picture signals for high speed reproduction and other coded picture signals are successively arranged on the recording medium at a predetermined ratio and the coded picture signal has a predetermined amount of codes allocated to each sector, the coded picture signals for high speed reproduction including the intra-frame coded picture signals and at least one predictive coded picture signal;

separating, in response to a signal in a subcode of the sector representative of a beginning address of the coded picture signals for high speed reproduction, the coded picture signals of the sector for high speed reproduction from the other coded picture signals of the sector; and decoding the thus separated coded picture signals for high speed reproduction to produce a decoded picture for high speed reproduction.

25. A picture signal reproduction method according to claim 24, wherein the coded picture signals for high speed reproduction are separated in response to a signal in the subcode indicative of an amount of data of the coded picture signals for high speed reproduction.

26. A picture signal reproduction method according to claim 24, wherein next coded picture signals for high speed reproduction are reproduced in response to a signal in the subcode indicative of a position of the next coded picture signals for high speed reproduction.

27. A picture signal reproduction method according to claim 24, further including the step of reproducing table of contents data indicative of an address of a sector in which the coded picture signals for high speed reproduction are recorded and the sector to which the coded picture signals for high speed reproduction are allocated is reproduced in response to the reproduced table of contents data.

28. A picture signal reproduction method, comprising the steps of:

reproducing a coded picture signal from a recording medium, the coded picture signal including intra-frame coded picture signals, predictive coded picture signals, and bi-directional predictive coded picture signals, the coded picture signal recorded on the recording medium having been divided into coded picture signals of a high priority degree and coded picture signals of a low priority degree the coded picture signals of the high priority degree and the coded picture signals of the low priority degree having been recorded on the recording medium in a packet construction such that the coded picture signals of a high priority degree and the coded picture signals of a low priority degree do not exist in a same packet, the coded picture signals of the high priority degree including at least portions of the intra-frame coded picture signals and at least portions of at least one of the predictive-coded picture signals and the coded picture signals of the low priority degree including at least other portions of the intra-coded picture signals and at least other portions of the at least one predictive-coded picture signals;

separating the coded picture signals of a high priority degree and the coded picture signals of a low priority degree from each other in response to an identification signal provided in a header of the packet and that identifies whether the coded signals in the packet are the coded picture signals of a high priority degree or the coded picture signals of a low priority degree; and decoding only the coded picture signals of a high priority degree upon high speed reproduction.

29. A picture signal reproduction method according to claim 28, wherein the coded picture signal is reproduced in response to a signal in a subcode that is indicative of an address of a sector that includes the coded picture signals of a high priority degree.

30. A picture signal reproduction method according to claim 28, wherein the coded picture signal is reproduced in response to a signal in a table of contents indicative of an address of a sector that includes the coded picture signals of a high priority degree.

31. A picture signal reproduction method, comprising the steps of:

reproducing a coded picture signal from a recording medium, the coded picture signal including intra-frame coded picture signals, predictive coded picture signals, and bi-directional predictive coded picture signals, the coded picture signal recorded on the recording medium having been divided into coded picture signals of a high priority degree and coded picture signals of a low priority degree the coded picture signals of the high priority degree and the coded picture signals of the low priority degree having been recorded on the recording medium in a packet construction such that the coded picture signals of a high priority degree and the coded picture signals of a low priority degree do not exist in a same packet, the coded picture signals of a high priority degree including at least portions of the intra-frame coded picture signals and at least portions of at least one of the predictive-coded picture signals and the coded picture signals of the low priority degree including at least other portions of the intra-coded picture signals and at least other portions of the at least one predictive-coded picture signals;

separating the coded picture signals of a high priority degree and the coded picture signals of a low priority degree from each other in response to an identification signal provided in a header of the packet and that identifies whether the coded picture signals in the packet are the coded picture signals of a high priority degree or the coded picture signals of a low priority degree;

combining the coded picture signals of a high priority degree and the coded picture signals of a low priority degree in response to a link signal provided in the header of the packet to produce a combination signal; and decoding the combination signal to produce a decoded picture signal for ordinary reproduction.

32. A picture signal reproduction method according to claim 31, wherein the coded picture signals of a high priority degree and the coded picture signals of a low priority degree are stored temporarily into respective separate regions of a storage means and wherein in the step of producing the recording signal of the packet construction, the coded picture signals of a high priority degree are read out first from the storage means and thereafter the coded picture signals of a low priority degree are read out from the storage means, and reading and writing of the coded picture signals of a high priority degree and the coded picture signals of a low priority degree from and into said storage means is controlled with separate write pointers and read pointers for each region.

33. A picture signal reproduction method according to claim 31, wherein the step of decoding the combination signal includes a step of detecting an error of the coded picture signals of a low priority degree, and when an error of the coded picture signals of a low priority degree is detected, only the coded picture signals of a high priority degree are decoded as the coded picture signal for ordinary reproduction until after recovery from the error.

34. A picture signal recording apparatus, comprising:

coding means for coding an input picture signal to produce a coded picture signal, the coded picture signal including intra-frame coded picture signals, predictive coded picture signals, and bi-directional predictive coded picture signals;

division means for dividing the coded picture signal into coded picture signals for high speed reproduction and other coded picture signals, the coded picture signals for high speed reproduction including the intra-frame coded picture signals and at least one of the predictive-coded picture signals;

multiplexing means for arranging the coded picture signals for high speed reproduction and other coded picture signals within each group-of-pictures so that the coded picture signals for high speed reproduction in the group-of-pictures are positioned at the beginning of the group-of-pictures to produce a recording signal; and recording means for recording the recording signal onto a recording medium.

35. A picture signal recording apparatus, comprising:

coding means for coding an input picture signal to produce a coded picture signal which includes intra-coded picture signals, predictive-coded picture signals, and bi-directionally predictive-coded picture signals;

division means for dividing the coded picture signal into coded picture signals tier high speed reproduction and other coded picture signals, the coded picture signals for high speed reproduction including intra-coded picture signals and at least one predictive-coded picture signal;

multiplexing means for successively arranging the coded picture signals for high speed reproduction and the other coded picture signals at a predetermined ratio to produce a recording signal; and recording means for recording the recording signal onto a recording medium.

36. A picture signal recording apparatus, comprising:

coding means for coding an input picture signal to produce a coded picture signal, the coded picture signal including intra-frame coded picture signals, predictive coded picture signals, and bi-directional predictive coded picture signals;

division means for dividing the coded picture signal into coded picture signals of a high priority degree and coded picture signals of a low priority degree, the coded picture signals of a high priority degree including at least portions of the intra-frame coded picture signals and at least portions of at least one of the predictive-coded picture signals, and the coded picture signals of the low priority degree including at least other portions of the intra-coded picture signals and at least other portions of the at least one predictive-coded picture signals;

multiplexing means for producing a recording signal of a packet construction such that the coded picture signals of a high priority degree and the coded picture signals of a low priority degree are not present in a same packet; and recording means for recording the recording signal onto a recording medium.

37. A picture signal reproduction apparatus, comprising:

reproduction means for reproducing, a coded picture signal from a recording medium on which the coded picture signal is recorded, the coded picture signal including intra-frame coded picture signals, predictive coded picture signals, and bi-directional predictive coded picture signals and the coded picture signal being recorded on the recording medium such that coded picture signals for high speed reproduction in a predetermined picture unit and other coded picture signals in the predetermined picture unit are disposed so that the coded picture signals for high speed reproduction are positioned at the beginning of the predetermined picture unit, the coded picture signals for high speed reproduction including the intra-frame coded picture signals and at least one of the predictive-coded picture signals;

separation means for separating the coded picture signal into the coded picture signals for high speed reproduction and the other coded picture signals;

means for re-arranging the coded picture signals for high speed reproduction and the other coded picture signals thus separated in a predetermined order to produce a re-arranged signal; and decoding means for decoding the re-arranged signal to produce a decoded picture for ordinary reproduction.

38. A picture signal reproduction apparatus, comprising:

reproduction means for reproducing, from a recording medium on which a coded picture signal is recorded, only coded picture signals for high speed reproduction, the coded picture signal including intra-frame coded picture signals, predictive coded picture signals, and bi-directional predictive coded picture signals and the coded picture signals for high speed reproduction including the intra-frame coded picture signals and at least one of the predictive-coded picture signals, the coded picture signal being recorded on the recording medium such that coded picture signals for high speed reproduction in a predetermined picture unit and other coded picture signals in the predetermined unit are disposed so that the coded picture signals for high speed reproduction in the predetermined picture unit are positioned at the beginning of the predetermined picture unit; and decoding means for decoding the coded picture signals for high speed reproduction thus reproduced to produce a decoded picture for high speed reproduction.

39. A picture signal reproduction apparatus, comprising:

reproduction means for reproducing a coded picture signal from a recording medium on which the coded picture signal is recorded, the coded picture signal including intra-frame coded picture signals, predictive coded picture signals, and bi-directional predictive coded picture signals and the coded picture signals for high speed reproduction including the intra-frame coded picture signals and at least one of the predictive-coded picture signals, the coded picture signal being recorded on the recording medium such that the coded picture signals for high speed reproduction and the other coded picture signals are successively arranged at a predetermined ratio and the coded picture signal is allocated for each predetermined amount of codes to each sector, a sector to which the coded picture signals for high speed reproduction are allocated;

separation means for separating, in response to a signal representative of a top address of the coded picture signals for high speed reproduction in a subcode of the sector, the coded picture signals for high speed reproduction from the other coded picture signals thus reproduced from the sector; and decoding means for decoding the thus separated coded picture signals for high speed reproduction to produce a decoded picture for high speed reproduction.

40. A picture signal reproduction apparatus, comprising:

reproduction means for reproducing a coded picture signal from a recording medium, the coded picture signal including intra-frame coded picture signals, predictive coded picture signals, and bi-directional predictive coded picture signals, the coded picture signal recorded on the recording medium having been divided into coded picture signals of a high priority degree and coded picture signals of a low priority degree, the coded picture signals of a high priority degree and the coded picture signals of a low priority degree having been recorded in a packet construction such that the coded picture signals of a high priority degree and the coded picture signals of a low priority degree do not exist in a same packet;

separation means for separating the coded picture signals of a high priority degree and the coded picture signals of a low priority degree from each other in response to an identification signal provided in a header of the packet and that identifies whether the coded picture signals in the packet are the coded picture signals of a high priority degree or the coded picture signals of a low priority degree; and decoding means for decoding only the coded picture signals of a high priority degree upon high speed reproduction.

41. A picture signal reproduction apparatus, comprising:

reproduction means for reproducing a coded picture signal from a recording medium, the coded picture signal including intra-frame coded picture signals, predictive coded picture signals, and bi-directional predictive coded picture signals, the coded picture signal recorded on the recording medium having been divided into coded picture signals of a high priority degree and coded picture signals of a low priority degree, the coded picture signals of a high priority degree and the coded picture signals of a low priority degree having been recorded in a packet construction such that the coded picture signals of a high priority degree and the coded picture signals of a low priority degree do not exist in a same packet;

separation means for separating the coded picture signals of a high priority degree and the coded picture signals of a low priority degree from each other in response to an identification signal provided in a header of the packet and which identifies whether the coded picture signals within the packet are the coded picture signals of a high priority degree or the coded picture signals of a low priority degree;

means for combining the coded picture signals of a high priority degree and the coded picture signals of a low priority degree in response to a link signal provided in the header of the packet to produce a combination signal; and decoding means for decoding the combination signal to produce a decoded picture signal for ordinary reproduction.

42. A picture signal recording medium, having data recorded thereon formed by the steps of:

coding an input picture signal to produce a coded picture signal, the coded picture signal including intra-frame coded picture signals, predictive coded picture signals, and bi-directional predictive coded picture signals;

dividing the coded picture signal into coded picture signals for high speed reproduction and other coded picture signals, the coded picture signals for high speed reproduction including the intra-frame coded picture signals and at least one of the predictive-coded picture signals;

arranging the coded picture signals for high speed reproduction and the other coded picture signals within each group-of-pictures so that the coded picture signals for high speed reproduction in the group-of-pictures are positioned at the beginning of the predetermined group-of-pictures to produce a recording signal; and recording the recording signal onto the recording medium.

43. A picture signal recording medium, having data recorded thereon formed by the steps of:

coding an input picture signal to produce a coded picture signal, the coded picture signal including intra-frame coded picture signals, predictive coded picture signals, and bi-directional predictive coded picture signals;

dividing the coded picture signal into coded picture signals for high speed reproduction and other coded picture signals, the coded picture signals for high speed reproduction including the intra-frame coded picture signals and at least one of the predictive-coded picture signals;

successively arranging the coded picture signals for high speed reproduction and the other coded picture signals at a predetermined ratio to produce a recording signal; and recording the recording signal onto a recording medium.

44. A picture signal recording medium, formed by the steps of:

coding an input picture signal to produce a coded picture signal, the coded picture signal including intra-frame coded picture signals, predictive coded picture signals, and bi-directional predictive coded picture signals;

dividing the coded picture signal into coded picture signals of a high priority degree and coded picture signals of a low priority degree, the coded picture signals of a high priority degree including at least portions of the intra-frame coded picture signals and at least portions of at least one of the predictive-coded picture signals and the coded picture signals of a low priority degree including at least other portions of the intra-coded picture signals and at least other portions of the at least one predictive-coded picture signals;

producing a recording signal of a packet construction such that the coded picture signals for high speed reproduction and the other coded picture signals are not present in a same packet; and recording the recording signal onto a recording medium.

* * * * *

UNITED STATES PATENT AND TRADEMARK OFFICE
CERTIFICATE OF CORRECTION

PATENT NO. : 5,602,956
DATED : February 11, 1997
INVENTOR(S) : SUZUKI et al.

It is certified that error appears in the above-indentified patent and that said Letters Patent is hereby corrected as shown below:

Col. 39, line 30, delete "tier" and insert in place thereof --for--.

Signed and Sealed this

Twentieth Day of May, 1997

Attest:

BRUCE LEHMAN

Attesting Officer     Commissioner of Patents and Trademarks